(12) United States Patent
Wilberding et al.

(10) Patent No.: US 10,853,022 B2
(45) Date of Patent: Dec. 1, 2020

(54) CALIBRATION INTERFACE

(71) Applicant: Sonos, Inc., Santa Barbara, CA (US)

(72) Inventors: Dayn Wilberding, Santa Barbara, CA (US); Sein Woo, Somerville, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/530,324

(22) Filed: Aug. 2, 2019

(65) Prior Publication Data

US 2019/0354337 A1 Nov. 21, 2019

Related U.S. Application Data

(63) Continuation of application No. 15/217,399, filed on Jul. 22, 2016, now Pat. No. 10,372,406.

(51) Int. Cl.
*G06F 3/16* (2006.01)
*H04S 7/00* (2006.01)

(52) U.S. Cl.
CPC .............. *G06F 3/162* (2013.01); *G06F 3/165* (2013.01); *H04S 7/301* (2013.01); *H04S 7/305* (2013.01)

(58) Field of Classification Search
CPC ................................ G06F 3/162; G06F 3/165
See application file for complete search history.

(56) References Cited

U.S. PATENT DOCUMENTS

| 4,306,113 | A | 12/1981 | Morton |
| 4,342,104 | A | 7/1982 | Jack |
| 4,504,704 | A | 3/1985 | Ohyaba et al. |

(Continued)

FOREIGN PATENT DOCUMENTS

| CN | 1447624 A | 10/2003 |
| CN | 101366177 A | 2/2009 |

(Continued)

OTHER PUBLICATIONS

Notice of Allowance dated Jul. 8, 2019, issued in connection with U.S. Appl. No. 15/856,791, filed Dec. 28, 2017, 5 pages.

(Continued)

*Primary Examiner* — Andrea C Leggett
(74) *Attorney, Agent, or Firm* — McDonnell Boehnen Hulbert & Berghoff LLP

(57) ABSTRACT

Example techniques relate to calibration interfaces that facilitate calibration of a playback device. An example implementation may involve displaying, on a graphical display, a sequence of control interfaces to guide calibration of a playback device during a calibration sequence comprising (i) a spatial calibration component and (ii) a spectral calibration component. Displaying the sequence of control interfaces includes displaying one or more spatial calibration interfaces comprising a guide to perform the spatial calibration component of the calibration sequence. The spatial calibration component involves calibration of the playback device for a particular location within an environment. Displaying the sequence of control interfaces also includes displaying one or more spectral calibration interfaces comprising a guide to perform the spectral calibration component of the calibration sequence. The spectral calibration component involves calibration of the playback device for the environment.

20 Claims, 29 Drawing Sheets

(56) References Cited

U.S. PATENT DOCUMENTS

| | | | |
|---|---|---|---|
| 4,592,088 A | 5/1986 | Shimada | |
| 4,628,530 A | 12/1986 | Op et al. | |
| 4,631,749 A | 12/1986 | Rapaich | |
| 4,694,484 A | 9/1987 | Atkinson et al. | |
| 4,773,094 A | 9/1988 | Dolby | |
| 4,995,778 A | 2/1991 | Bruessel | |
| 5,218,710 A | 6/1993 | Yamaki et al. | |
| 5,255,326 A | 10/1993 | Stevenson | |
| 5,323,257 A | 6/1994 | Abe et al. | |
| 5,386,478 A | 1/1995 | Plunkett | |
| 5,440,644 A | 8/1995 | Farinelli et al. | |
| 5,553,147 A | 9/1996 | Pineau | |
| 5,581,621 A | 12/1996 | Koyama et al. | |
| 5,757,927 A | 5/1998 | Gerzon et al. | |
| 5,761,320 A | 6/1998 | Farinelli et al. | |
| 5,910,991 A | 6/1999 | Farrar | |
| 5,923,902 A | 7/1999 | Inagaki | |
| 5,939,656 A | 8/1999 | Suda | |
| 6,018,376 A | 1/2000 | Nakatani | |
| 6,032,202 A | 2/2000 | Lea et al. | |
| 6,072,879 A | 6/2000 | Ouchi et al. | |
| 6,111,957 A | 8/2000 | Thomasson | |
| 6,256,554 B1 | 7/2001 | DiLorenzo | |
| 6,363,155 B1 | 3/2002 | Horbach | |
| 6,404,811 B1 | 6/2002 | Cvetko et al. | |
| 6,469,633 B1 | 10/2002 | Wachter et al. | |
| 6,522,886 B1 | 2/2003 | Youngs et al. | |
| 6,573,067 B1 | 6/2003 | Dib-Hajj et al. | |
| 6,611,537 B1 | 8/2003 | Edens et al. | |
| 6,631,410 B1 | 10/2003 | Kowalski et al. | |
| 6,639,989 B1 | 10/2003 | Zacharov et al. | |
| 6,643,744 B1 | 11/2003 | Cheng | |
| 6,704,421 B1 | 3/2004 | Kitamura | |
| 6,721,428 B1 | 4/2004 | Allred et al. | |
| 6,757,517 B2 | 6/2004 | Chang et al. | |
| 6,760,451 B1 | 7/2004 | Craven et al. | |
| 6,766,025 B1 | 7/2004 | Levy et al. | |
| 6,778,869 B2 | 8/2004 | Champion | |
| 6,798,889 B1 * | 9/2004 | Dicker | H04S 7/301 381/103 |
| 6,862,440 B2 | 3/2005 | Sampath | |
| 6,916,980 B2 | 7/2005 | Ishida et al. | |
| 6,931,134 B1 | 8/2005 | Waller, Jr. et al. | |
| 6,985,694 B1 | 1/2006 | De Bonet et al. | |
| 6,990,211 B2 | 1/2006 | Parker | |
| 7,031,476 B1 | 4/2006 | Chrisop et al. | |
| 7,039,212 B2 | 5/2006 | Poling et al. | |
| 7,058,186 B2 | 6/2006 | Tanaka | |
| 7,072,477 B1 | 7/2006 | Kincaid | |
| 7,103,187 B1 | 9/2006 | Neuman | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,187,947 B1 | 3/2007 | White et al. | |
| 7,236,773 B2 | 6/2007 | Thomas | |
| 7,289,637 B2 | 10/2007 | Montag et al. | |
| 7,295,548 B2 | 11/2007 | Blank et al. | |
| 7,312,785 B2 | 12/2007 | Tsuk et al. | |
| 7,391,791 B2 | 6/2008 | Balassanian et al. | |
| 7,477,751 B2 | 1/2009 | Lyon et al. | |
| 7,483,538 B2 | 1/2009 | McCarty et al. | |
| 7,483,540 B2 | 1/2009 | Rabinowitz et al. | |
| 7,489,784 B2 | 2/2009 | Yoshino | |
| 7,490,044 B2 | 2/2009 | Kulkarni | |
| 7,492,909 B2 | 2/2009 | Carter et al. | |
| 7,519,188 B2 | 4/2009 | Berardi et al. | |
| 7,529,377 B2 | 5/2009 | Nackvi et al. | |
| 7,571,014 B1 | 8/2009 | Lambourne et al. | |
| 7,590,772 B2 | 9/2009 | Marriott et al. | |
| 7,630,500 B1 | 12/2009 | Beckman et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,664,276 B2 | 2/2010 | McKee | |
| 7,676,044 B2 | 3/2010 | Sasaki et al. | |
| 7,689,305 B2 | 3/2010 | Kreifeldt et al. | |
| 7,720,237 B2 | 5/2010 | Bharitkar et al. | |
| 7,742,740 B2 | 6/2010 | Goldberg et al. | |
| 7,769,183 B2 | 8/2010 | Bharitkar et al. | |
| 7,796,068 B2 | 9/2010 | Raz et al. | |
| 7,835,689 B2 | 11/2010 | Goldberg et al. | |
| 7,853,341 B2 | 12/2010 | McCarty et al. | |
| 7,876,903 B2 | 1/2011 | Sauk | |
| 7,925,203 B2 | 4/2011 | Lane et al. | |
| 7,949,140 B2 | 5/2011 | Kino | |
| 7,949,707 B2 | 5/2011 | McDowall et al. | |
| 7,961,893 B2 | 6/2011 | Kino | |
| 7,970,922 B2 | 6/2011 | Svendsen | |
| 7,987,294 B2 | 7/2011 | Bryce et al. | |
| 8,005,228 B2 | 8/2011 | Bharitkar et al. | |
| 8,014,423 B2 | 9/2011 | Thaler et al. | |
| 8,045,721 B2 | 10/2011 | Burgan et al. | |
| 8,045,952 B2 | 10/2011 | Qureshey et al. | |
| 8,050,652 B2 | 11/2011 | Qureshey et al. | |
| 8,063,698 B2 | 11/2011 | Howard | |
| 8,074,253 B1 | 12/2011 | Nathan | |
| 8,103,009 B2 | 1/2012 | McCarty et al. | |
| 8,116,476 B2 | 2/2012 | Inohara | |
| 8,126,172 B2 | 2/2012 | Horbach et al. | |
| 8,131,390 B2 | 3/2012 | Braithwaite et al. | |
| 8,139,774 B2 | 3/2012 | Berardi et al. | |
| 8,144,883 B2 | 3/2012 | Pdersen et al. | |
| 8,160,276 B2 | 4/2012 | Liao et al. | |
| 8,160,281 B2 | 4/2012 | Kim et al. | |
| 8,170,260 B2 | 5/2012 | Reining et al. | |
| 8,175,292 B2 | 5/2012 | Aylward et al. | |
| 8,175,297 B1 | 5/2012 | Ho et al. | |
| 8,194,874 B2 | 6/2012 | Starobin et al. | |
| 8,229,125 B2 | 7/2012 | Short | |
| 8,233,632 B1 | 7/2012 | MacDonald et al. | |
| 8,234,395 B2 | 7/2012 | Millington et al. | |
| 8,238,547 B2 | 8/2012 | Ohki et al. | |
| 8,238,578 B2 | 8/2012 | Aylward | |
| 8,243,961 B1 | 8/2012 | Morrill | |
| 8,264,408 B2 * | 9/2012 | Kainulainen | G01S 3/023 342/417 |
| 8,265,310 B2 | 9/2012 | Berardi et al. | |
| 8,270,620 B2 | 9/2012 | Christensen et al. | |
| 8,279,709 B2 | 10/2012 | Choisel et al. | |
| 8,281,001 B2 | 10/2012 | Busam et al. | |
| 8,290,185 B2 | 10/2012 | Kim | |
| 8,291,349 B1 | 10/2012 | Park et al. | |
| 8,300,845 B2 | 10/2012 | Zurek et al. | |
| 8,306,235 B2 | 11/2012 | Mahowald | |
| 8,325,931 B2 | 12/2012 | Howard et al. | |
| 8,325,935 B2 | 12/2012 | Rutschman | |
| 8,325,944 B1 | 12/2012 | Duwenhorst et al. | |
| 8,331,585 B2 | 12/2012 | Hagen et al. | |
| 8,332,414 B2 | 12/2012 | Nguyen et al. | |
| 8,379,876 B2 | 2/2013 | Zhang | |
| 8,391,501 B2 | 3/2013 | Khawand et al. | |
| 8,392,505 B2 | 3/2013 | Haughay et al. | |
| 8,401,202 B2 | 3/2013 | Brooking | |
| 8,433,076 B2 | 4/2013 | Zurek et al. | |
| 8,452,020 B2 | 5/2013 | Gregg et al. | |
| 8,463,184 B2 | 6/2013 | Dua | |
| 8,483,853 B1 | 7/2013 | Lambourne | |
| 8,488,799 B2 | 7/2013 | Goldstein et al. | |
| 8,503,669 B2 | 8/2013 | Mao | |
| 8,527,876 B2 | 9/2013 | Wood et al. | |
| 8,577,045 B2 | 11/2013 | Gibbs | |
| 8,577,048 B2 | 11/2013 | Chaikin et al. | |
| 8,600,075 B2 | 12/2013 | Lim | |
| 8,620,006 B2 | 12/2013 | Berardi et al. | |
| 8,682,002 B2 | 3/2014 | Wihardja et al. | |
| 8,731,206 B1 | 5/2014 | Park | |
| 8,755,538 B2 | 6/2014 | Kwon | |
| 8,798,280 B2 | 8/2014 | Goldberg et al. | |
| 8,819,554 B2 | 8/2014 | Basso et al. | |
| 8,831,244 B2 | 9/2014 | Apfel | |
| 8,855,319 B2 | 10/2014 | Liu et al. | |
| 8,862,273 B2 | 10/2014 | Karr | |
| 8,879,761 B2 | 11/2014 | Johnson et al. | |
| 8,903,526 B2 | 12/2014 | Beckhardt et al. | |

(56) References Cited

U.S. PATENT DOCUMENTS

| | | |
|---|---|---|
| 8,914,559 B2 | 12/2014 | Kalayjian et al. |
| 8,930,005 B2 | 1/2015 | Reimann et al. |
| 8,934,647 B2 | 1/2015 | Joyce et al. |
| 8,934,655 B2 | 1/2015 | Breen et al. |
| 8,942,252 B2 | 1/2015 | Balassanian et al. |
| 8,965,033 B2 | 2/2015 | Wiggins |
| 8,965,546 B2 | 2/2015 | Visser et al. |
| 8,977,974 B2 | 3/2015 | Kraut |
| 8,984,442 B2 | 3/2015 | Pirnack et al. |
| 8,989,406 B2 | 3/2015 | Wong et al. |
| 8,995,687 B2 | 3/2015 | Marino, Jr. et al. |
| 8,996,370 B2 | 3/2015 | Ansell |
| 9,020,153 B2 | 4/2015 | Britt, Jr. |
| 9,021,153 B2 | 4/2015 | Lu |
| 9,065,929 B2 | 6/2015 | Chen et al. |
| 9,084,058 B2 | 7/2015 | Reilly et al. |
| 9,100,766 B2 | 8/2015 | Soulodre et al. |
| 9,106,192 B2 | 8/2015 | Sheen et al. |
| 9,179,233 B2 | 11/2015 | Kang |
| 9,215,545 B2 | 12/2015 | Dublin et al. |
| 9,219,460 B2 | 12/2015 | Bush |
| 9,231,545 B2 | 1/2016 | Agustin et al. |
| 9,286,384 B2 | 3/2016 | Kuper et al. |
| 9,288,597 B2 | 3/2016 | Carlsson et al. |
| 9,300,266 B2 | 3/2016 | Grokop |
| 9,319,816 B1 | 4/2016 | Narayanan |
| 9,451,377 B2 | 9/2016 | Massey et al. |
| 9,462,399 B2 | 10/2016 | Bharitkar et al. |
| 9,467,779 B2 | 10/2016 | Iyengar et al. |
| 9,472,201 B1 | 10/2016 | Sleator |
| 9,489,948 B1 | 11/2016 | Chu et al. |
| 9,524,098 B2 | 12/2016 | Griffiths et al. |
| 9,538,305 B2 | 1/2017 | Lehnert et al. |
| 9,538,308 B2 | 1/2017 | Isaac et al. |
| 9,560,449 B2 | 1/2017 | Carlsson et al. |
| 9,560,460 B2 | 1/2017 | Chaikin et al. |
| 9,609,383 B1 | 3/2017 | Hirst |
| 9,615,171 B1 | 4/2017 | O'Neill et al. |
| 9,648,422 B2 | 5/2017 | Sheen et al. |
| 9,674,625 B2 | 6/2017 | Armstrong-Muntner et al. |
| 9,678,708 B2 | 6/2017 | Bierbower et al. |
| 9,689,960 B1 | 6/2017 | Barton et al. |
| 9,690,271 B2 | 6/2017 | Sheen et al. |
| 9,690,539 B2 | 6/2017 | Sheen et al. |
| 9,706,323 B2 | 7/2017 | Sheen et al. |
| 9,715,365 B2 | 7/2017 | Kusano et al. |
| 9,723,420 B2 | 8/2017 | Family et al. |
| 9,736,584 B2 | 8/2017 | Sheen et al. |
| 9,743,207 B1 | 8/2017 | Hartung |
| 9,743,208 B2 | 8/2017 | Oishi et al. |
| 9,749,763 B2 | 8/2017 | Sheen |
| 9,763,018 B1 | 9/2017 | McPherson et al. |
| 9,781,532 B2 | 10/2017 | Sheen |
| 9,788,113 B2 | 10/2017 | Wilberding et al. |
| 9,860,662 B2 | 1/2018 | Jarvis et al. |
| 9,864,574 B2 | 1/2018 | Hartung et al. |
| 9,910,634 B2 | 3/2018 | Sheen et al. |
| 9,916,126 B2 | 3/2018 | Lang |
| 9,952,825 B2 | 4/2018 | Sheen |
| 9,984,703 B2 | 5/2018 | Ur et al. |
| 10,045,142 B2 | 8/2018 | McPherson et al. |
| 10,154,359 B2 | 12/2018 | Sheen |
| 10,206,052 B2 | 2/2019 | Perianu |
| 2001/0038702 A1 | 11/2001 | Lavoie et al. |
| 2001/0042107 A1 | 11/2001 | Palm |
| 2001/0043592 A1 | 11/2001 | Jimenez et al. |
| 2001/0053228 A1 | 12/2001 | Jones |
| 2002/0022453 A1 | 2/2002 | Balog et al. |
| 2002/0026442 A1 | 2/2002 | Lipscomb et al. |
| 2002/0078161 A1 | 6/2002 | Cheng |
| 2002/0089529 A1 | 7/2002 | Robbin |
| 2002/0124097 A1 | 9/2002 | Isely et al. |
| 2002/0126852 A1 | 9/2002 | Kashani et al. |
| 2002/0136414 A1 | 9/2002 | Jordan et al. |
| 2002/0146136 A1 | 10/2002 | Carter et al. |
| 2003/0002689 A1 | 1/2003 | Folio |
| 2003/0031334 A1 | 2/2003 | Layton et al. |
| 2003/0157951 A1 | 8/2003 | Hasty |
| 2003/0161479 A1 | 8/2003 | Yang et al. |
| 2003/0161492 A1 | 8/2003 | Miller et al. |
| 2003/0179891 A1 | 9/2003 | Rabinowitz et al. |
| 2003/0235311 A1 | 12/2003 | Grancea et al. |
| 2004/0024478 A1 | 2/2004 | Hans et al. |
| 2004/0131338 A1 | 7/2004 | Asada et al. |
| 2004/0237750 A1 | 12/2004 | Smith et al. |
| 2005/0031143 A1 | 2/2005 | Devantier et al. |
| 2005/0063554 A1 | 3/2005 | Devantier et al. |
| 2005/0147261 A1 | 7/2005 | Yeh |
| 2005/0157885 A1 | 7/2005 | Olney et al. |
| 2006/0008256 A1 | 1/2006 | Khedouri et al. |
| 2006/0026521 A1 | 2/2006 | Hotelling et al. |
| 2006/0032357 A1 | 2/2006 | Roovers et al. |
| 2006/0195480 A1 | 8/2006 | Spiegelman et al. |
| 2006/0225097 A1 | 10/2006 | Lawrence-Apfelbaum |
| 2007/0003067 A1 | 1/2007 | Gierl et al. |
| 2007/0025559 A1 | 2/2007 | Mihelich et al. |
| 2007/0032895 A1 | 2/2007 | Nackvi et al. |
| 2007/0038999 A1 | 2/2007 | Millington |
| 2007/0086597 A1 | 4/2007 | Kino |
| 2007/0116254 A1 | 5/2007 | Looney et al. |
| 2007/0121955 A1 | 5/2007 | Johnston et al. |
| 2007/0142944 A1 | 6/2007 | Goldberg et al. |
| 2008/0002839 A1 | 1/2008 | Eng |
| 2008/0014989 A1 | 1/2008 | Sandegard et al. |
| 2008/0065247 A1 | 3/2008 | Igoe |
| 2008/0069378 A1 | 3/2008 | Rabinowitz et al. |
| 2008/0077261 A1 | 3/2008 | Baudino et al. |
| 2008/0098027 A1 | 4/2008 | Aarts |
| 2008/0136623 A1 | 6/2008 | Calvarese |
| 2008/0144864 A1 | 6/2008 | Huon et al. |
| 2008/0175411 A1 | 7/2008 | Greve |
| 2008/0214160 A1 | 9/2008 | Jonsson |
| 2008/0232603 A1 | 9/2008 | Soulodre et al. |
| 2008/0266385 A1 | 10/2008 | Smith et al. |
| 2008/0281523 A1 | 11/2008 | Dahl et al. |
| 2009/0003613 A1 | 1/2009 | Christensen et al. |
| 2009/0024662 A1 | 1/2009 | Park et al. |
| 2009/0047993 A1 | 2/2009 | Vasa |
| 2009/0063274 A1 | 3/2009 | Dublin, III et al. |
| 2009/0110218 A1* | 4/2009 | Swain .................. H03G 5/165 381/300 |
| 2009/0138507 A1 | 5/2009 | Burckart et al. |
| 2009/0147134 A1 | 6/2009 | Iwamatsu |
| 2009/0175476 A1 | 7/2009 | Bottum |
| 2009/0180632 A1 | 7/2009 | Goldberg et al. |
| 2009/0196428 A1 | 8/2009 | Kim |
| 2009/0202082 A1 | 8/2009 | Bharitkar et al. |
| 2009/0252481 A1 | 10/2009 | Ekstrand |
| 2009/0304194 A1 | 12/2009 | Eggleston et al. |
| 2009/0304205 A1 | 12/2009 | Hardacker et al. |
| 2009/0316923 A1 | 12/2009 | Tashev et al. |
| 2010/0013550 A1 | 1/2010 | Tanaka |
| 2010/0095332 A1 | 4/2010 | Gran et al. |
| 2010/0128902 A1 | 5/2010 | Liu et al. |
| 2010/0135501 A1 | 6/2010 | Corbett et al. |
| 2010/0142735 A1 | 6/2010 | Yoon et al. |
| 2010/0146445 A1 | 6/2010 | Kraut |
| 2010/0162117 A1 | 6/2010 | Basso et al. |
| 2010/0189203 A1 | 7/2010 | Wilhelmsson et al. |
| 2010/0195846 A1 | 8/2010 | Yokoyama |
| 2010/0272270 A1 | 10/2010 | Chaikin et al. |
| 2010/0296659 A1 | 11/2010 | Tanaka |
| 2010/0303248 A1 | 12/2010 | Tawada |
| 2010/0303250 A1 | 12/2010 | Goldberg et al. |
| 2010/0323793 A1 | 12/2010 | Andall |
| 2011/0007904 A1 | 1/2011 | Tomoda et al. |
| 2011/0007905 A1 | 1/2011 | Sato et al. |
| 2011/0087842 A1 | 4/2011 | Lu et al. |
| 2011/0091055 A1 | 4/2011 | Leblanc |
| 2011/0135103 A1 | 6/2011 | Sun et al. |
| 2011/0150228 A1 | 6/2011 | Yoon et al. |
| 2011/0170710 A1 | 7/2011 | Son |
| 2011/0234480 A1 | 9/2011 | Fino et al. |
| 2011/0235808 A1 | 9/2011 | Kon |

(56) References Cited

U.S. PATENT DOCUMENTS

| | | |
|---|---|---|
| 2011/0268281 A1 | 11/2011 | Florencio et al. |
| 2012/0032928 A1 | 2/2012 | Alberth et al. |
| 2012/0051558 A1 | 3/2012 | Kim et al. |
| 2012/0057724 A1 | 3/2012 | Rabinowitz et al. |
| 2012/0063615 A1 | 3/2012 | Crockett et al. |
| 2012/0093320 A1 | 4/2012 | Flaks et al. |
| 2012/0127831 A1 | 5/2012 | Gicklhorn et al. |
| 2012/0140936 A1 | 6/2012 | Bonnick et al. |
| 2012/0148075 A1 | 6/2012 | Goh et al. |
| 2012/0183156 A1 | 7/2012 | Schlessinger et al. |
| 2012/0213391 A1 | 8/2012 | Usami et al. |
| 2012/0215530 A1 | 8/2012 | Harsch et al. |
| 2012/0237037 A1 | 9/2012 | Ninan et al. |
| 2012/0243697 A1 | 9/2012 | Frye et al. |
| 2012/0263325 A1 | 10/2012 | Freeman et al. |
| 2012/0268145 A1 | 10/2012 | Chandra et al. |
| 2012/0269356 A1 | 10/2012 | Sheerin et al. |
| 2012/0275613 A1 | 11/2012 | Soulodre et al. |
| 2012/0283593 A1 | 11/2012 | Searchfield et al. |
| 2012/0288124 A1 | 11/2012 | Fejzo et al. |
| 2013/0010970 A1 | 1/2013 | Hegarty et al. |
| 2013/0028443 A1 | 1/2013 | Pance et al. |
| 2013/0051572 A1 | 2/2013 | Goh et al. |
| 2013/0066453 A1 | 3/2013 | Seefeldt |
| 2013/0108055 A1 | 5/2013 | Hanna et al. |
| 2013/0129102 A1 | 5/2013 | Li et al. |
| 2013/0129122 A1 | 5/2013 | Johnson et al. |
| 2013/0166227 A1 | 6/2013 | Hermann et al. |
| 2013/0202131 A1 | 8/2013 | Kemmochi et al. |
| 2013/0211843 A1 | 8/2013 | Clarkson |
| 2013/0216071 A1 | 8/2013 | Maher et al. |
| 2013/0223642 A1 | 8/2013 | Warren et al. |
| 2013/0230175 A1 | 9/2013 | Bech et al. |
| 2013/0259254 A1 | 10/2013 | Xiang et al. |
| 2013/0279706 A1 | 10/2013 | Marti et al. |
| 2013/0305152 A1 | 11/2013 | Griffiths et al. |
| 2013/0315405 A1* | 11/2013 | Kanishima ............ H04R 29/00 381/58 |
| 2013/0329896 A1 | 12/2013 | Krishnaswamy et al. |
| 2013/0331970 A1 | 12/2013 | Beckhardt et al. |
| 2014/0003622 A1 | 1/2014 | Ikizyan et al. |
| 2014/0003623 A1 | 1/2014 | Lang |
| 2014/0003625 A1 | 1/2014 | Sheen et al. |
| 2014/0003626 A1 | 1/2014 | Holman et al. |
| 2014/0003635 A1 | 1/2014 | Mohammad et al. |
| 2014/0016784 A1 | 1/2014 | Sen et al. |
| 2014/0016786 A1 | 1/2014 | Sen |
| 2014/0016802 A1 | 1/2014 | Sen |
| 2014/0023196 A1 | 1/2014 | Xiang et al. |
| 2014/0029201 A1 | 1/2014 | Yang et al. |
| 2014/0032709 A1 | 1/2014 | Saussy et al. |
| 2014/0037097 A1 | 2/2014 | Labosco |
| 2014/0037107 A1 | 2/2014 | Marino, Jr. et al. |
| 2014/0052770 A1 | 2/2014 | Gran et al. |
| 2014/0064501 A1 | 3/2014 | Olsen et al. |
| 2014/0079242 A1 | 3/2014 | Nguyen et al. |
| 2014/0084014 A1 | 3/2014 | Sim et al. |
| 2014/0086423 A1 | 3/2014 | Domingo et al. |
| 2014/0112481 A1 | 4/2014 | Li et al. |
| 2014/0119551 A1 | 5/2014 | Bharitkar et al. |
| 2014/0126730 A1 | 5/2014 | Crawley et al. |
| 2014/0161265 A1 | 6/2014 | Chaikin et al. |
| 2014/0169569 A1 | 6/2014 | Toivanen et al. |
| 2014/0180684 A1 | 6/2014 | Strub |
| 2014/0192986 A1 | 7/2014 | Lee et al. |
| 2014/0219456 A1 | 8/2014 | Morrell et al. |
| 2014/0219483 A1 | 8/2014 | Hong |
| 2014/0226823 A1 | 8/2014 | Sen et al. |
| 2014/0242913 A1 | 8/2014 | Pang |
| 2014/0267148 A1 | 9/2014 | Luna et al. |
| 2014/0270202 A1 | 9/2014 | Ivanov et al. |
| 2014/0270282 A1* | 9/2014 | Tammi ................ H04S 7/308 381/300 |
| 2014/0273859 A1 | 9/2014 | Luna et al. |
| 2014/0279889 A1 | 9/2014 | Luna et al. |
| 2014/0285313 A1 | 9/2014 | Luna et al. |
| 2014/0286496 A1 | 9/2014 | Luna et al. |
| 2014/0294200 A1 | 10/2014 | Baumgarte et al. |
| 2014/0294201 A1* | 10/2014 | Johnson ................ H04S 7/301 381/107 |
| 2014/0310269 A1 | 10/2014 | Zhang et al. |
| 2014/0321670 A1 | 10/2014 | Nystrom et al. |
| 2014/0323036 A1 | 10/2014 | Daley et al. |
| 2014/0334644 A1 | 11/2014 | Selig et al. |
| 2014/0341399 A1 | 11/2014 | Dusse |
| 2014/0344689 A1 | 11/2014 | Scott et al. |
| 2014/0355768 A1 | 12/2014 | Sen et al. |
| 2014/0355794 A1 | 12/2014 | Morrell et al. |
| 2015/0011195 A1 | 1/2015 | Li |
| 2015/0016642 A1 | 1/2015 | Walsh et al. |
| 2015/0023509 A1 | 1/2015 | Devantier et al. |
| 2015/0031287 A1 | 1/2015 | Pang et al. |
| 2015/0032844 A1 | 1/2015 | Tarr et al. |
| 2015/0036847 A1 | 2/2015 | Donaldson |
| 2015/0036848 A1 | 2/2015 | Donaldson |
| 2015/0043736 A1 | 2/2015 | Olsen et al. |
| 2015/0063610 A1 | 3/2015 | Mossner |
| 2015/0078586 A1 | 3/2015 | Ang et al. |
| 2015/0078596 A1 | 3/2015 | Sprogis et al. |
| 2015/0100991 A1 | 4/2015 | Risberg et al. |
| 2015/0146886 A1 | 5/2015 | Baumgarte |
| 2015/0149943 A1 | 5/2015 | Nguyen et al. |
| 2015/0161360 A1 | 6/2015 | Paruchuri et al. |
| 2015/0195666 A1 | 7/2015 | Massey et al. |
| 2015/0201274 A1 | 7/2015 | Ellner et al. |
| 2015/0208184 A1 | 7/2015 | Tan et al. |
| 2015/0220558 A1 | 8/2015 | Snibbe et al. |
| 2015/0223002 A1 | 8/2015 | Mehta et al. |
| 2015/0229699 A1 | 8/2015 | Liu |
| 2015/0260754 A1 | 9/2015 | Perotti et al. |
| 2015/0271616 A1 | 9/2015 | Kechichian et al. |
| 2015/0281866 A1 | 10/2015 | Williams et al. |
| 2015/0289064 A1 | 10/2015 | Jensen et al. |
| 2015/0358756 A1 | 12/2015 | Harma et al. |
| 2015/0382128 A1 | 12/2015 | Ridihalgh et al. |
| 2016/0007116 A1 | 1/2016 | Holman |
| 2016/0011850 A1 | 1/2016 | Sheen et al. |
| 2016/0014509 A1 | 1/2016 | Hansson et al. |
| 2016/0014536 A1 | 1/2016 | Sheen |
| 2016/0021458 A1 | 1/2016 | Johnson et al. |
| 2016/0021473 A1* | 1/2016 | Riggi .................... H04R 3/00 381/59 |
| 2016/0021481 A1 | 1/2016 | Johnson et al. |
| 2016/0027467 A1 | 1/2016 | Proud |
| 2016/0029142 A1 | 1/2016 | Isaac et al. |
| 2016/0035337 A1 | 2/2016 | Aggarwal et al. |
| 2016/0036881 A1 | 2/2016 | Tembey et al. |
| 2016/0037277 A1 | 2/2016 | Matsumoto et al. |
| 2016/0061597 A1 | 3/2016 | De et al. |
| 2016/0073210 A1 | 3/2016 | Sheen |
| 2016/0088438 A1 | 3/2016 | O'Keeffe |
| 2016/0119730 A1 | 4/2016 | Virtanen |
| 2016/0140969 A1 | 5/2016 | Srinivasan et al. |
| 2016/0165297 A1 | 6/2016 | Jamal-Syed et al. |
| 2016/0192098 A1 | 6/2016 | Oishi et al. |
| 2016/0192099 A1 | 6/2016 | Oishi et al. |
| 2016/0212535 A1 | 7/2016 | Le et al. |
| 2016/0239255 A1 | 8/2016 | Chavez et al. |
| 2016/0260140 A1 | 9/2016 | Shirley et al. |
| 2016/0309276 A1 | 10/2016 | Ridihalgh et al. |
| 2016/0330562 A1 | 11/2016 | Crockett |
| 2016/0366517 A1 | 12/2016 | Chandran et al. |
| 2017/0069338 A1 | 3/2017 | Elliot et al. |
| 2017/0083279 A1 | 3/2017 | Sheen et al. |
| 2017/0086003 A1 | 3/2017 | Rabinowitz et al. |
| 2017/0105084 A1 | 4/2017 | Holman |
| 2017/0142532 A1 | 5/2017 | Pan |
| 2017/0207762 A1 | 7/2017 | Porter et al. |
| 2017/0223447 A1 | 8/2017 | Johnson et al. |
| 2017/0230772 A1 | 8/2017 | Johnson et al. |
| 2017/0257722 A1 | 9/2017 | Kerdranvat et al. |
| 2017/0280265 A1 | 9/2017 | Po |
| 2017/0303039 A1 | 10/2017 | Iyer et al. |

(56) References Cited

U.S. PATENT DOCUMENTS

| | | |
|---|---|---|
| 2017/0311108 A1 | 10/2017 | Patel et al. |
| 2017/0374482 A1 | 12/2017 | McPherson et al. |
| 2019/0037328 A1 | 1/2019 | McPherson et al. |

FOREIGN PATENT DOCUMENTS

| | | | |
|---|---|---|---|
| CN | 101491116 | A | 7/2009 |
| CN | 102318325 | A | 1/2012 |
| CN | 102893633 | A | 1/2013 |
| CN | 103988523 | A | 8/2014 |
| CN | 105163221 | A | 12/2015 |
| EP | 0505949 | A1 | 9/1992 |
| EP | 0772374 | A2 | 5/1997 |
| EP | 1133896 | B1 | 8/2002 |
| EP | 1349427 | A2 | 10/2003 |
| EP | 1389853 | A1 | 2/2004 |
| EP | 2043381 | A2 | 4/2009 |
| EP | 1349427 | B1 | 12/2009 |
| EP | 2161950 | A2 | 3/2010 |
| EP | 2194471 | A1 | 6/2010 |
| EP | 2197220 | A2 | 6/2010 |
| EP | 2429155 | A1 | 3/2012 |
| EP | 1825713 | B1 | 10/2012 |
| EP | 2613573 | A1 | 7/2013 |
| EP | 2591617 | B1 | 6/2014 |
| EP | 2835989 | A2 | 2/2015 |
| EP | 2860992 | A1 | 4/2015 |
| EP | 3128767 | A2 | 2/2017 |
| EP | 2974382 | B1 | 4/2017 |
| JP | H02280199 | A | 11/1990 |
| JP | H05199593 | A | 8/1993 |
| JP | H05211700 | A | 8/1993 |
| JP | H06327089 | A | 11/1994 |
| JP | H0723490 | A | 1/1995 |
| JP | H1069280 | A | 3/1998 |
| JP | 2002502193 | A | 1/2002 |
| JP | 2003143252 | A | 5/2003 |
| JP | 2003304590 | A | 10/2003 |
| JP | 2005086686 | A | 3/2005 |
| JP | 2005538633 | A | 12/2005 |
| JP | 2006017893 | A | 1/2006 |
| JP | 2006180039 | A | 7/2006 |
| JP | 2007068125 | A | 3/2007 |
| JP | 2007271802 | A | 10/2007 |
| JP | 2008228133 | A | 9/2008 |
| JP | 2009188474 | A | 8/2009 |
| JP | 2010081124 | A | 4/2010 |
| JP | 2011123376 | A | 6/2011 |
| JP | 2011164166 | A | 8/2011 |
| JP | 2011217068 | A | 10/2011 |
| JP | 2013253884 | A | 12/2013 |
| KR | 1020060116383 | | 11/2006 |
| KR | 1020080011831 | | 2/2008 |
| WO | 200153994 | | 7/2001 |
| WO | 0182650 | A2 | 11/2001 |
| WO | 200182650 | | 11/2001 |
| WO | 2003093950 | A2 | 11/2003 |
| WO | 2004066673 | A1 | 8/2004 |
| WO | 2007016465 | A2 | 2/2007 |
| WO | 2011139502 | A1 | 11/2011 |
| WO | 2013016500 | A1 | 1/2013 |
| WO | 2014032709 | | 3/2014 |
| WO | 2014032709 | A1 | 3/2014 |
| WO | 2014036121 | A1 | 3/2014 |
| WO | 2015024881 | A1 | 2/2015 |
| WO | 2015108794 | A1 | 7/2015 |
| WO | 2015178950 | A1 | 11/2015 |
| WO | 2016040324 | A1 | 3/2016 |
| WO | 2017049169 | A1 | 3/2017 |

OTHER PUBLICATIONS

Notice of Allowance dated May 8, 2018, issued in connection with U.S. Appl. No. 15/650,386, filed Jul. 14, 2017, 13 pages.
Notice of Allowance dated May 9, 2019, issued in connection with U.S. Appl. No. 15/996,878, filed Jun. 4, 2018, 7 pages.
Notice of Allowance dated Apr. 19, 2017, issued in connection with U.S. Appl. No. 14/481,511, filed Sep. 9, 2014, 10 pages.
Palm, Inc., "Handbook for the Palm VII Handheld," May 2000, 311 pages.
Papp Istvan et al. "Adaptive Microphone Array for Unknown Desired Speaker's Transfer Function", The Journal of the Acoustical Society of America, American Institute of Physics for the Acoustical Society of America, New York, NY vol. 122, No. 2, Jul. 19, 2007, pp. 44-49.
Pre-Brief Appeal Conference Decision mailed on Mar. 19, 2019, issued in connection with U.S. Appl. No. 15/806,126, filed Nov. 7, 2017, 2 pages.
Preinterview First Office Action dated Oct. 6, 2016, issued in connection with U.S. Appl. No. 14/726,921, filed Jun. 1, 2015, 6 pages.
Preinterview First Office Action dated Jul. 12, 2017, issued in connection with U.S. Appl. No. 14/793,205, filed Jul. 7, 2015, 5 pages.
Preinterview First Office Action dated May 17, 2016, issued in connection with U.S. Appl. No. 14/481505, filed Sep. 9, 2014, 7 pages.
Preinterview First Office Action dated May 25, 2016, issued in connection with U.S. Appl. No. 14/481,514, filed Sep. 9, 2014, 7 pages.
Presentations at WinHEC 2000, May 2000, 138 pages.
PRISMIQ, Inc., "PRISMIQ Media Player User Guide," 2003, 44 pages.
Ross, Alex, "Wizards of Sound: Retouching acoustics, from the restaurant to the concert hall," The New Yorker, Feb. 23, 2015. Web. Feb. 26, 2015, 9 pages.
Supplemental Notice of Allowability dated Oct. 27, 2016, issued in connection with U.S. Appl. No. 14/481,511, filed Sep. 9, 2014, 6 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Wikipedia, Server(Computing) https://web.archive.org/web/20160703173710/https://en.wikipedia.org/wiki/Server_(computing), published Jul. 3, 2016, 7 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Searching Authority, International Search Report and Written Opinion dated Nov. 23, 2015, issued in connection with International Application No. PCT/US2015/048944, filed on Sep. 8, 2015, 12 pages.
International Searching Authority, International Search Report and Written Opinion dated Nov. 23, 2016, issued in connection with International Patent Application No. PCT/US2016/052266, filed on Sep. 16, 2016, 11 pages.
International Searching Authority, International Search Report and Written Opinion dated Jan. 24, 2017, issued in connection with International Application No. PCT/US2016/052264, filed on Sep. 16, 2016, 17 pages.
International Searching Authority, International Search Report and Written Opinion dated Oct. 25, 2016, issued in connection with International Application No. PCT/US2016/043109, filed on Jul. 20, 2016, 12 pages.
International Searching Authority, International Search Report and Written Opinion dated Sep. 25, 2017, issued in connection with International Application No. PCT/US2017/042191, filed on Jul. 14, 2017, 16 pages.

(56) References Cited

OTHER PUBLICATIONS

International Searching Authority, International Search Report and Written Opinion dated Aug. 3, 2017, in connection with International Application No. PCT/US2017014596, 20 pages.
Japanese Patent Office, English Translation of Office Action dated May 8, 2018, issued in connection with Japanese Application No. 2017-513241, 4 pages.
Japanese Patent Office, Japanese Office Action dated Oct. 3, 2017, issued in connection with Japanese Application No. 2017-501082, 7 pages.
Japanese Patent Office, Non-Final Office Action with Translation dated Apr. 25, 2017, issued in connection with Japanese Patent Application No. 2016-568888, 7 pages.
Japanese Patent Office, Non-Final Office Action with Translation dated Oct. 3, 2017, issued in connection with Japanese Patent Application No. 2017-501082, 3 pages.
Japanese Patent Office, Office Action dated Jun. 12, 2018, issued in connection with Japanese Application No. 2018-502729, 4 pages.
Japanese Patent Office, Office Action dated May 14, 2019, issued in connection with Japanese Patent Application No. 2018-500529, 8 pages.
Japanese Patent Office, Office Action dated Aug. 21, 2018, issued in connection with Japanese Application No. 2018-514418, 7 pages.
Japanese Patent Office, Office Action dated Jul. 24, 2018, issued in connection with Japanese Application No. 2018-514419, 5 pages.
Japanese Patent Office, Office Action dated Jun. 4, 2019, issued in connection with Japanese Patent Application No. 2018-112810, 4 pages.
Japanese Patent Office, Office Action dated May 8, 2018, issued in connection with Japanese Application No. 2017-513241, 8 pages.
Japanese Patent Office, Office Action with English Summary dated Jul. 18, 2017, issued in connection with Japanese Patent Application No. 2017-513171, 4 pages.
Japanese Patent Office, Translation of Office Action dated May 14, 2019, issued in connection with Japanese Patent Application No. 2018-500529, 5 pages.
Jo et al., "Synchronized One-to-many Media Streaming with Adaptive Playout Control," Proceedings of SPIE, 2002, pp. 71-82, vol. 4861.
John Mark and Paul Hufnagel "What is 1451.4, what are its uses and how does it work?" IEEE Standards Association, The IEEE 1451.4 Standard for Smart Transducers, 14pages.
Jones, Stephen, "Dell Digital Audio Receiver: Digital upgrade for your analog stereo," Analog Stereo, Jun. 24, 2000 retrieved Jun. 18, 2014, 2 pages.
"AuEQ for the iPhone," Mar. 25, 2015, retrieved from the internet: URL:https://web.archive.org/web20150325152629/http://www.hotto.de/mobileapps/iphoneaueq.html [retrieved on Jun. 24, 2016], 6 pages.
Louderback, Jim, "Affordable Audio Receiver Furnishes Homes With MP3," TechTV Vault. Jun. 28, 2000 retrieved Jul. 10, 2014, 2 pages.
Microsoft Corporation, "Using Microsoft Outlook 2003," Cambridge College, 2003.
Motorola, "Simplefi, Wireless Digital Audio Receiver, Installation and User Guide," Dec. 31, 2001, 111 pages.
Mulcahy, John, "Room EQ Wizard: Room Acoustics Software," REW, 2014, retrieved Oct. 10, 2014, 4 pages.
Non-Final Action dated Jan. 29, 2016, issued in connection with U.S. Appl. No. 14/481,511, filed Sep. 9, 2014, 10 pages.
Non-Final Office Action dated Mar. 1, 2017, issued in connection with U.S. Appl. No. 15/344,069, filed Nov. 4, 2016, 20 pages.
Non-Final Office Action dated Nov. 1, 2017, issued in connection with U.S. Appl. No. 15/235,598, filed Aug. 12, 2016, 15 pages.
Non-Final Office Action dated Jun. 2, 2014, issued in connection with U.S. Appl. No. 13/340,126, filed Dec. 29, 2011, 14 pages.
Non-Final Office Action dated Jun. 2, 2017, issued in connection with U.S. Appl. No. 15/229,693, filed Aug. 5, 2016, 18 pages.
Non-Final Office Action dated Nov. 2, 2017, issued in connection with U.S. Appl. No. 15/166,241, filed May 26, 2016, 12 pages.
Non-Final Office Action dated Oct. 2, 2017, issued in connection with U.S. Appl. No. 15/005,853, filed Jan. 25, 2016, 8 pages.
Non-Final Office Action dated Feb. 3, 2016, issued in connection with U.S. Appl. No. 14/481,522, filed Sep. 9, 2014, 12 pages.
Non-Final Office Action dated Jul. 3, 2018, issued in connection with U.S. Appl. No. 15/909,327, filed Mar. 1, 2018, 30 pages.
Non-Final Office Action dated Jan. 4, 2017, issued in connection with U.S. Appl. No. 15/207,682, filed Jul. 12, 2016, 6 pages.
Non-Final Office Action dated Nov. 4, 2016, issued in connection with U.S. Appl. No. 14/826,856, filed Aug. 14, 2015, 10 pages.
Non-Final Office Action dated Sep. 4, 2019, issued in connection with U.S. Appl. No. 16/213,552, filed Dec. 7, 2018, 16 pages.
Non-Final Office Action dated Jul. 5, 2017, issued in connection with U.S. Appl. No. 14/481,522, filed Sep. 9, 2014, 8 pages.
Non-Final Office Action dated Jul. 6, 2016, issued in connection with U.S. Appl. No. 15/070,160, filed Mar. 14, 2016, 6 pages.
Non-Final Office Action dated Oct. 6, 2016, issued in connection with U.S. Appl. No. 14/678,263, filed Apr. 3, 2015, 30 pages.
Non-Final Office Action dated Jun. 6, 2018, issued in connection with U.S. Appl. No. 15/005,496, filed Jan. 25, 2016, 16 pages.
Non-Final Office Action dated Dec. 7, 2015, issued in connection with U.S. Appl. No. 14/921,762, filed Oct. 23, 2015, 5 pages.
Non-Final Office Action dated Jul. 7, 2016, issued in connection with U.S. Appl. No. 15/066,049, filed Mar. 10, 2016, 6 pages.
Non-Final Office Action dated Mar. 7, 2017, issued in connection with U.S. Appl. No. 14/481,514, filed Sep. 9, 2014, 24 pages.
Non-Final Office Action dated Sep. 7, 2016, issued in connection with U.S. Appl. No. 14/826,873, filed Aug. 14, 2015, 12 pages.
Non-Final Office Action dated Jul. 8, 2016, issued in connection with U.S. Appl. No. 15/066,072, filed Mar. 10, 2016, 6 pages.
Non-Final Office Action dated Dec. 9, 2016, issued in connection with U.S. Appl. No. 14/678,248, filed Apr. 3, 2015, 22 pages.
Non-Final Office Action dated Apr. 10, 2018, issued in connection with U.S. Appl. No. 15/909,529, filed Mar. 1, 2018, 8 pages.
Non-Final Office Action dated Mar. 10, 2017, issued in connection with U.S. Appl. No. 14/997,868, filed Jan. 18, 2016, 10 pages.
Notice of Allowance dated Jun. 21, 2019, issued in connection with U.S. Appl. No. 15/235,598, filed Aug. 12, 2016, 11 pages.
Notice of Allowance dated Oct. 21, 2019, issued in connection with U.S. Appl. No. 16/182,886, filed Nov. 7, 2018, 10 pages.
Notice of Allowance dated Jun. 22, 2017, issued in connection with U.S. Appl. No. 14/644,136, filed Mar. 10, 2015, 12 pages.
Notice of Allowance dated Aug. 23, 2018, issued in connection with U.S. Appl. No. 15/909,529, filed Mar. 1, 2018, 8 pages.
Notice of Allowance dated Jun. 23, 2016, issued in connection with U.S. Appl. No. 14/921,781, filed Oct. 23, 2015, 8 pages.
Notice of Allowance dated May 23, 2018, issued in connection with U.S. Appl. No. 15/698,283, filed Sep. 7, 2017, 8 pages.
Notice of Allowance dated Oct. 23, 2017, issued in connection with U.S. Appl. No. 14/481,522, filed Sep. 9, 2014, 16 pages.
Notice of Allowance dated Sep. 23, 2016, issued in connection with U.S. Appl. No. 15/070,160, filed Mar. 15, 2016, 7 pages.
Notice of Allowance dated Jul. 24, 2019, issued in connection with U.S. Appl. No. 15/229,693, filed Aug. 5, 2016, 13 pages.
Notice of Allowance dated May 24, 2017, issued in connection with U.S. Appl. No. 14/997,868, filed Jan. 18, 2016, 5 pages.
Notice of Allowance dated Nov. 24, 2017, issued in connection with U.S. Appl. No. 15/681,640, filed Aug. 21, 2017, 8 pages.
Notice of Allowance dated Apr. 25, 2017, issued in connection with U.S. Appl. No. 14/696,014, filed Apr. 24, 2015, 7 pages.
Notice of Allowance dated Apr. 25, 2017, issued in connection with U.S. Appl. No. 15/207,682, filed Jul. 12, 2016, 7 pages.
Notice of Allowance dated Apr. 25, 2019, issued in connection with U.S. Appl. No. 15/806,126, filed Nov. 7, 2017, 8 pages.
Notice of Allowance dated Oct. 25, 2016, issued in connection with U.S. Appl. No. 14/826,873, filed Aug. 14, 2015, 5 pages.
Notice of Allowance dated Feb. 26, 2016, issued in connection with U.S. Appl. No. 14/921,762, filed Oct. 23, 2015, 7 pages.
Notice of Allowance dated Jul. 26, 2016, issued in connection with U.S. Appl. No. 14/481,511, filed Sep. 9, 2014, 12 pages.
Notice of Allowance dated Oct. 26, 2016, issued in connection with U.S. Appl. No. 14/811,587, filed Jul. 28, 2015, 11 pages.

(56) References Cited

OTHER PUBLICATIONS

Notice of Allowance dated Feb. 27, 2017, issued in connection with U.S. Appl. No. 14/805,340, filed Jul. 21, 2015, 9 pages.
Notice of Allowance dated Jul. 27, 2017, issued in connection with U.S. Appl. No. 15/005,853, filed Jan. 25, 2016, 5 pages.
Notice of Allowance dated Jun. 27, 2017, issued in connection with U.S. Appl. No. 15/344,069, filed Nov. 4, 2016, 8 pages.
Notice of Allowance dated Aug. 28, 2017, issued in connection with U.S. Appl. No. 15/089,004, filed Apr. 1, 2016, 5 pages.
Notice of Allowance dated Jul. 28, 2017, issued in connection with U.S. Appl. No. 14/678,263, filed Apr. 3, 2015, 10 pages.
Notice of Allowance dated Jul. 28, 2017, issued in connection with U.S. Appl. No. 15/211,822, filed Jul. 15, 2016, 9 pages.
Notice of Allowance dated Mar. 28, 2018, issued in connection with U.S. Appl. No. 15/673,170, filed Aug. 9, 2017, 5 pages.
Notice of Allowance dated Aug. 29, 2018, issued in connection with U.S. Appl. No. 15/357,520, filed Nov. 21, 2016, 11 pages.
Notice of Allowance dated Aug. 29, 2018, issued in connection with U.S. Appl. No. 15/718,556, filed Sep. 28, 2017, 8 pages.
Notice of Allowance dated Aug. 29, 2019, issued in connection with U.S. Appl. No. 16/185,906, filed Nov. 9, 2018, 8 pages.
Notice of Allowance dated Dec. 29, 2017, issued in connection with U.S. Appl. No. 14/793,205, filed Jul. 7, 2015, 5 pages.
Notice of Allowance dated Jul. 29, 2016, issued in connection with U.S. Appl. No. 14/481,522, filed Sep. 9, 2014, 11 pages.
Notice of Allowance dated Oct. 29, 2015, issued in connection with U.S. Appl. No. 14/216,306, filed Mar. 17, 2014, 9 pages.
Notice of Allowance dated May 3, 2019, issued in connection with U.S. Appl. No. 15/217,399, filed Jul. 22, 2016, 7 pages.
Notice of Allowance dated May 3, 2019, issued in connection with U.S. Appl. No. 16/181,583, filed Nov. 6, 2018, 7 pages.
Notice of Allowance dated Aug. 30, 2017, issued in connection with U.S. Appl. No. 15/088,994, filed Apr. 1, 2016, 10 pages.
Notice of Allowance dated Dec. 30, 2016, issued in connection with U.S. Appl. No. 14/696,014, filed Apr. 24, 2015, 13 pages.
Notice of Allowance dated Jan. 30, 2017, issued in connection with U.S. Appl. No. 15/339,260, filed Oct. 31, 2016, 8 pages.
Notice of Allowance dated Aug. 31, 2018, issued in connection with U.S. Appl. No. 15/872,979, filed Jan. 16, 2018, 7 pages.
Notice of Allowance dated Aug. 31, 2018, issued in connection with U.S. Appl. No. 16/055,884, filed Aug. 6, 2018, 8 pages.
Notice of Allowance dated Apr. 4, 2017, issued in connection with U.S. Appl. No. 14/682,182, filed Apr. 9, 2015, 8 pages.
Notice of Allowance dated Feb. 4, 2019, issued in connection with U.S. Appl. No. 15/166,241, filed Aug. 26, 2016, 8 pages.
Notice of Allowance dated Feb. 4, 2019, issued in connection with U.S. Appl. No. 16/181,583, filed Nov. 6, 2018, 9 pages.
Notice of Allowance dated Oct. 4, 2018, issued in connection with U.S. Appl. No. 15/166,241, filed May 26, 2016, 7 pages.
Notice of Allowance dated Apr. 5, 2018, issued in connection with U.S. Appl. No. 15/681,640, filed Aug. 21, 2017, 8 pages.
Notice of Allowance dated Jun. 5, 2019, issued in connection with U.S. Appl. No. 15/859,311, filed Dec. 29, 2017, 8 pages.
Notice of Allowance dated Jun. 5, 2019, issued in connection with U.S. Appl. No. 15/865,221, filed Jan. 8, 2018, 8 pages.
Notice of Allowance dated Mar. 5, 2018, issued in connection with U.S. Appl. No. 16/102,499, filed Aug. 13, 2018, 8 pages.
Notice of Allowance dated May 5, 2017, issued in connection with U.S. Appl. No. 14/826,873, filed Aug. 14, 2015, 5 pages.
Notice of Allowance dated Oct. 5, 2018, issued in connection with U.S. Appl. No. 16/115,524, filed Aug. 28, 2018, 10 pages.
Notice of Allowance dated Feb. 6, 2019, issued in connection with U.S. Appl. No. 15/996,878, filed Jun. 4, 2018, 8 pages.
Notice of Allowance dated Apr. 8, 2019, issued in connection with U.S. Appl. No. 16/011,402, filed Jun. 18, 2018, 8 pages.
European Patent Office, Extended Search Report dated Apr. 26, 2017, issued in connection with European Application No. 15765548.1, 10 pages.
European Patent Office, Office Action dated Nov. 12, 2018, issued in connection with European Application No. 17000460.0, 6 pages.
European Patent Office, Office Action dated Jun. 13, 2017, issued in connection with European patent application No. 17000484.0, 10 pages.
European Patent Office, Office Action dated Dec. 15, 2016, issued in connection with European Application No. 15766998.7, 7 pages.
European Patent Office, Summons to Attend Oral Proceedings dated Nov. 15, 2018, issued in connection with European Application No. 16748186.0, 57 pages.
European Patent Office, Summons to Attend Oral Proceedings dated Sep. 24, 2019, issued in connection with European Application No. 17000460.0, 5 pages.
Ex Parte Quayle Office Action dated Apr. 15, 2019, issued in connection with U.S. Appl. No. 15/235,598, filed Aug. 12, 2016, 7 pages.
Final Office Action dated Apr. 3, 2017, issued in connection with U.S. Appl. No. 14/678,248, filed Apr. 3, 2015, 22 pages.
Final Office Action dated Jul. 13, 2017, issued in connection with U.S. Appl. No. 14/726,921, filed Jun. 1, 2015, 10 pages.
Final Office Action dated Jun. 13, 2017, issued in connection with U.S. Appl. No. 14/481,505, filed Sep. 9, 2014, 22 pages.
Final Office Action dated Feb. 14, 2019, issued in connection with U.S. Appl. No. 15/005,496, filed Jan. 25, 2016, 16 pages.
Final Office Action dated Feb. 14, 2019, issued in connection with U.S. Appl. No. 15/217,399, filed Jul. 22, 2016, 37 pages.
Final Office Action dated Oct. 14, 2016, issued in connection with U.S. Appl. No. 14/682,182, filed Apr. 9, 2015, 16 pages.
Final Office Action dated Oct. 17, 2016, issued in connection with U.S. Appl. No. 14/678,248, filed Apr. 3, 2015, 22 pages.
Final Office Action dated Apr. 18, 2017, issued in connection with U.S. Appl. No. 14/678,263, filed Apr. 3, 2015, 16 pages.
Final Office Action dated Apr. 18, 2018, issued in connection with U.S. Appl. No. 15/056,553 filed Feb. 29, 2016, 8 pages.
Final Office Action dated Dec. 18, 2014, issued in connection with U.S. Appl. No. 13/340,126, filed Dec. 29, 2011, 12 pages.
Final Office Action dated Jan. 19, 2017, issued in connection with U.S. Appl. No. 14/940,779, filed Nov. 13, 2015, 15 pages.
Final Office Action dated Apr. 2, 2018, issued in connection with U.S. Appl. No. 15/166,241, filed May 26, 2016, 14 pages.
Final Office Action dated Oct. 21, 2016, issued in connection with U.S. Appl. No. 14/696,014, filed Apr. 24, 2015, 13 pages.
Final Office Action dated Jan. 25, 2018, issued in connection with U.S. Appl. No. 15/005,496, filed Jan. 25, 2016, 17 pages.
Final Office Action dated Mar. 25, 2019, issued in connection with U.S. Appl. No. 15/856,791, filed Dec. 28, 2017, 11 pages.
Final Office Action dated Oct. 28, 2019, issued in connection with U.S. Appl. No. 16/181,865, filed Nov. 6, 2018, 17 pages.
Final Office Action dated Apr. 3, 2018, issued in connection with U.S. Appl. No. 15/235,598, filed Aug. 12, 2016, 12 pages.
Final Office Action dated Feb. 5, 2018, issued in connection with U.S. Appl. No. 15/229,693, filed Aug. 5, 2016, 21 pages.
Final Office Action dated Mar. 5, 2019, issued in connection with U.S. Appl. No. 15/056,553, filed Feb. 29, 2016, 9 pages.
Final Office Action dated Dec. 6, 2018, issued in connection with U.S. Appl. No. 15/806,126, filed Nov. 7, 2017, 18 pages.
Final Office Action dated Apr. 9, 2019, issued in connection with U.S. Appl. No. 15/229,693, filed Aug. 5, 2016, 33 pages.
First Action Interview Office Action dated Mar. 3, 2017, issued in connection with U.S. Appl. No. 14/726,921, filed Jun. 1, 2015, 9 pages.
First Action Interview Office Action dated Jul. 12, 2016, issued in connection with U.S. Appl. No. 14/481,514, filed Sep. 9, 2014, 10 pages.
First Action Interview Office Action dated Jun. 30, 2016, issued in connection with U.S. Appl. No. 14/481,505, filed Sep. 9, 2014, 9 pages.
First Action Interview Pilot Program Pre-Interview Communication dated Apr. 5, 2017, issued in connection with U.S. Appl. No. 14/793,190, filed Jul. 7, 2015, 4 pages.
First Action Interview Pilot Program Pre-Interview Communication dated Oct. 7, 2015, issued in connection with U.S. Appl. No. 14/216,306, filed Mar. 17, 2014, 5 pages.

(56) References Cited

OTHER PUBLICATIONS

First Action Interview Pilot Program Pre-Interview Communication dated Feb. 16, 2016, issued in connection with U.S. Appl. No. 14/681,465, filed Apr. 8, 2015, 5 pages.
Gonzalez et al., "Simultaneous Measurement of Multichannel Acoustic Systems," J. Audio Eng. Soc., 2004, pp. 26-42, vol. 52, No. 1/2.
International Bureau, International Preliminary Report on Patentability, dated Sep. 24, 2015, issued in connection with International Application No. PCT/US2014/030560, filed on Mar. 17, 2014, 7 pages.
International Bureau, International Preliminary Report on Patentability dated Sep. 29, 2016, issued in connection with International Application No. PCT/US2015/020993, filed on Mar. 17, 2015, 8 pages.
International Bureau, International Preliminary Report on Patentability dated Sep. 29, 2016, issued in connection with International Application No. PCT/US2015/021000, filed on Mar. 17, 2015, 9 pages.
International Bureau, International Preliminary Report on Patentability, dated Aug. 9, 2018, issued in connection with International Application No. PCT/US2017/014596, filed Jan. 23, 2017, 11 pages.
International Searching Authority, International Preliminary Report on Patentability dated Mar. 23, 2017, issued in connection with International Patent Application No. PCT/US2015/048944, filed on Sep. 8, 2015, 8 pages.
International Searching Authority, International Preliminary Report on Patentability dated Oct. 24, 2017, issued in connection with International Application No. PCT/US2016/028994 filed on Apr. 22, 2016, 7 pages.
International Searching Authority, International Search Report and Written Opinion dated Jul. 4, 2016, issued in connection with International Application No. PCT/US2016/028994, filed on Apr. 22, 2016, 12 pages.
International Searching Authority, International Search Report and Written Opinion dated Jul. 5, 2016, issued in connection with International Application No. PCT/US2016/028997, filed on Apr. 22, 2016, 13 pages.
International Searching Authority, International Search Report and Written Opinion dated Jun. 5, 2015, issued in connection with International Application No. PCT/US2015/021000, filed on Mar. 17, 2015, 12 pages.
International Searching Authority, International Search Report and Written Opinion dated Oct. 12, 2016, issued in connection with International Application No. PCT/US2016/041179 filed on Jul. 6, 2016, 9 pages.
International Searching Authority, International Search Report and Written Opinion dated Jun. 16, 2015, issued in connection with International Application No. PCT/US2015/020993, filed on Mar. 17, 2015, 11 pages.
International Searching Authority, International Search Report and Written Opinion dated Nov. 18, 2015, issued in connection with International Application No. PCT/US2015/048954, filed on Sep. 8, 2015, 11 pages.
International Searching Authority, International Search Report and Written Opinion dated Oct. 18, 2016, issued in connection with International Application No. PCT/US2016/043116, filed on Jul. 20, 2016, 14 pages.
International Searching Authority, International Search Report and Written Opinion dated Oct. 18, 2016, issued in connection with International Application No. PCT/US2016/043840, filed on Jul. 25, 2016, 14 pages.
International Searching Authority, International Search Report and Written Opinion dated Nov. 23, 2015, issued in connection with International Application No. PCT/US2015/048942, filed on Sep. 8, 2015, 14 pages.
Non-Final Office Action dated Sep. 10, 2018, issued in connection with U.S. Appl. No. 15/056,553, filed Feb. 29, 2016, 8 pages.
Non-Final Office Action dated Apr. 11, 2017, issued in connection with U.S. Appl. No. 15/088,994, filed Apr. 1, 2016, 13 pages.
Non-Final Office Action dated Apr. 11, 2017, issued in connection with U.S. Appl. No. 15/089,004, filed Apr. 1, 2016, 9 pages.
Non-Final Office Action dated Oct. 11, 2017, issued in connection with U.S. Appl. No. 15/480,265, filed Apr. 5, 2017, 8 pages.
Non-Final Office Action dated Oct. 11, 2018, issued in connection with U.S. Appl. No. 15/856,791, filed Dec. 28, 2017, 13 pages.
Non-Final Office Action dated Sep. 12, 2016, issued in connection with U.S. Appl. No. 14/811,587, filed Jul. 28, 2015, 24 pages.
Non-Final Office Action dated Jul. 13, 2016, issued in connection with U.S. Appl. No. 14/940,779, filed Nov. 13, 2015, 16 pages.
Non-Final Office Action dated Dec. 14, 2016, issued in connection with U.S. Appl. No. 14/481,505, filed Sep. 9, 2014, 19 pages.
Non-Final Office Action dated Mar. 14, 2017, issued in connection with U.S. Appl. No. 15/096,827, filed Apr. 12, 2016, 12 pages.
Non-Final Office Action dated May 14, 2019, issued in connection with U.S. Appl. No. 15/955,545, filed Apr. 17, 2018, 15 pages.
Non-Final Office Action dated Oct. 14, 2015, issued in connection with U.S. Appl. No. 14/216,325, filed Mar. 17, 2014, 7 pages.
Non-Final Office Action dated May 15, 2018, issued in connection with U.S. Appl. No. 15/806,126, filed Nov. 7, 2017, 17 pages.
Non-Final Office Action dated Jun. 16, 2017, issued in connection with U.S. Appl. No. 15/005,496, filed Jan. 25, 2016, 15 pages.
Non-Final Office Action dated Nov. 16, 2018, issued in connection with U.S. Appl. No. 15/996,878, filed Jun. 4, 2018, 8 pages.
Non-Final Office Action dated Dec. 18, 2018, issued in connection with U.S. Appl. No. 16/011,402, filed Jun. 18, 2018, 10 pages.
Non-Final Office Action dated Feb. 18, 2016, issued in connection with U.S. Appl. No. 14/644,136, filed Mar. 10, 2015, 10 pages.
Non-Final Office Action dated Jun. 18, 2019, issued in connection with U.S. Appl. No. 15/005,496, filed Jan. 25, 2016, 15 pages.
Non-Final Office Action dated Sep. 19, 2017, issued in connection with U.S. Appl. No. 15/056,553, filed Feb. 29, 2016, 7 pages.
Non-Final Office Action dated Apr. 2, 2018, issued in connection with U.S. Appl. No. 15/872,979, filed Jan. 16, 2018, 6 pages.
Non-Final Office Action dated Aug. 2, 2017, issued in connection with U.S. Appl. No. 15/298,115, filed Oct. 19, 2016, 22 pages.
Non-Final Office Action dated Apr. 20, 2017, issued in connection with U.S. Appl. No. 15/005,853, filed Jan. 25, 2016, 8 pages.
Non-Final Office Action dated Jul. 20, 2016, issued in connection with U.S. Appl. No. 14/682,182, filed Apr. 9, 2015, 13 pages.
Non-Final Office Action dated Jun. 20, 2017, issued in connection with U.S. Appl. No. 15/207,682, filed Jul. 12, 2016, 17 pages.
Non-Final Office Action dated Dec. 21, 2018, issued in connection with U.S. Appl. No. 16/181,213, filed Nov. 5, 2018, 13 pages.
Non-Final Office Action dated Jun. 21, 2016, issued in connection with U.S. Appl. No. 14/678,248, filed Apr. 3, 2015, 10 pages.
Non-Final Office Action dated Jun. 21, 2019, issued in connection with U.S. Appl. No. 16/181,865, filed Nov. 6, 2018, 12 pages.
Non-Final Office Action dated Nov. 21, 2014, issued in connection with U.S. Appl. No. 13/536,493, filed Jun. 28, 2012, 20 pages.
Non-Final Office Action dated Jun. 22, 2018, issued in connection with U.S. Appl. No. 15/217,399, filed Jul. 22, 2016, 33 pages.
Non-Final Office Action dated Oct. 22, 2019, issued in connection with U.S. Appl. No. 16/416,619, filed May 20, 2019, 12 pages.
Non-Final Office Action dated Jan. 23, 2019, issued in connection with U.S. Appl. No. 16/113,032, filed Aug. 27, 2018, 8 pages.
Non-Final Office Action dated May 24, 2019, issued in connection with U.S. Appl. No. 16/401,981, filed May 2, 2019, 14 pages.
Non-Final Office Action dated Oct. 25, 2016, issued in connection with U.S. Appl. No. 14/864,506, filed Sep. 24, 2015, 9 pages.
Non-Final Office Action dated Sep. 26, 2018, issued in connection with U.S. Appl. No. 15/229,693, filed Aug. 5, 2016, 25 pages.
Non-Final Office Action dated Dec. 27, 2017, issued in connection with U.S. Appl. No. 15/357,520, filed Nov. 21, 2016, 28 pages.
Non-Final Office Action dated Feb. 27, 2018, issued in connection with U.S. Appl. No. 14/864,393, filed Sep. 24, 2015, 19 pages.
Non-Final Office Action dated Feb. 27, 2018, issued in connection with U.S. Appl. No. 15/718,556, filed Sep. 28, 2017, 19 pages.
Non-Final Office Action dated Jul. 27, 2016, issued in connection with U.S. Appl. No. 14/696,014, filed Apr. 24, 2015, 11 pages.
Non-Final Office Action dated Mar. 27, 2017, issued in connection with U.S. Appl. No. 15/211,835, filed Jul. 15, 2016, 30 pages.

(56) References Cited

OTHER PUBLICATIONS

Non-Final Office Action dated Mar. 27, 2018, issued in connection with U.S. Appl. No. 15/785,088, filed Oct. 16, 2017, 11 pages.
Non-Final Office Action dated Jul. 28, 2016, issued in connection with U.S. Appl. No. 14/884,001, filed Oct. 15, 2015, 8 pages.
Non-Final Office Action dated Nov. 28, 2017, issued in connection with U.S. Appl. No. 15/673,170, filed Aug. 9, 2017, 7 pages.
Non-Final Office Action dated Sep. 28, 2018, issued in connection with U.S. Appl. No. 15/588,186, filed May 5, 2017, 12 pages.
Non-Final Office Action dated Sep. 28, 2018, issued in connection with U.S. Appl. No. 15/595,519, filed May 15, 2017, 12 pages.
Non-Final Office Action dated Mar. 29, 2018, issued in connection with U.S. Appl. No. 15/716,313, filed Sep. 26, 2017, 16 pages.
Non-Final Office Action dated Aug. 30, 2019, issued in connection with U.S. Appl. No. 16/115,525, filed Aug. 28, 2018, 13 pages.
Non-Final Office Action dated May 30, 2017, issued in connection with U.S. Appl. No. 15/478,770, filed Apr. 4, 2017, 9 pages.
Non-Final Office Action dated May 31, 2019, issued in connection with U.S. Appl. No. 16/185,906, filed Nov. 9, 2018, 7 pages.
Non-Final Office Action dated Nov. 6, 2018, issued in connection with U.S. Appl. No. 15/235,598, filed Aug. 12, 2016, 13 pages.
Non-Final Office Action dated Feb. 7, 2019, issued in connection with U.S. Appl. No. 15/859,311, filed Dec. 29, 2017, 9 pages.
Non-Final Office Action dated Feb. 7, 2019, issued in connection with U.S. Appl. No. 15/865,221, filed Jan. 8, 2018, 10 pages.
Non-Final Office Action dated Jan. 9, 2018, issued in connection with U.S. Appl. No. 15/698,283, filed Sep. 7, 2017, 18 pages.
Non-Final Office Action dated Jan. 9, 2018, issued in connection with U.S. Appl. No. 15/727,913, filed Oct. 9, 2017, 8 pages.
Notice of Allowance dated May 1, 2017, issued in connection with U.S. Appl. No. 14/805,140, filed Jul. 21, 2015, 13 pages.
Notice of Alowance dated Nov. 2, 2016, issued in connection with U.S. Appl. No. 14/884,001, filed Oct. 15, 2015, 8 pages.
Notice of Allowance dated Jun. 3, 2016, issued in connection with U.S. Appl. No. 14/921,799, filed Oct. 23, 2015, 8 pages.
Notice of Allowance dated Nov. 4, 2016, issued in connection with U.S. Appl. No. 14/481,514, filed Sep. 9, 2014, 10 pages.
Notice of Allowance dated Jun. 6, 2018, issued in connection with U.S. Appl. No. 15/727,913, filed Oct. 9, 2017, 5 pages.
Notice of Allowance dated Dec. 7, 2015, issued in connection with U.S. Appl. No. 14/216,325, filed Mar. 17, 2014, 7 pages.
Notice of Allowance dated Nov. 9, 2016, issued in connection with U.S. Appl. No. 14/805,340, filed Jul. 21, 2015, 13 pages.
Notice of Allowance dated Feb. 1, 2018, issued in connection with U.S. Appl. No. 15/480,265, filed Apr. 5, 2017, 8 pages.
Notice of Allowance dated Apr. 10, 2015, issued in connection with U.S. Appl. No. 13/536,493, filed Jun. 28, 2012, 8 pages.
Notice of Allowance dated Aug. 10, 2018, issued in connection with U.S. Appl. No. 15/785,088, filed Oct. 16, 2017, 6 pages.
Notice of Allowance dated Jul. 10, 2018, issued in connection with U.S. Appl. No. 15/673,170, filed Aug. 9, 2017, 2 pages.
Notice of Allowance dated Dec. 11, 2018, issued in connection with U.S. Appl. No. 15/909,327, filed Mar. 1, 2018, 10 pages.
Notice of Allowance dated Feb. 11, 2019, issued in connection with U.S. Appl. No. 15/588,186, filed May 5, 2017, 5 pages.
Notice of Allowance dated Jul. 11, 2017, issued in connection with U.S. Appl. No. 14/678,248, filed Apr. 3, 2015, 11 pages.
Notice of Allowance dated Mar. 11, 2015, issued in connection with U.S. Appl. No. 13/340,126, filed Dec. 29, 2011, 7 pages.
Notice of Allowance dated Apr. 12, 2016, issued in connection with U.S. Appl. No. 14/681,465, filed Apr. 8, 2015, 13 pages.
Notice of Allowance dated Aug. 12, 2019, issued in connection with U.S. Appl. No. 16/416,648, filed May 20, 2019, 7 pages.
Notice of Allowance dated Dec. 12, 2016, issued in connection with U.S. Appl. No. 14/805,140, filed Jul. 21, 2015, 24 pages.
Notice of Allowance dated Dec. 12, 2017, issued in connection with U.S. Appl. No. 14/481,505, filed Sep. 9, 2014, 9 pages.
Notice of Allowance dated Sep. 12, 2016, issued in connection with U.S. Appl. No. 15/066,072, filed Mar. 10, 2016, 7 pages.
Notice of Allowance dated Sep. 12, 2017, issued in connection with U.S. Appl. No. 15/207,682, filed Jul. 12, 2016, 8 pages.
Notice of Allowance dated Feb. 13, 2017, issued in connection with U.S. Appl. No. 14/864,506, filed Sep. 24, 2015, 8 pages.
Notice of Allowance dated Nov. 13, 2017, issued in connection with U.S. Appl. No. 14/726,921, filed Jun. 1, 2015, 8 pages.
Notice of Allowance dated Mar. 14, 2019, issued in connection with U.S. Appl. No. 15/343,996, filed Nov. 4, 2016, 8 pages.
Notice of Allowance dated Jan. 15, 2019, issued in connection with U.S. Appl. No. 16/115,524, filed Aug. 28, 2018, 8 pages.
Notice of Allowance dated Jun. 15, 2017, issued in connection with U.S. Appl. No. 15/096,827, filed Apr. 12, 2016, 5 pages.
Notice of Allowance dated Mar. 15, 2017, issued in connection with U.S. Appl. No. 14/826,856, filed Aug. 14, 2015, 7 pages.
Notice of Allowance dated May 15, 2019, issued in connection with U.S. Appl. No. 16/113,032, filed Aug. 27, 2018, 9 pages.
Notice of Allowance dated Oct. 15, 2018, issued in connection with U.S. Appl. No. 15/716,313, filed Sep. 26, 2017, 10 pages.
Notice of Allowance dated Jun. 16, 2017, issued in connection with U.S. Appl. No. 14/884,001, filed Oct. 15, 2015, 8 pages.
Notice of Allowance dated May 16, 2019, issued in connection with U.S. Appl. No. 16/181,213, filed Nov. 5, 2018, 10 pages.
Notice of Allowance dated Oct. 16, 2017, issued in connection with U.S. Appl. No. 15/478,770, filed Apr. 4, 2017, 10 pages.
Notice of Allowance dated Oct. 16, 2019, issued in connection with U.S. Appl. No. 16/401,981, filed May 2, 2019, 8 pages.
Notice of Allowance dated Sep. 16, 2016, issued in connection with U.S. Appl. No. 15/066,049, filed Mar. 10, 2016, 7 pages.
Notice of Allowance dated Dec. 17, 2018, issued in connection with U.S. Appl. No. 16/055,884, filed Aug. 6, 2018, 5 pages.
Notice of Allowance dated May 17, 2017, issued in connection with U.S. Appl. No. 15/339,260, filed Oct. 31, 2016, 7 pages.
Notice of Allowance dated Oct. 17, 2019, issued in connection with U.S. Appl. No. 16/542,433, filed Aug. 16, 2019, 9 pages.
Notice of Allowance dated Mar. 18, 2019, issued in connection with U.S. Appl. No. 16/056,862, filed Aug. 7, 2018, 12 pages.
Notice of Allowance dated Aug. 19, 2016, issued in connection with U.S. Appl. No. 14/644,136, filed Mar. 10, 2015, 12 pages.
Notice of Allowance dated Jun. 19, 2017, issued in connection with U.S. Appl. No. 14/793,190, filed Jul. 7, 2015, 5 pages.
Notice of Allowance dated Sep. 19, 2017, issued in connetion with U.S. Appl. No. 14/793,205, filed Jul. 7, 2015, 16 pages.
Notice of Allowance dated Sep. 19, 2018, issued in connection with U.S. Appl. No. 14/864,393, filed Sep. 24, 2015, 10 pages.
Notice of Allowance dated Apr. 20, 2017, issued in connection with U.S. Appl. No. 14/940,779, filed Nov. 13, 2015, 11 pages.
Notice of Allowance dated Nov. 20, 2017, issued in connection with U.S. Appl. No. 15/298,115, filed Oct. 19, 2016, 10 pages.
Notice of Allowance dated Sep. 20, 2017, issued in connection with U.S. Appl. No. 14/481,514, filed Sep. 9, 2014, 10 pages.
Notice of Allowance dated Dec. 21, 2016, issued in connection with U.S. Appl. No. 14/682,182, filed Apr. 9, 2015, 8 pages.
Notice of Allowance dated Feb. 21, 2018, issued in connection with U.S. Appl. No. 15/005,853, filed Jan. 25, 2016, 5 pages.
Notice of Allowance dated Jul. 21, 2017, issued in connection with U.S. Appl. No. 15/211,835, filed Jul. 15, 2016, 10 pages.
Advisory Action dated Jul. 1, 2019, issued in connection with U.S. Appl. No. 15/229,693, filed Aug. 5, 2016, 2 pages.
Advisory Action dated Jul. 10, 2018, issued in connection with U.S. Appl. No. 15/056,553, filed Feb. 29, 2016, 3 pages.
Advisory Action dated Jul. 12, 2018, issued in connection with U.S. Appl. No. 15/166,241, filed May 26, 2016, 3 pages.
Advisory Action dated Jul. 12, 2018, issued in connection with U.S. Appl. No. 15/235,598, filed Aug. 12, 2016, 3 pages.
Advisory Action dated Aug. 16, 2017, issued in connection with U.S. Appl. No. 14/481,505, filed Sep. 9, 2014, 3 pages.
Advisory Action dated Jun. 19, 2018, issued in connection with U.S. Appl. No. 15/229,693, filed Aug. 5, 2016, 3 pages.
Advisory Action dated Sep. 19, 2017, issued in connection with U.S. Appl. No. 14/726,921, filed Jun. 1, 2015, 3 pages.
Advisory Action dated Apr. 30, 2019, issued in connection with U.S. Appl. No. 15/005,496, filed Jan. 25, 2016, 3 pages.

(56) References Cited

OTHER PUBLICATIONS

Advisory Action dated Feb. 7, 2019, issued in connection with U.S. Appl. No. 15/806,126, filed Nov. 1, 2017, 3 pages.
An Overview of IEEE 1451.4 Transducer Electronic Data Sheets (TEDS) National Instruments, 19 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Burger, Dennis, "Automated Room Correction Explained," hometheaterreview.com, Nov. 18, 2013, Retrieved Oct. 10, 2014, 3 pages.
Chinese Patent Office, First Office Action and Translation dated Jun. 19, 2019, issued in connection with Chinese Application No. 201680054189.X, 11 pages.
Chinese Patent Office, First Office Action dated Aug. 11, 2017, issued in connection with Chinese Patent Application No. 201580013837.2, 8 pages.
Chinese Patent Office, First Office Action dated Nov. 20, 2018, issued in connection with Chinese Application No. 201580047998.3, 21 pages.
Chinese Patent Office, First Office Action dated Sep. 25, 2017, issued in connection with Chinese Patent Application No. 201580013894.0, 9 pages.
Chinese Patent Office, First Office Action dated Nov. 5, 2018, issued in connection with Chinese Application No. 201680044080.8, 5 pages.
Chinese Patent Office, Second Office Action and Translation dated Aug. 26, 2019, issued in connection with Chinese Application No. 201580047998.3, 25 pages.
Chinese Patent Office, Second Office Action dated Jan. 11, 2019, issued in connection with Chinese Application No. 201680044080.8, 4 pages.
Chinese Patent Office, Second Office Action dated Feb. 3, 2019, issued in connection with Chinese Application No. 201580048594.6, 11 pages.
Chinese Patent Office, Second Office Action with Translation dated Jan. 9, 2018, issued in connection with Chinese Patent Application No. 201580013837.2, 10 pages.
Chinese Patent Office, Third Office Action dated Apr. 11, 2019, issued in connection with Chinese Application No. 201580048594.6, 4 pages.
"Constellation Acoustic System: a revolutionary breakthrough in acoustical design," Meyer Sound Laboratories, Inc. 2012, 32 pages.
"Constellation Microphones," Meyer Sound Laboratories, Inc. 2013, 2 pages.
Corrected Notice of Allowability dated Jan. 19, 2017, issued in connection with U.S. Appl. No. 14/826,873, filed Aug. 14, 2015, 11 pages.
Daddy, B., "Calibrating Your Audio with a Sound Pressure Level (SPL) Meter," Blue-ray.com, Feb. 22, 2008 Retrieved Oct. 10, 2014, 15 pages.

Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report dated May 11, 2018, issued in connection with European Application No. 16748186.0, 6 pages.
European Patent Office, European Extended Search Report dated Oct. 16, 2018, issued in connection with European Application No. 17185193.4, 6 pages.
European Patent Office, European Extended Search Report dated Jul. 17, 2019, issued in connection with European Application No. 19167365.6, 7 pages.
European Patent Office, European Extended Search Report dated Jun. 26, 2018, issued in connection with European Application No. 18171206.8, 9 pages.
European Patent Office, European Extended Search Report dated Sep. 8, 2017, issued in connection with European Application No. 17000460.0, 8 pages.
European Patent Office, European Office Action dated Dec. 11, 2018, issued in connection with European Application No. 15778787.0, 6 pages.
European Patent Office, European Office Action dated Jul. 11, 2019, issued in connection with European Application No. 15778787.0, 10 pages.
European Patent Office, European Office Action dated Nov. 2, 2018, issued in connection with European Application No. 18171206.8, 6 pages.
European Patent Office, European Office Action dated Feb. 4, 2019, issued in connection with European Application No. 17703876.7, 9 pages.
European Patent Office, European Office Action dated May 9, 2019, issued in connection with European Application No. 18171206.8, 7 pages.
European Patent Office, European Partial Search Report dated Jun. 7, 2019, issued in connection with European Application No. 19161826.3, 17 pages.
European Patent Office, European Search Report dated Jun. 13, 2019, issued in connection with European Application No. 18204450.3, 11 pages.
European Patent Office, European Search Report dated Sep. 13, 2019, issued in connection with European Application No. 19161826.3, 13 pages.
European Patent Office, European Search Report dated Jan. 18, 2018, issued in connection with European Patent Application No. 17185193.4, 9 pages.
European Patent Office, European Search Report dated Jul. 9, 2019, issued in connection with European Application No. 19168800.1, 12 pages.
European Patent Office, Extended European Search Report dated Jan. 5, 2017, issued in connection with European Patent Application No. 15765555.6, 8 pages.
European Patent Office, Extended Search Report dated Jan. 25, 2017, issued in connection with European Application No. 15765548.1, 7 pages.

\* cited by examiner

CALIBRATION INTERFACE

CROSS REFERENCE TO RELATED APPLICATIONS

This application claims priority under 35 U.S.C. § 120 to, and is a continuation of, U.S. non-provisional patent application Ser. No. 15/217,399, filed on Jul. 22, 2016, entitled "Calibration Interface," which is incorporated herein by reference in its entirety.

The present application incorporates herein by reference the entire contents of (i) U.S. application Ser. No. 14/696,014, filed Apr. 24, 2015, titled "Speaker Calibration"; (ii) U.S. application Ser. No. 14/826,856, filed Aug. 14, 2015, titled "Playback Device Calibration User Interfaces"; (iii) U.S. application Ser. No. 14/826,873, filed Aug. 14, 2015, titled "Speaker Calibration User Interface"; (iv) U.S. application Ser. No. 14/805,140, filed Jul. 21, 2015, titled "Hybrid Test Tone for Space-Averaged Room Audio Calibration Using A Moving Microphone"; and (v) U.S. application Ser. No. 15/005,853, filed Jan. 25, 2016, titled "Calibration with Particular Locations."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
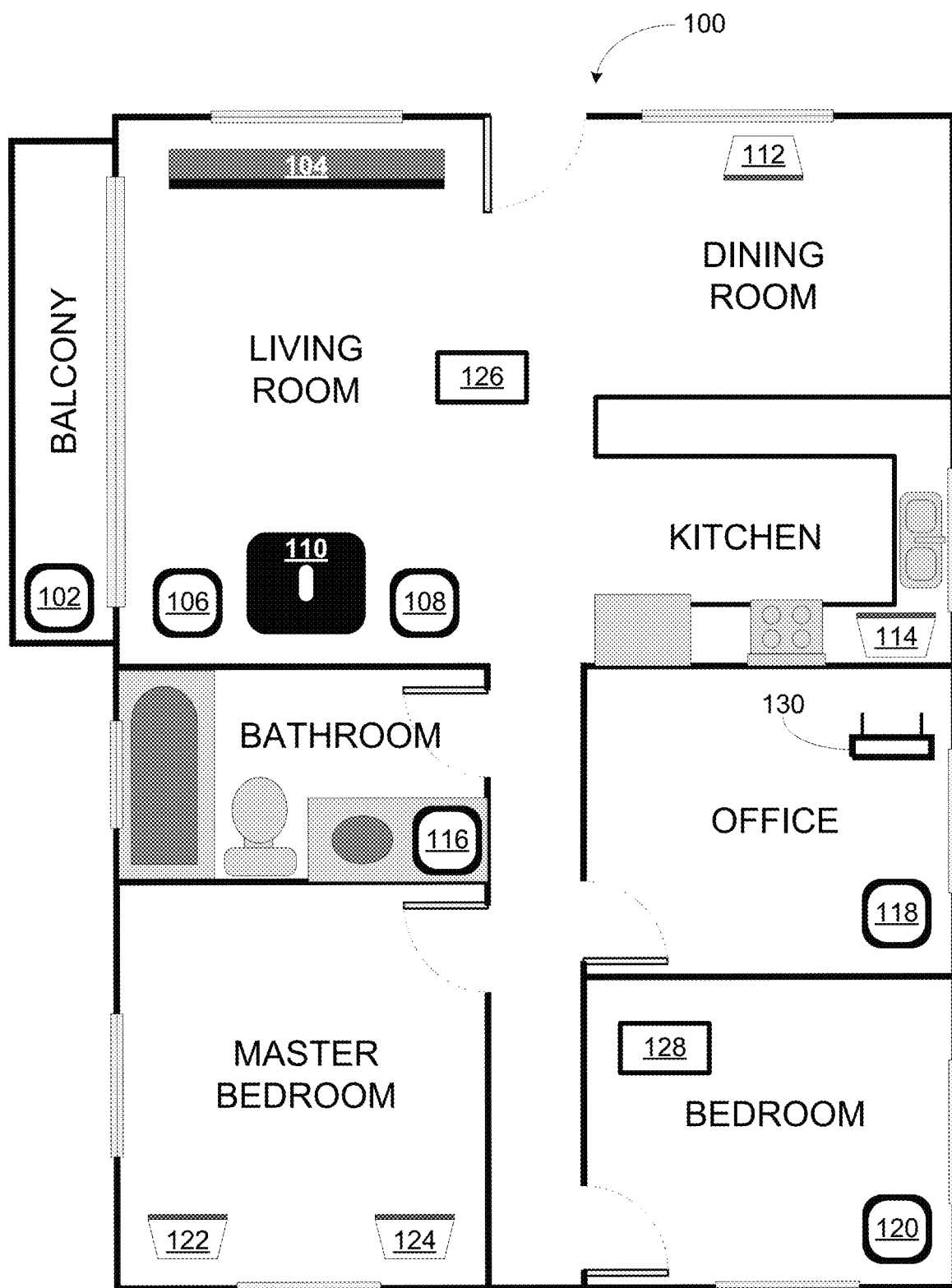
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve, inter alia, a control device (e.g., a smartphone or tablet computer) displaying a user interface to facilitate the calibration of a playback device within a given environment. Some calibration procedures contemplated herein involve recording devices (e.g., control devices) of a media playback system detecting sound waves (e.g., one or more calibration sounds) emitted by one or more playback devices of the media playback system. A processing device, such as a device that is communicatively coupled to the media playback system, may analyze the detected sound waves to determine one or more calibrations for the one or more playback devices of the media playback system. Such calibrations may configure the one or more playback devices to a given listening area (i.e., the environment in which the playback device(s) were positioned while emitting the sound waves). The control device may display a prompt, or a series of prompts, that direct the user to assist in one or both phases of the calibration sequence.

In some embodiments contemplated herein, the processing device may determine two or more calibrations for the one or more playback devices. Such calibrations may configure the one or more playback devices in different ways. In operation, one of the two or more calibrations may be applied to playback by the one or more playback devices, perhaps for different use cases. Example uses cases might include music playback or surround sound (i.e., home theater), among others.

Within examples, the calibration sequence may include a spatial and/or spectral calibration component. For instance, the processing device may determine a first calibration that configures the one or more playback devices to a given listening area spatially (and perhaps also spectrally). Such a calibration may configure the one or more playback devices to one or more particular locations within the environment (e.g., one or more preferred listening positions, such as a favorite seating location), perhaps by adjusting time-delay and/or loudness for those particular locations. This first calibration may be applied during other use cases, such as home theater. The processing device may also determine a second calibration that configures the one or more playback devices to a given listening area spectrally. Such a calibration may generally help offset acoustic characteristics of the environment and be applied during certain use cases, such as music playback. U.S. application Ser. No. 15/005,853 entitled, "Calibration with Particular Locations," which is hereby incorporated by reference, provides examples of these calibration techniques.

A control device may display one or more prompts to initiate a calibration sequence for the spatial calibration component and/or the spectral calibration component. The one or more prompts might include a selectable control that, when selected, starts the calibration sequence. Additionally, the one or more prompts might include a selectable control that, when selected, defers the calibration sequence to a later time.

In some cases, quality of calibration can be further improved by preparing the environment for calibration. To prepare the control device for calibration, the control device may, for example, provide a prompt to perform a step or steps to improve the acoustics of the microphone that will be detecting the calibration sounds emitted by a playback device. For instance, the control device may prompt to rotate the control device such that its microphone is oriented upwards, as such an orientation may improve the microphone sensitivity or other acoustic characteristics. As another example, the control device may prompt to remove any removable cases or covers that have been installed on the control devices. Cases or covers may negatively influence the microphones ability to sense sounds, as they may physically block or attenuate sound before the sound reaches the microphone. Within examples, the control device may prompt to perform other steps as well.

To further prepare the control device for calibration, in some cases, the control device may display one or more prompts to instruct a user to locate and move to the particular location within the given environment for the spatial calibration component of the calibration sequence. Additionally or alternatively, the control device may provide a prompt to perform one or more steps to reduce or eliminate environmental effects on the calibration. For instance, the control device may prompt to reduce ambient noise within an environment. Since the calibration involves the control device detecting calibration sounds emitted by the playback device, ambient noise may negatively influence the calibration procedure by affecting a microphone's ability to detect the calibration sounds.

As noted above, the control device may display one or more prompts that include a selectable control that, when selected, initiates the calibration sequence. As part of the spatial calibration component of the calibration sequence, some examples may include the control device instructing a playback device to begin emitting one or more calibration sounds or tones, which the control device may detect via one or more microphones. Within examples, a playback device with multiple speakers or transducers may emit different calibration sounds or tones (e.g., sounds at different frequency ranges or phases) via each speaker or transducer. For instance, a tweeter may output relatively high-frequency calibration audio while a subwoofer emits relatively low frequency calibration audio. In some cases, each speaker or transducer may emit the calibration sounds simultaneously. In other cases, the speakers or transducers may emit the calibration sounds at different times, perhaps in respective intervals.

In further examples, the control device may display a plurality of circular graphical elements that pulse in synchrony with the one or more of calibration tones played by the playback device during the spatial calibration component. In some instances, the plurality of circular graphical elements may move along an axis and/or shift positions. Such movement may be indicative of a location of the playback device relative to the particular location within the given environment.

Some calibration procedures within the spectral calibration component may be improved by the control device detecting the calibration sounds at multiple physical locations within the environment. Acoustics of an environment may vary from location to location within the environment.

Detecting the calibration sounds at multiple physical locations within the environment may provide a better understanding of the environment as a whole. To facilitate detecting the calibration sounds at multiple physical locations, the control device may provide a prompt to perform a movement during the calibration procedure. The movement may involve the user carrying the control device around the room while the one or more playback devices under calibration emits calibration sounds. In this manner, the control device may detect the calibration sounds at multiple physical locations within the environment.

As indicated above, example techniques may involve using a control device to facilitate the calibration of a playback device for a particular location within a given environment. In one aspect, a method is provided. The method may involve displaying (i) a prompt to initiate a calibration sequence that includes a spectral calibration component and a spatial calibration component, and (ii) a sequence of one or more prompts to prepare the particular location within the given environment for the spatial calibration component. The spectral calibration component may involve calibration of a playback device for a given environment in which the playback device is located, and the spatial calibration component may involve calibration of the playback device for a particular location within the given environment. The method may also involve displaying a selectable control, that, when selected, initiates spatial calibration of the playback device within the particular location of the given environment. The method may also involve causing the spatial calibration component to be initiated.

In another aspect, a device is provided. The device includes a network interface, at least one processor, a data storage, and program logic stored in the data storage and executable by the at least one processor to perform operations. The operations may include displaying (i) a prompt to initiate a calibration sequence that includes a spectral calibration component and a spatial calibration component, and (ii) a sequence of one or more prompts to prepare the particular location within the given environment for the spatial calibration component. The operations may also include displaying a selectable control, that, when selected, initiates spatial calibration of the playback device within the particular location of the given environment. The operations may also involve causing the spatial calibration component to be initiated.

In yet another aspect, a non-transitory computer readable memory is provided. The non-transitory computer readable memory has stored thereon instructions executable by a computing device to cause the computing device to perform operations. The operations may include displaying (i) a prompt to initiate a calibration sequence that includes a spectral calibration component and a spatial calibration component, and (ii) a sequence of one or more prompts to prepare the particular location within the given environment for the spatial calibration component. The operations may also include displaying a selectable control, that, when selected, initiates spatial calibration of the playback device within the particular location of the given environment. The operations may also involve causing the spatial calibration component to be initiated.

It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
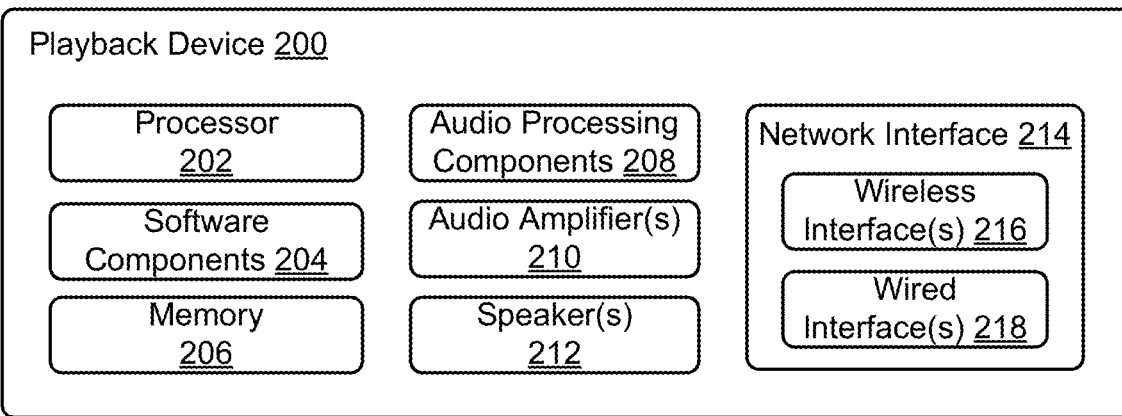
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
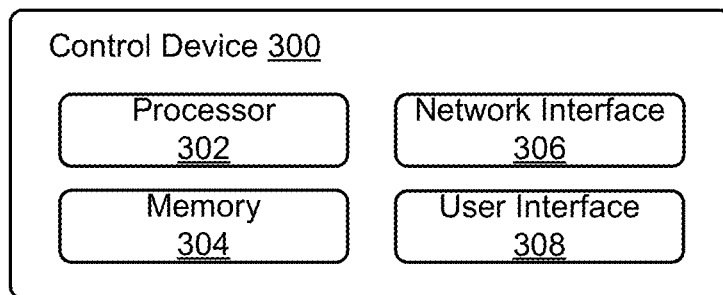
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
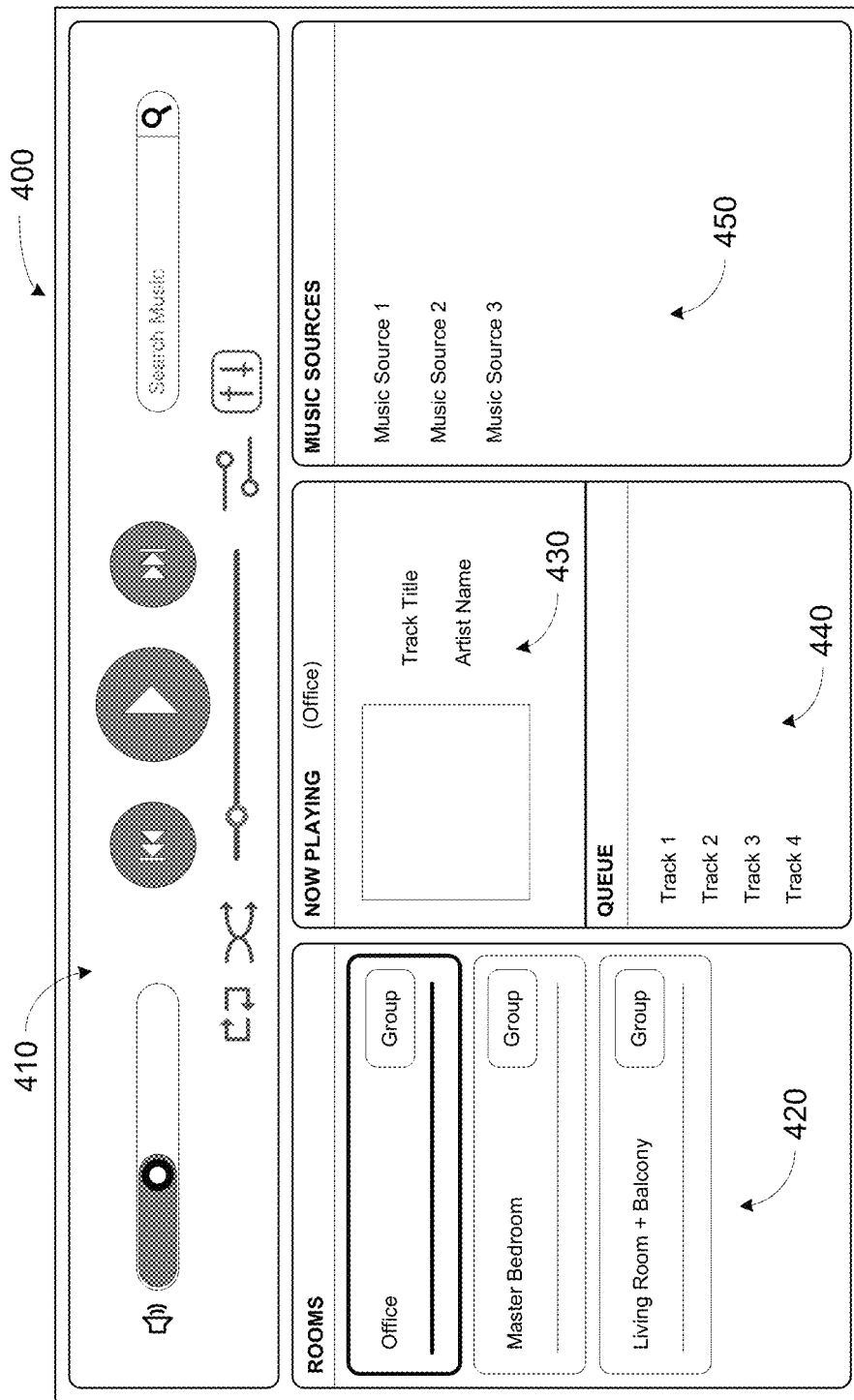
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

III. Example Techniques to Facilitate Calibration of Playback Devices

Figure 5:
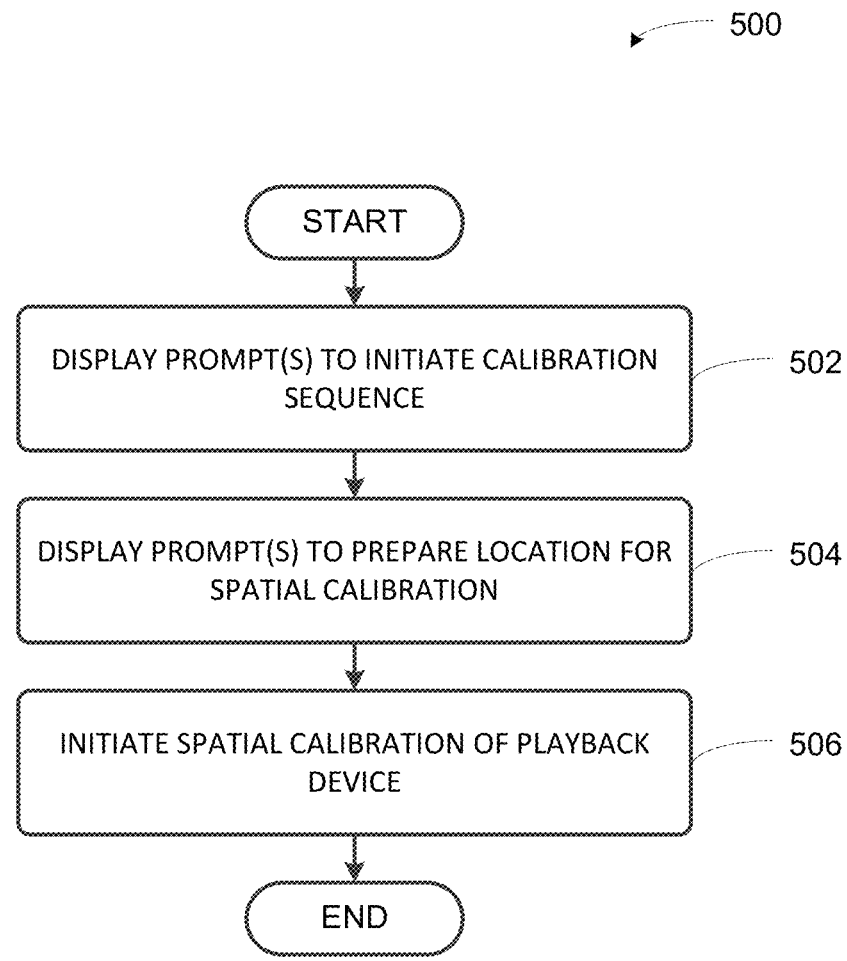
FIG. 5 shows an example flow diagram to facilitate the calibration of a playback device for a particular location within a given environment using a control device.

As noted above, techniques described herein may facilitate the calibration of one or more playback devices within a particular location of a given environment. FIG. 5 illustrates an example implementation 500 to use a control device to facilitate calibration of a playback device within a given environment by displaying one or more prompts to prepare the playback device, the environment, and/or the control device.

Implementation 500 shown in FIG. 5 present embodiments that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Implementation 500 may include one or more operations, functions, or actions as illustrated by one or more of blocks shown in FIG. 5. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

By way of example, the following technique makes reference to a calibration procedure in which a single playback device is calibrated within a particular location of a given environment. However, in some cases, multiple playback devices may be calibrated within the particular location (or within another location) during a calibration procedure. For instance, an example media playback system may include two or more playback devices that are associated with one another, such as by way of a zone, bonded pair, zone group, or other arrangement. Such arrangements of multiple speakers may function together in operation, and may likewise be calibrated together. The calibration procedure and prompts shown by a playback device to facilitate that calibration procedure may adapt to the specific configuration of the playback devices to be calibrated. For example, an example calibration procedure of two or more playback devices may involve multiple playback devices emitting respective calibration sounds, which may be detected by one or more control devices.

Further, some calibration procedures may involve calibration of multiple channels, as some playback devices may have multiple channels. For example, some example playback devices may include multiple speakers, each arranged as a separate channel. As another example, a sound bar-type playback device may include multiple channels (e.g., left, right, and center channels).

a. Display Prompt(s) to Initiate Calibration Sequence

At block 502, implementation 500 involves displaying one or more prompts to initiate a calibration sequence. As noted above, one of the two or more calibrations may be applied to one or more playback devices, perhaps for different use cases. Example uses cases might include music playback or surround sound (e.g, home theater), among others.

Within examples, the calibration may include a spectral and/or spatial calibration component. For instance, the processing device may determine a first calibration that configures one or more playback devices to a given listening area or environment spatially (and perhaps also spectrally).

Such a calibration may configure (i.e. "tune" or "optimize") the one or more playback devices to one or more particular locations within the environment (e.g., one or more preferred listening positions, such as favorite seating location), perhaps by adjusting time-delay and/or loudness for those particular locations. This first calibration may be applied during other use cases, such as home theater. The processing device may also determine a second calibration that configures the one or more playback devices to a given listening area spectrally. Such a calibration may generally help offset acoustic characteristics of the environment and be applied during certain use cases, such as music playback.

In some embodiments, a control device, such as control device 126 of media playback system 100, may display an interface (e.g., control interface 400 of FIG. 4), that includes a prompt to initiate a calibration sequence that involves the spectral calibration component and the spatial calibration component. As noted above, the spectral calibration component may involve calibration of one or more playback devices for a given environment in which the one or more playback devices are located. The spatial calibration component may involve calibration of the one or more playback devices for a particular location within the given environment as noted above.

A control device may calibrate a playback device in various circumstances. In some cases, a control device may display one or more prompts during a set-up procedure for a media playback system (e.g., a procedure to configure one or more playback devices into a media playback system). In other cases, the control device may display one or more prompts upon detecting input data indicating a request to configure the media playback system (e.g., a request to configure a media playback system with an additional playback device, or a request to calibrate a particular playback device in the media playback system).

In further embodiments, the control device may display one or more prompts when a playback device is moved within an environment in which it is operating. A playback device may include an accelerometer or other sensor that is sensitive to movement. The playback device may use such a sensor to detect when the playback device has been moved. In such circumstances, the playback device may transmit a message indicating that it has been moved, which may indicate to the control device that a new calibration should be suggested.

Figure 6:
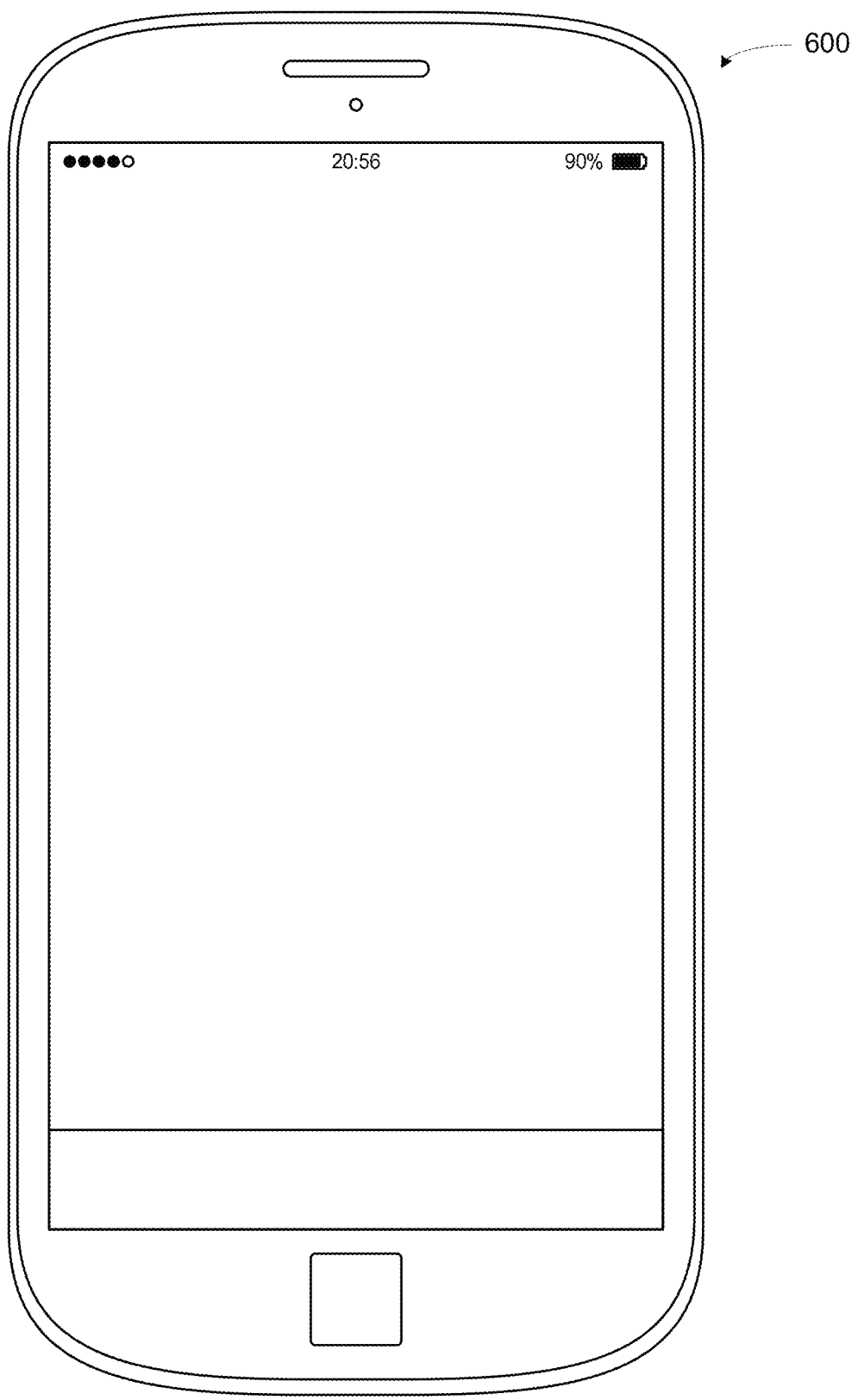
FIG. 6 shows an example control device.

FIG. 6 depicts a control device 600 (e.g., a smartphone) that includes one or more processors, a tangible computer-readable memory, a network interface, and a display. Control device 600 might be an example implementation of control device 126 or 128 of FIG. 1, or control device 300 of FIG. 3, or other control devices described herein. By way of example, reference will be made to control device 600 and certain control interfaces, prompts, and other graphical elements that control device 600 may display. Within examples, such interfaces and elements may be displayed by any suitable control device, such as a smartphone, tablet computer, laptop or desktop computer, personal media player, or a remote control device.

In some embodiments, a control device may display one or more prompts before initiating the calibration sequence. The one or more prompts may indicate why calibration of the playback device is suggested, what the calibration procedure involves, and what the calibration procedure does. The prompt may further provide a selectable control that, when selected, initiates a calibration sequence. The prompt might also provide an option to defer the calibration procedure.

Figure 7:
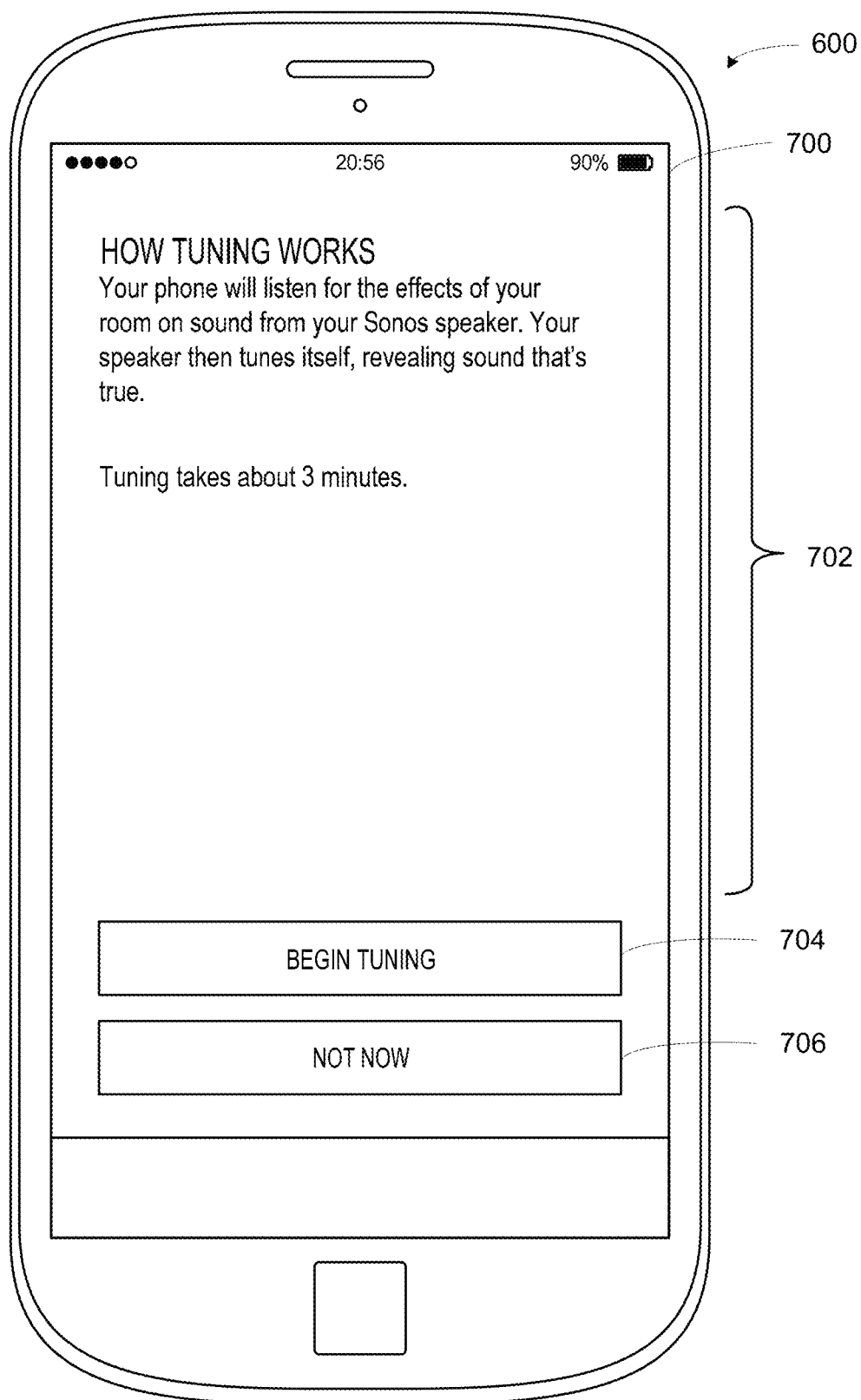
FIG. 7 shows a control device that is displaying an example control interface, according to an example implementation.

FIGS. 7-10 illustrate example control interfaces that may provide one or more prompts to initiate a calibration sequence for a playback device. In FIG. 7, control device 600 displays an example control interface 700 which includes a graphical region 702. As shown, graphical region 702 indicates how calibration of one or more playback devices work, what the calibration sequence involves, how long the calibration sequence is expected to take, and what the calibration sequence does, among other possibilities. Control interface 700 also includes a selectable control 704, that when selected, initiates a procedure to calibrate a playback device. Such a procedure may include displaying the one or more prompts to prepare for the calibration. Control interface 700 also includes a selectable control 706 that can be used to decline to initiate the calibration procedure.

Figure 8:
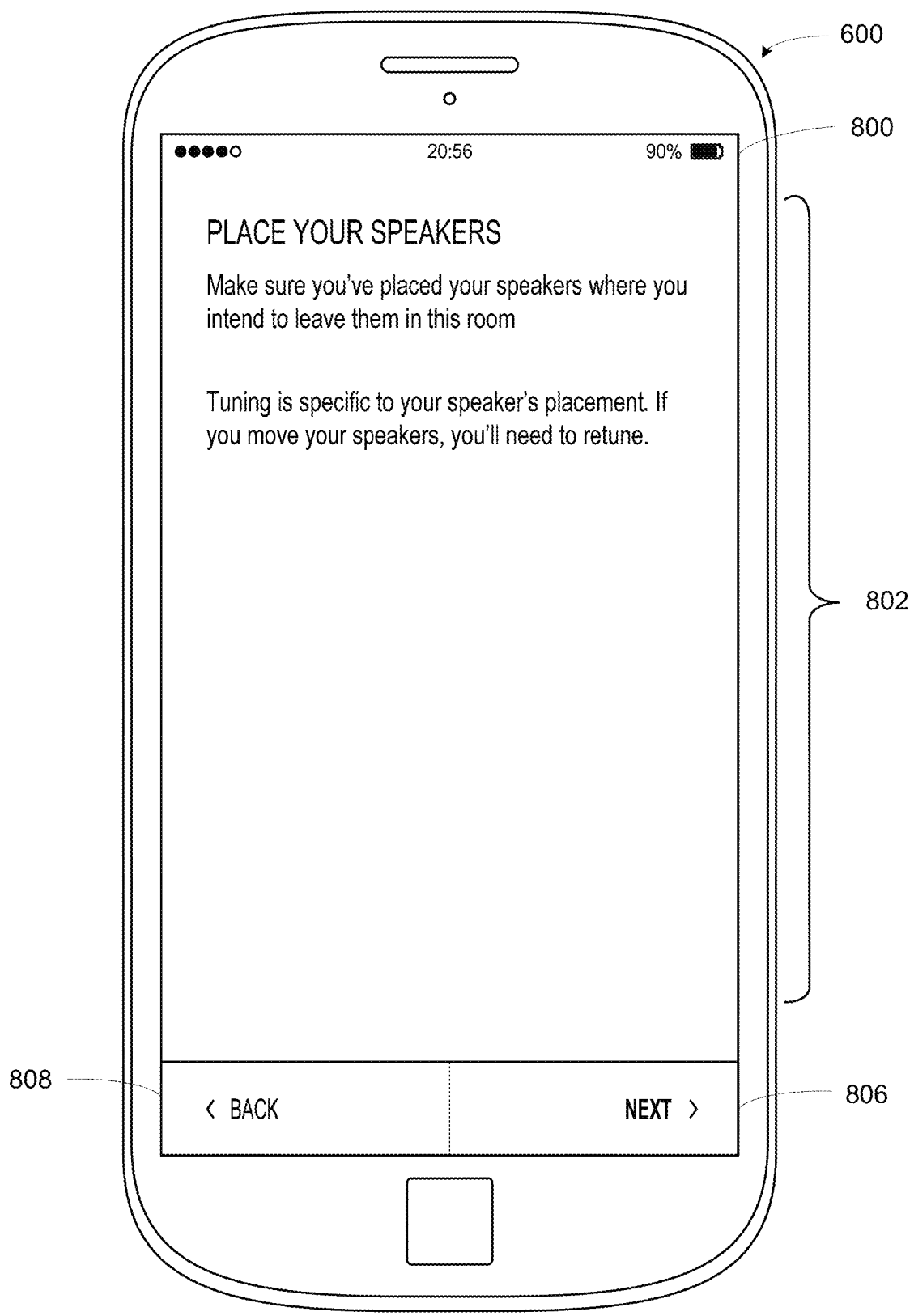
FIG. 8 shows a control device that is displaying an example control interface, according to an example implementation.
Figure 9:
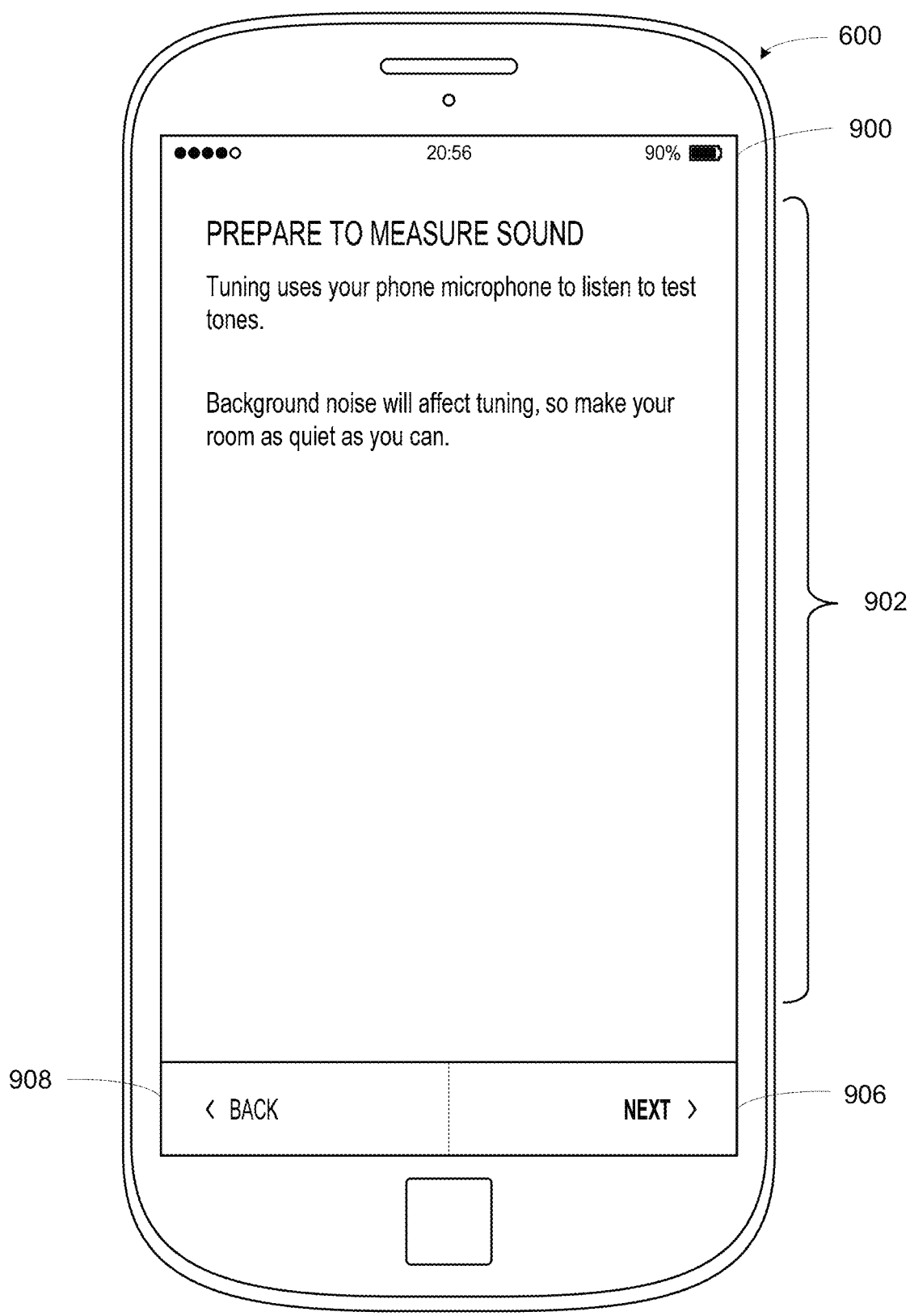
FIG. 9 shows a control device that is displaying another example control interface, according to an example implementation.

FIG. 8 illustrates an example control interface that provides a prompt to prepare the playback devices undergoing calibration for the calibration procedure. In FIG. 8, control device 600 is displaying an example control interface 800 that prompt to initiate the calibration sequence for the playback device. A control device might display control interface 800 in addition to or as an alternative to control interface 700. Control interface 800 includes a graphical region 802 which includes graphical elements indicating that the calibration sequence tunes the playback device at a particular placement or location specific to the playback device. As such, the control interface includes a prompt to place the playback device(s) under calibration at the location(s) at which they will later be operated. As shown, control interface 800 also includes a selectable control 806, that when selected, displays the next prompt that may initiate a procedure to calibrate the playback device or further prepare for the calibration procedure. Control interface 800 also includes a selectable control 808, that when selected, displays the previous prompt.

In some cases, quality of calibration can be further improved by preparing the environment for calibration. To prepare an environment for calibration, a control device may display a prompt to reduce ambient noise in the environment. By way of example, FIG. 9 includes control interface 900. Control device 600 might display control interface 900 in addition to or as an alternative to control interfaces 700 and/or control interface 800. Control interface 900 includes a graphical region 902 which includes graphical elements indicating that the calibration procedure tunes the playback device using one or more microphones of control device 600, and instructions to keep the background noise of the environment quiet, among other possibilities. As shown, control interface 900 also includes a selectable control 906, that when selected, displays the next prompt that may initiate a procedure to calibrate the playback device or further prepare for the calibration procedure. Control interface 900 also includes a selectable control 908, that when selected, displays the previous prompt. In some embodiments, the prompt to reduce ambient noise in the environment may be displayed before initiating the spatial calibration component of the calibration sequence. Additionally or alternatively, the prompt to reduce ambient noise in the environment may be displayed after the spatial calibration component of the calibration sequence and before initiating the spectral calibration component of the calibration sequence.

In some embodiments, when the detected background noise level exceeds a calibration threshold during the calibration sequence, control device 600 may display a control interface that prompts to reduce ambient noise within the environment until the ambient noise level is less than that calibration threshold. In some cases, ambient noise may be constantly monitored throughout the calibration sequence, and the calibration sequence (e.g., the spatial calibration component and the spectral calibration component) may be aborted or interrupted if the background noise level exceeds the calibration threshold. The control device may determine whether the level of ambient noise within the environment is below the threshold level for calibration. The appropriate ambient noise level for calibration may vary by calibration procedure. Sound pressure levels consistent with a quiet room may be appropriate for some example calibration procedures (e.g., sound pressure levels in the range of 30-50 dB). To determine the level of ambient noise within the environment, a control device may include a microphone. By way of the microphone, the control device may detect ambient noise within the environment and determine whether the detected noise is below a threshold level such that the level is suitable for calibration.

Figure 10:
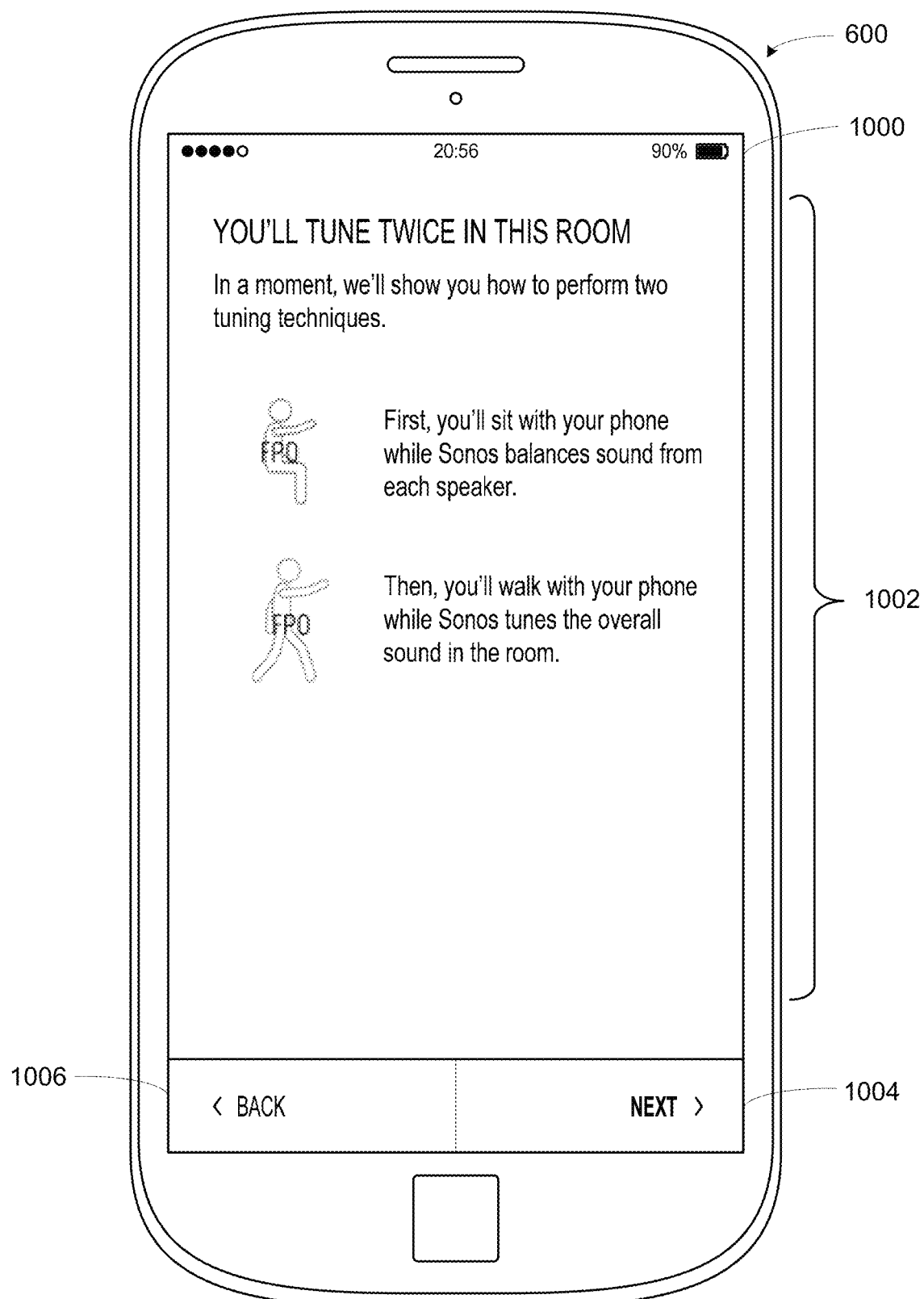
FIG. 10 shows a control device that is displaying another example control interface, according to an example implementation.

In FIG. 10, control device 600 displays an example control interface 1000 that prompts to initiate the calibration sequence for the playback device. A control device might display control interface 1000 in addition to or as an alternative to control interfaces 700, 800, and/or 900. As shown, control interface 1000 includes a graphical region 1002 which includes graphical elements indicating that the calibration procedure tunes the given environment twice: once for the spatial calibration component and once for the spectral calibration component. Graphical region 1002 also includes graphical elements indicating what each calibration does and how the calibration procedure is performed. In particular, graphical region 1002 includes graphical elements indicating that the spatial calibration component is performed while control device 600 is substantially stationary at the particular location and the spectral calibration component is performed while control device 600 is in motion through the given environment.

Control interface 1000 also includes a selectable control 1004, that when selected, displays the next prompt that may initiate a procedure to calibrate the playback device or further prepare for the calibration procedure. Control interface 1000 also includes a selectable control 1006, that when selected, displays the previous prompt (e.g., control interface 700, 800, and/or 900).

b. Display Prompt(s) to Prepare Location for Spatial Calibration

Referring back to FIG. 5, at block 504, implementation 500 involves displaying a sequence of one or more prompts to prepare the particular location within the given environment for the spatial calibration component. A control device, such as control device 600 of FIG. 6, may display an interface, which includes one or more prompts to prepare various aspects of the environment, the playback devices under calibration, and/or control device(s) being used in the calibration, among other aspects of the calibration. Prompts to prepare the environment may include prompts to prepare the particular location within the given environment and/or a prompt to prepare the given environment, among other examples.

Figure 11:
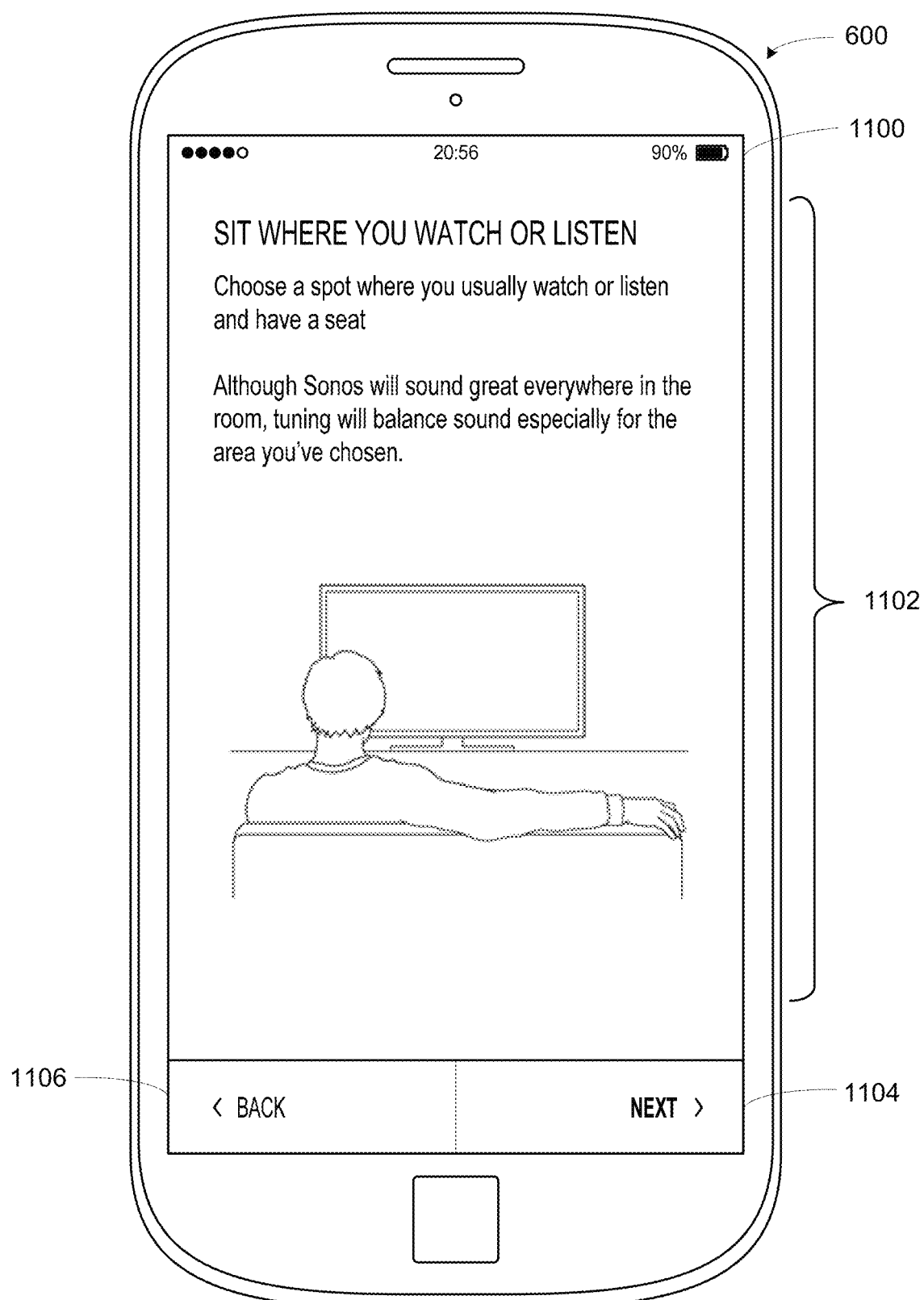
FIG. 11 shows a control device that is displaying another example control interface, according to an example implementation.

In FIG. 11, control device 600 displays an example control interface 1100 that prompts to prepare the particular location within the given environment for the spatial calibration component. Control device 600 might display control interface 1100 in addition to or as an alternative to control interfaces 700-1000. As shown, control interface 1100 includes a graphical region 1102 which includes graphical elements that provide indications to locate and move to the particular location within the given environment for the spatial calibration component, among other elements. In particular, graphical region 1102 includes graphical elements indicating that spatial calibration is performed in a stationary position (e.g., a sitting position) at the particular location within the given environment. Additionally, graphical region 1102 includes graphical elements indicating that the spatial calibration component balances audio output of the playback device to the particular location within the given environment.

Control interface 1100 also includes a selectable control 1104, that when selected, displays the next prompt that may initiate the spatial calibration component or further prepare the particular location for the spatial calibration component. Control interface 1100 also includes a selectable control 1106, that when selected, displays the previous prompt (e.g., control interfaces 700, 800, 900, and/or 1000).

In some cases, a removable case or cover is installed on the control device. Such protection may be installed on control devices such as smartphones and tablets to protect the device from various hazards, such as drops or spills. However, some types of cases affect microphone reception. For instance, a removable case might fully or partially cover the microphone, which may attenuate sound before it reaches the microphone. To prepare an environment for calibration, a control device may display a prompt to remove any removable cases or covers from the control device.

Figure 12:
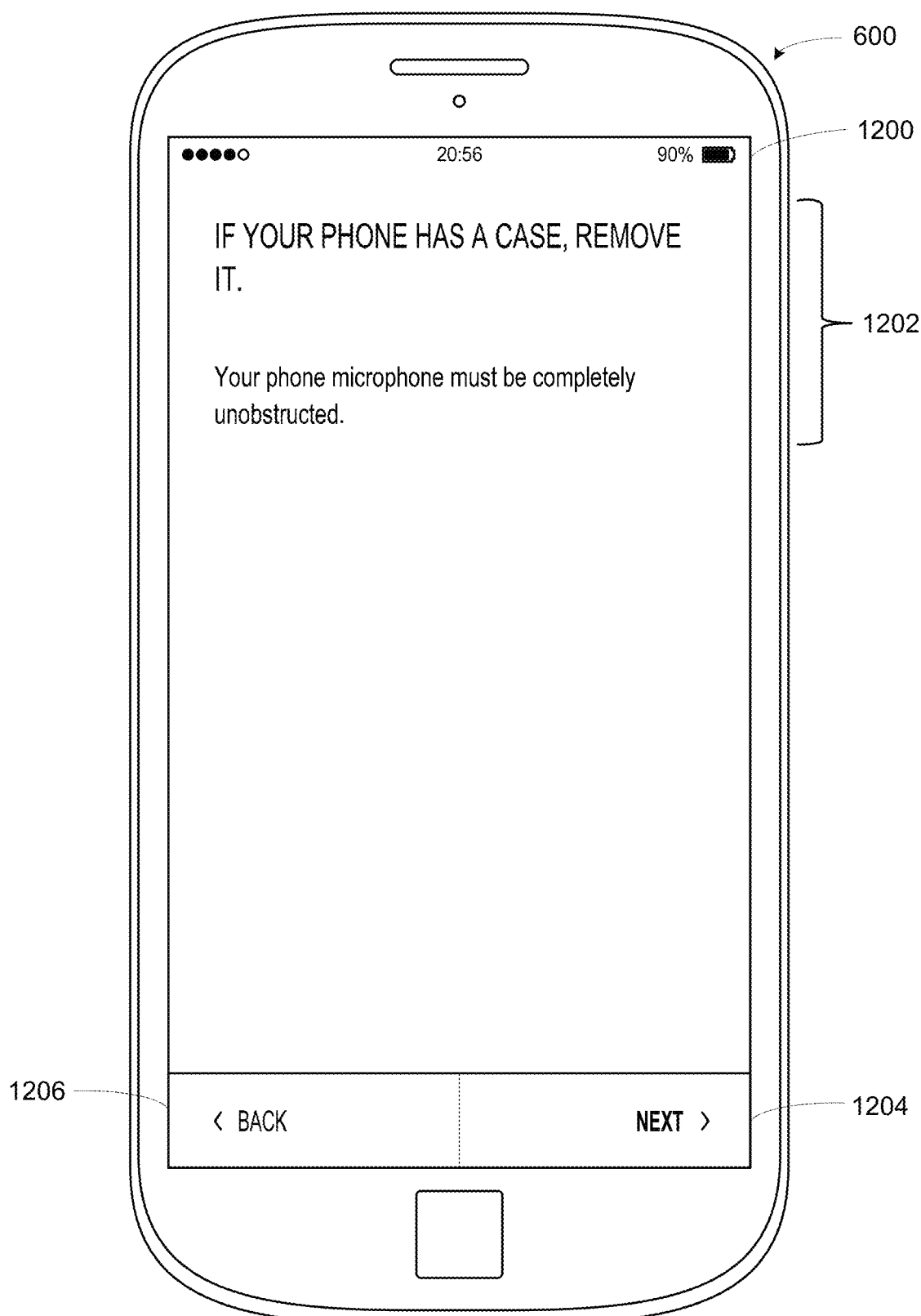
FIG. 12 shows a control device that is displaying a further example control interface, according to an example implementation.

To illustrate, in FIG. 12, control device 600 is displaying example control interface 1200. Control interface 1200 may be displayed before or after control interface 1100. In some instances, it may not be necessary to display control interface 1200. Control interface 1200 includes a graphical region 1202 which prompts to remove a case from control device 600 if a case is installed. As shown, graphical region 1202 suggests that the phone microphone should be unobstructed. Some cases might not obstruct the microphone of the control device 600 sufficiently to prevent it from adequately detecting calibration tones played by the one or more playback devices.

Like several of the other example control interfaces, control interface 1200 includes several selectable controls. Selectable control 1204, when selected, advances the calibration procedure (e.g., by causing the control device to display a prompt to prepare another aspect of the media playback system or environment for calibration). Further, selectable control 1206, when selected, steps backward in the calibration procedure.

Some control devices, such as smartphones, have microphones that are mounted towards the bottom of the device, which may position the microphone nearer to the user's mouth during a phone call. However, when the control device is held in a hand during the calibration procedure, such a mounting position might be less than ideal for detecting the calibration sounds. For instance, in such a position, the hand might fully or partially obstruct the microphone, which may affect the microphone detecting calibration sounds emitted by the playback device. In some cases, rotating the control device such that its microphone is oriented upwards may improve the microphone's ability to detect the calibration sounds, which may improve the calibration quality.

In an attempt to position a control device in such an orientation, a control device may display a prompt to rotate the phone. In some cases, such as when a microphone of a control device is mounted near the bottom of the device, the control device may display a prompt to rotate the phone by, for example, 180 degrees about a horizontal axis such that the microphone is oriented upwards after the rotation. After such a rotation, the control device may be upside down relative to its intended orientation within a hand (e.g., with the microphone towards the top of the device, and perhaps with a speaker towards the bottom of the device).

Figure 13:
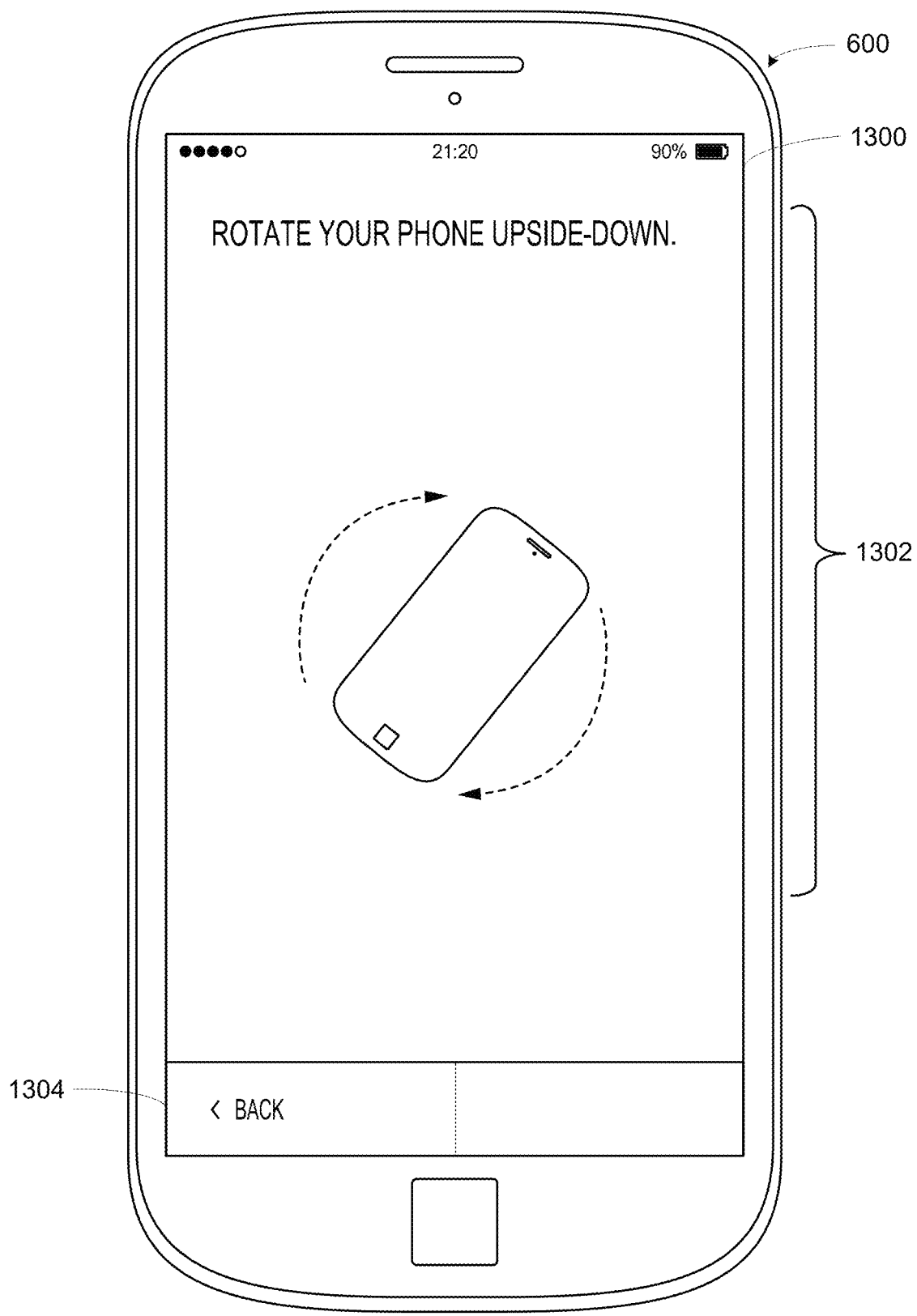
FIG. 13 shows a control device that is displaying another example control interface, according to an example implementation.

By way of example, in FIG. 13, control device 600 displays an example control interface 1300. Control device 600 might display control interface 1300 in addition to or as an alternative to control interfaces 700-1200. As shown, control interface 1300 includes a graphical region 1302 which includes graphical elements that provide indications to rotate control device 600. Control interface 1300 also includes a selectable control 1304, that when selected, displays the previous prompt (e.g., control interfaces 700, 800, 900, 1000, 1100 and/or 1200).

In some cases, a device manufacturer may choose to mount a microphone in other positions on the phone. In such cases, rotating the phone might not orient the microphone in an improved orientation for detecting the calibration sounds. Further, such positions may be unpredictable. To avoid such issues, in some embodiments, the control device may identify the mounting position of a suitable microphone within the control device and display a prompt to rotate the phone based on that mounting position. For instance, the control device may query a server that maintains data (e.g., a database) correlating particular control device models to known mounting positions of the microphone. Such a query may return an indication of the particular mounting position of a microphone on the control device, which the control device may use to display a prompt for a particular rotation that is based on the mounting position.

Because the control device may be rotated in a hand after the control device displays a prompt to rotate the control device, the display of the control device may be upside down from the perspective of the user. Such an orientation may interfere with the user interacting with control interfaces or other elements shown on the display. To offset the rotation, the control device may display a control interface that is rotated relative to the previously displayed control interface(s). Such a control interface may offset the rotation of the device so as to orient the control interface in an appropriate orientation to view and interact with the control interface.

Figure 14:
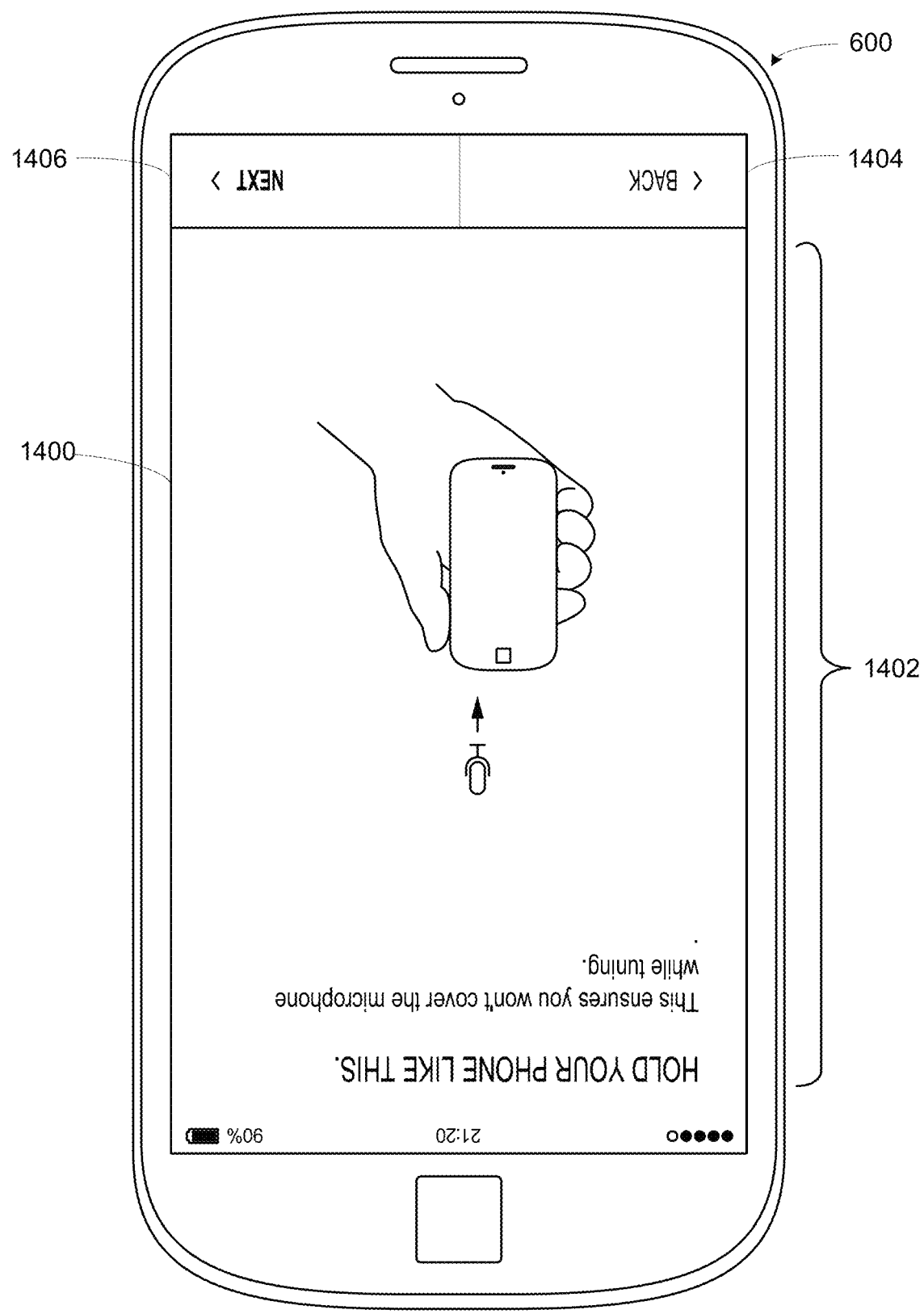
FIG. 14 shows a control device that is displaying yet another example control interface, according to an example implementation.

To illustrate, in FIG. 14, control device 600 displays example control interface 1400. Control device 600 might display control interface 1400 in addition to or as an alternative to control interfaces 700-1300. As shown, control interface 1400 includes a graphical region 1402 which includes graphical elements indicating how to hold control device 600 for the calibration sequence, among other elements. While control interface 1400 may appear upside down on the page from some perspectives, from the perspective of a user holding control device 600 as illustrated in graphical region 1402, graphical region 1402 would appear right side up. In other words, when control device 600 is held upside down to improve the position of the microphone, control interface 1400 would appear right side up for convenience of a user viewing the graphical elements in graphical region 1402.

Control interface 1400 also includes a selectable control 1406, that when selected, displays the next prompt that may initiate the spatial calibration component or further prepare the particular location for the spatial calibration component. Control interface 1400 also includes a selectable control 1404, that when selected, displays the previous prompt (e.g., control interfaces 700-1200 and/or 1300).

Some operating systems may restrict programs from accessing to certain hardware, such as the microphone. Accordingly, in some cases, preparing the particular location for spatial calibration may involve removing such restrictions to grant access to the microphone such that it can be used to detect calibration sounds. The technique for granting access to the microphone may vary by operating system. Some control devices have operating systems that prompt for permission to grant access to the microphone when the microphone is accessed. Other control devices have a settings menu by which access to the access to the microphone can be granted. To facilitate access to the microphone, the control device may display instructions to grant access to the microphone of the control device. Such instructions may vary by device (e.g., by the operating system of the device). Alternative techniques to obtain access to the microphone are contemplated as well.

Figure 15:
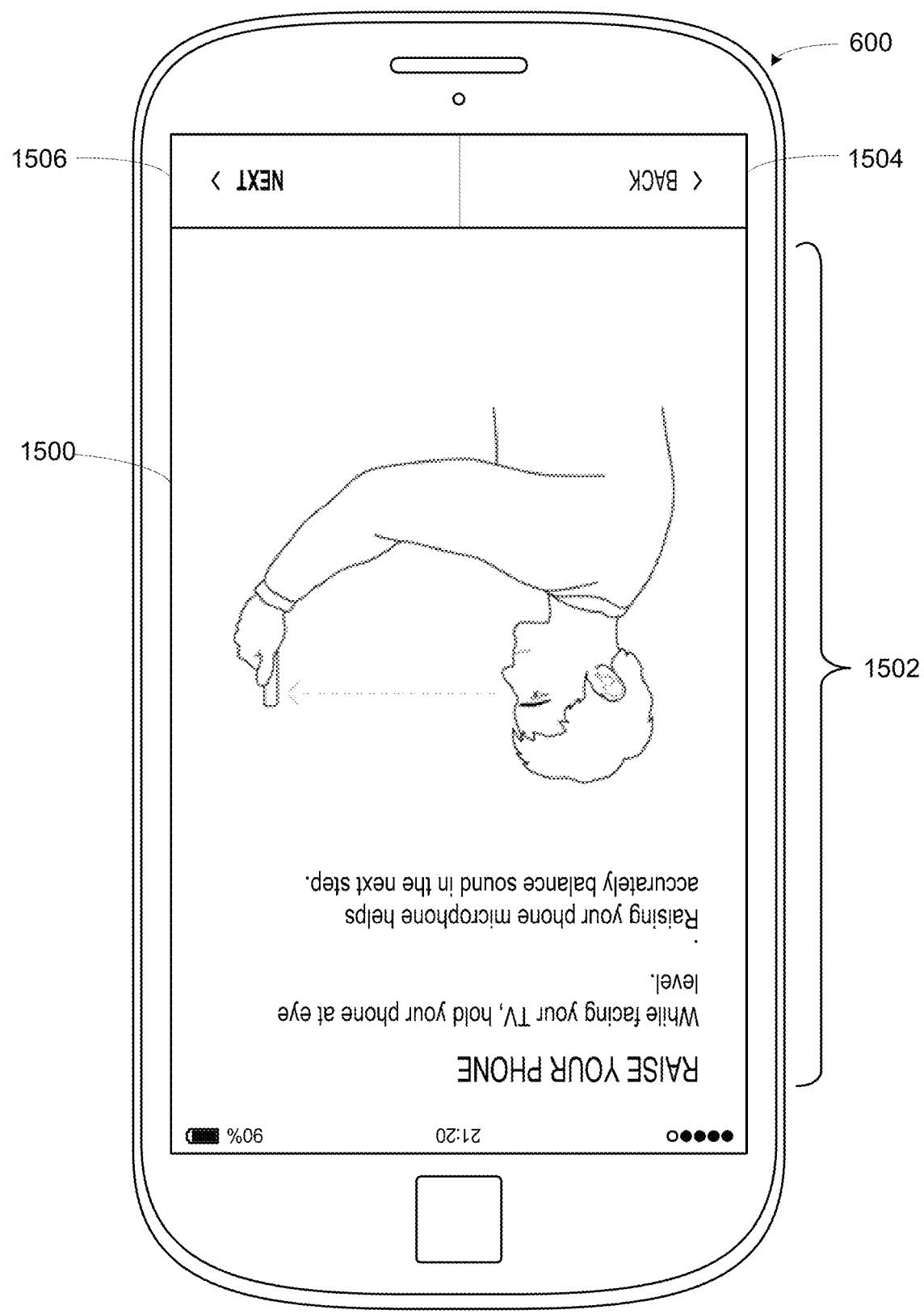
FIG. 15 shows a control device that is displaying an example control interface, according to an example implementation.

In FIG. 15, control interface 1500 includes a graphical region 1502 which includes graphical elements providing an indication to adjust the height of control device 600 while control device 600 is positioned at the particular location within the given environment during the spatial calibration component. Adjusting the height of control device 600 may further improve calibration of the particular location. Graphical region 1502 also includes graphical elements indicating a particular height (e.g., eye level) of control device 600 for the spatial calibration component. Graphical region 1502 further includes graphical elements indicating that adjusting the height of control device 600 facilitates sound balance at the particular location within the given environment.

As shown in FIG. 15, control interface 1500 also includes a selectable control 1506, that when selected, displays the next prompt that may initiate the spatial calibration component or further prepare the particular location for the spatial calibration component. Control interface 1500 also includes a selectable control 1504, that when selected, displays the previous prompt (e.g., control interfaces 700-1300 and/or 1400).

c. Initiate Spatial Calibration of Playback Device

Referring back to FIG. 5, at block 506, implementation 500 involves initiating spatial calibration of the playback device within the particular location of the given environment. The spatial calibration component may be initiated upon detecting selection of a first selectable control.

To cause the spatial calibration component to be initiated, control device 600 may send an instruction that causes the playback device to emit one or more pre-determined calibration sounds. The control device may transmit such a command by way of a network interface. Upon receiving such a command, the playback device may output a series of calibration tones. The playback device may listen for such calibration sounds. Recordings of the calibration sounds emitted by the playback device may be analyzed to determine calibration settings for the environment. The calibration sound may be periodic such that the repetitions of the calibration sound continue for a calibration interval. During the calibration interval, repetitions of the calibration sound may be detected at the particular location within the given environment.

In some embodiments, different calibration procedures (e.g., spatial calibration component, spectral calibration component) may use different calibration sounds. Additionally or alternatively, different playback devices may emit different calibration sounds. In some cases, a playback device with multiple speakers or transducers may emit different calibration sounds via each speaker or transducer.

In some instances, each speaker or transducer may emit the calibration sounds simultaneously. In other instances, the speakers or transducers may emit the calibration sounds at different times.

Some calibrations and/or playback devices may use a combination of different calibration sounds. Within examples, the calibration sound may be an impulse (like a clap or a spark) or a sine sweep, among other examples. The calibration sound may be either audible (i.e. within 20-20,000 Hz) or inaudible (e.g., greater than 20,000 Hz). In some cases, the playback device may emit audible music and an inaudible calibration sound, which may improve user experience as the user can listen to the music during the calibration procedure. In some embodiments, a playback device with multiple speakers or transducers may emit the audible music via one of the speakers and the inaudible calibration sound via another speaker. The playback device may emit the calibration sounds simultaneously or at different times or intervals.

While some example implementations described herein utilize a microphone of a control device in example calibration procedures, other example calibration procedures contemplated herein may involve a microphone that is not incorporated into the control device. Such a standalone microphone might be connected into the control device or the playback device, so as to facilitate recording of the emitted calibration sounds.

Figure 16:
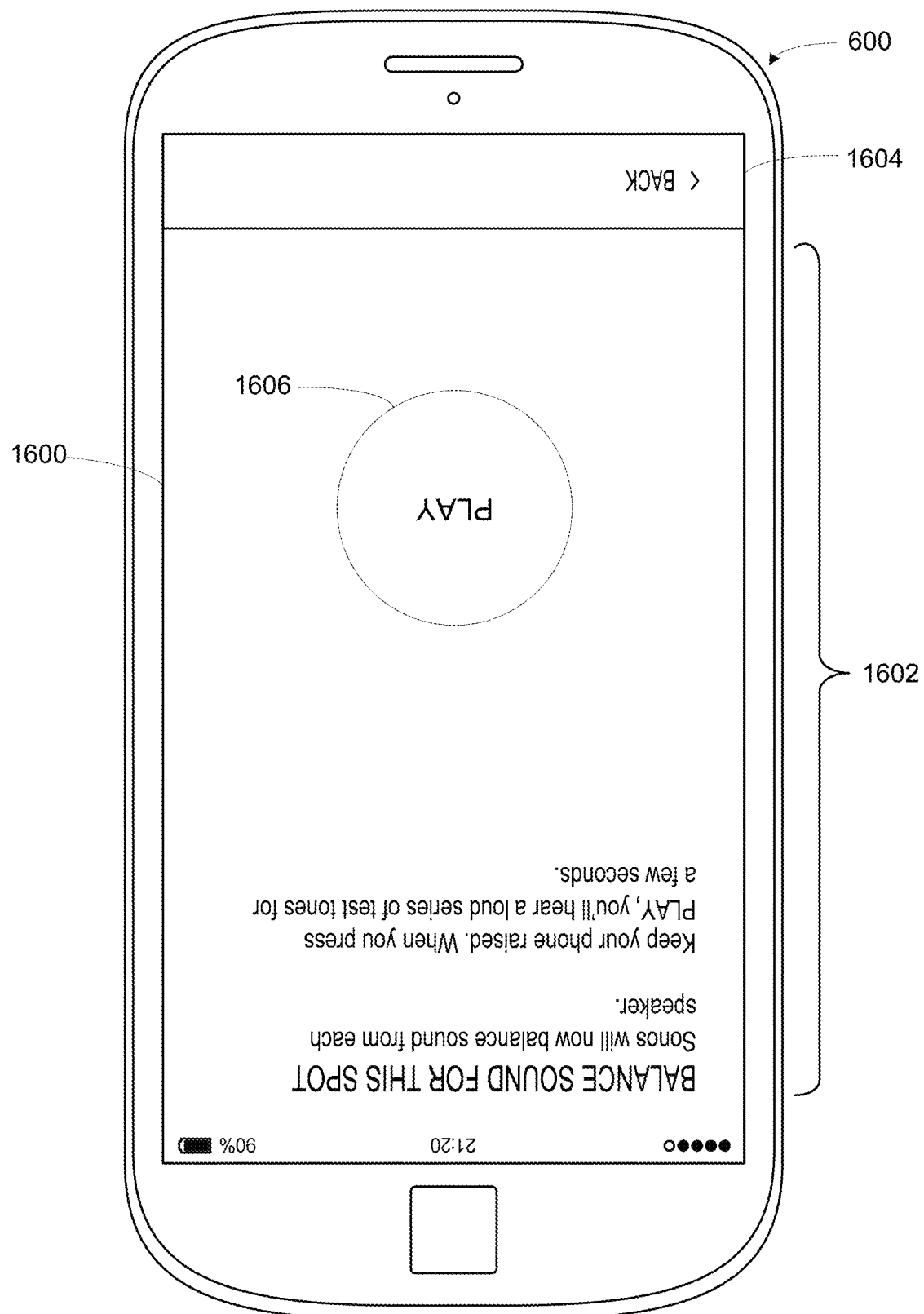
FIG. 16 shows a control device that is displaying yet another example control interface, according to an example implementation.

As noted above, the spatial calibration component may be initiated upon detecting selection of a first selectable control. Before detecting selection of the first selectable control, a control device, such as control device 600, may display one or more prompts indicating the position of the control device during the calibration sequence, and what the spatial calibration sequence involves, among other possibilities. FIG. 16 illustrates an example control interface 1600 displaying such a prompt.

As shown, control interface 1600 includes a graphical region 1602 which includes graphical elements providing an indication to maintain control device 600 at a particular position (e.g., eye level) after selection of first selectable control 1606. Graphical region 1602 also includes graphical elements indicating that the spatial calibration component involves the playback device playing a series of calibration tones for a given duration of time upon selection of the first selectable control 1606. Upon selecting first selectable control 1606 in control interface 1600, control device 600 may initiate spatial calibration. Control interface 1600 also includes a selectable control 1604, that when selected, displays the previous prompt (e.g., control interfaces 700-1400 and/or 1500).

Upon detecting selection of the first selectable control 1606, the spatial calibration component may be initiated. While detecting the calibration tone from a playback device, the control device may display a control interface indicating that the control device and the playback device are performing the calibration. To illustrate, FIGS. 17A, 17B, 17C, 17D, 17E, and 17F include control interfaces which include graphical regions indicating that the control device 600 is facilitating the spatial calibration component, while the playback device plays a one or more calibration tones. Facilitating the spatial calibration component may involve the control device 600 detecting the one or more calibration tones via one or more microphones of the control device 600.

Additionally, FIGS. 17A, 17B, 17C, 17D, 17E, and 17F illustrate example control interfaces which include graphical regions indicating a plurality of circular graphical elements 1706 that pulse in synchrony with the one or more of calibration tones played by the playback device during the spatial calibration component. Each figure represents a position of the plurality of circular graphical elements 1706 at different times during the spatial calibration component. The plurality of circular graphical elements 1706 that pulse in synchrony with the calibration tones are indicative of a location of the playback device relative to the particular location within the given environment. Such an animation may also indicate that the control device 600 is in process of detecting one or more calibration tones, and graphically inform the user to continue to maintain the control device 600 at a particular position, height, and/or orientation.

Figure 17A:
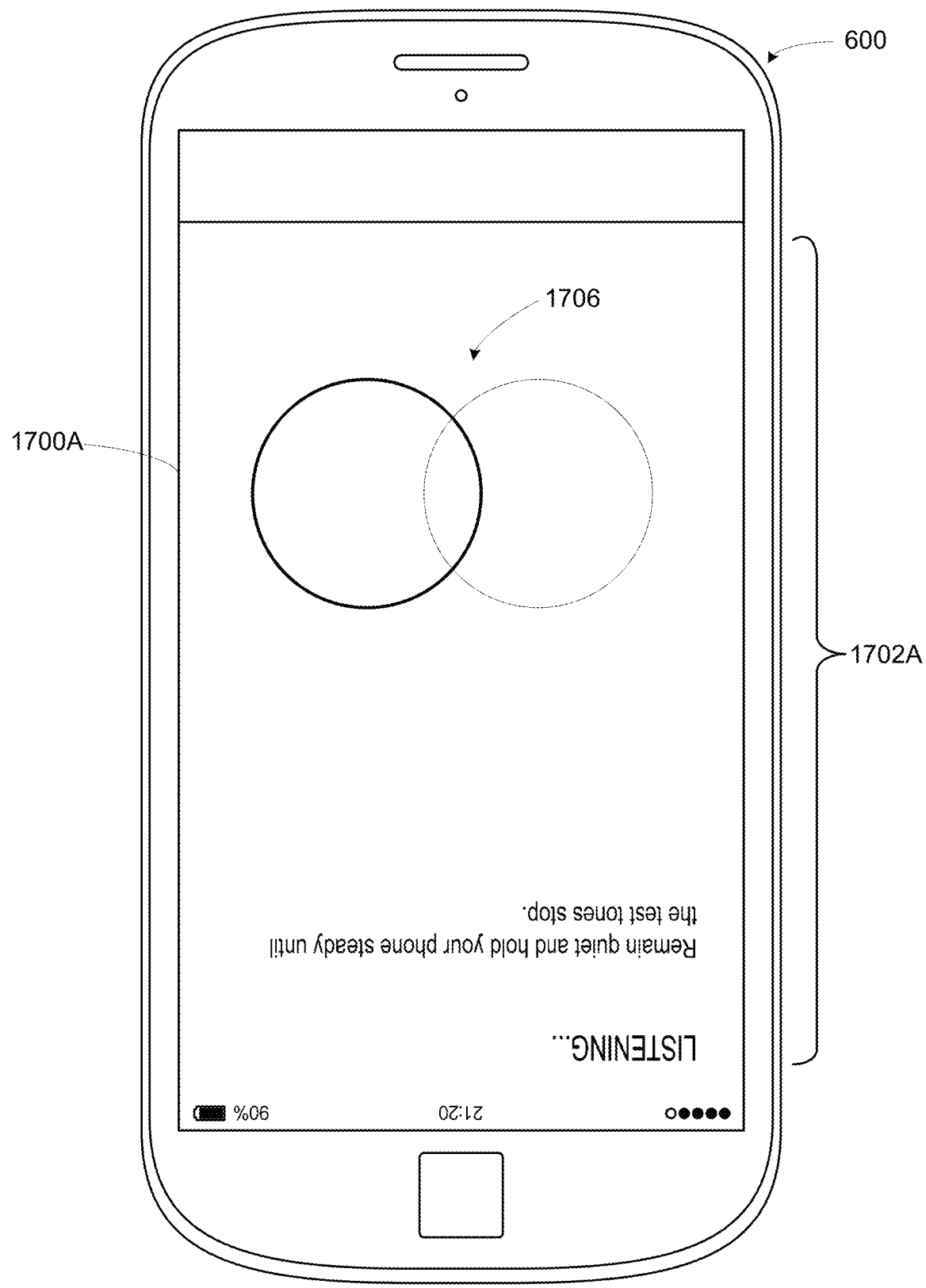
FIG. 17A shows a control device that is displaying an example control interface, according to an example implementation.

Within examples, upon selection of first selectable control 1606 in FIG. 16, the control device 600 may display control interface 1700A as shown in FIG. 17A. Control interface 1700A includes a graphical region 1702A which includes an indication that the control device 600 is in process of detecting and/or listening for one or more calibration tones from a playback device. Graphical region 1702A also includes an indication that graphically prompts the user to continue to maintain position of the control device 600 until control device 600 stops receiving calibration tones from the playback device. To convey that the control device 600 is still in process of detecting and/or listening to one or more calibration tones, the graphical region 1702A includes the plurality of circular graphical elements 1706 that pulse in synchrony with the one or more calibration tones. In some examples, control interface 1700A may also include a selectable control (not shown), that when selected, displays a previous prompt or cancels or defers the calibration process.

Figure 17B:
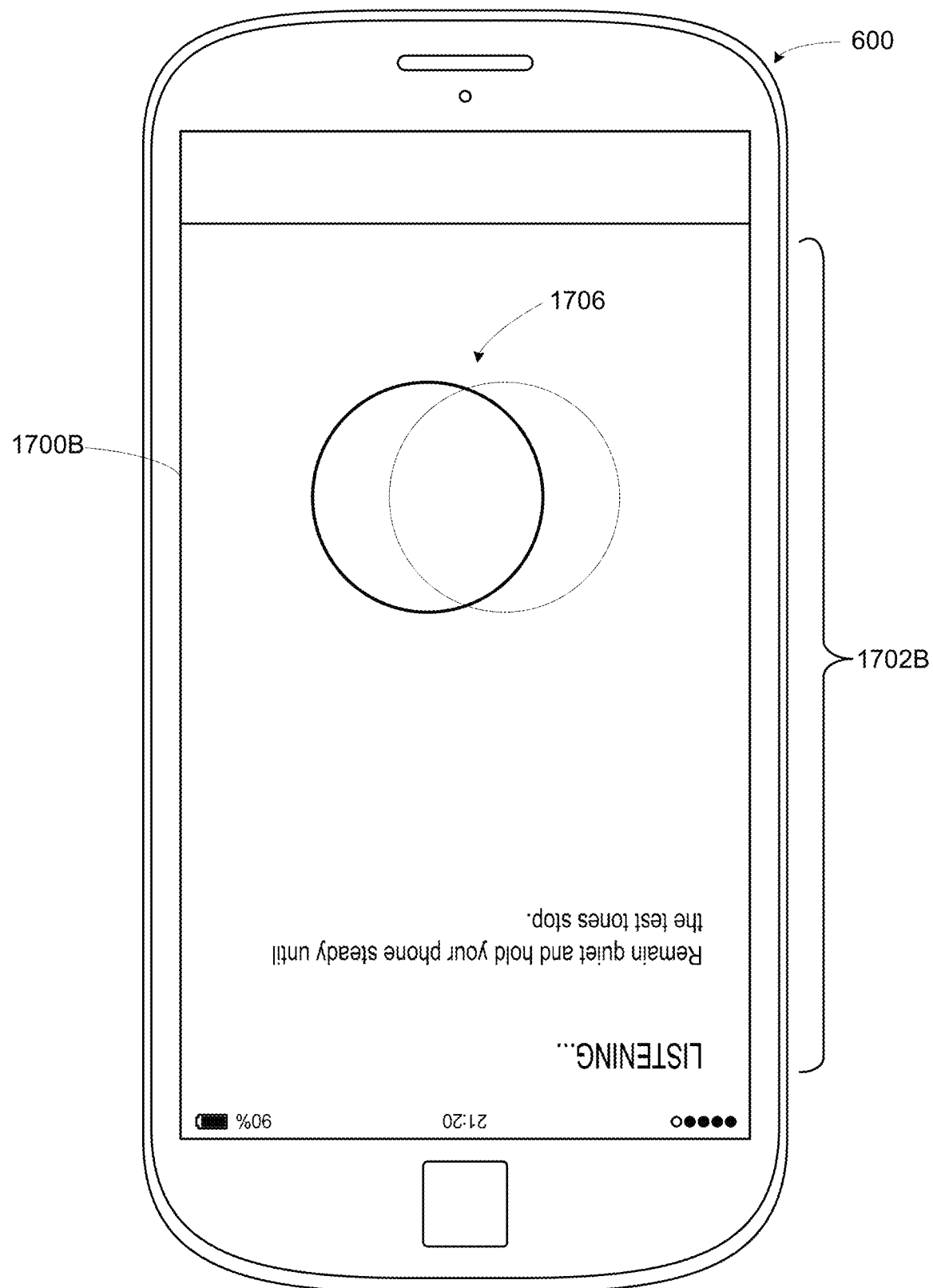
FIG. 17B shows a control device that is displaying a further example control interface, according to an example implementation.

To illustrate the movement of the plurality of circular graphical elements 1706, FIG. 17B shows an example control interface 1700B which includes a graphical region 1702B. Graphical region 1702B displays similar indications as shown in graphical region 1702A. Specially, graphical region 1702B includes the plurality of circular graphical elements 1706 which have moved closer to each other relative to the plurality of circular graphical elements 1706 displayed in graphical region 1702A. As noted above, such movement may be indicative of a location of the playback device relative to the particular location within the given environment. In some examples, such movement may be indicative of a distance of an emitted calibration tone relative to the location of the control device. For instance, the plurality of circular elements 1706 may move closer or further away from each other based on the distance between a calibration tone (emitted from the playback device) and the control device 600.

Figure 17C:
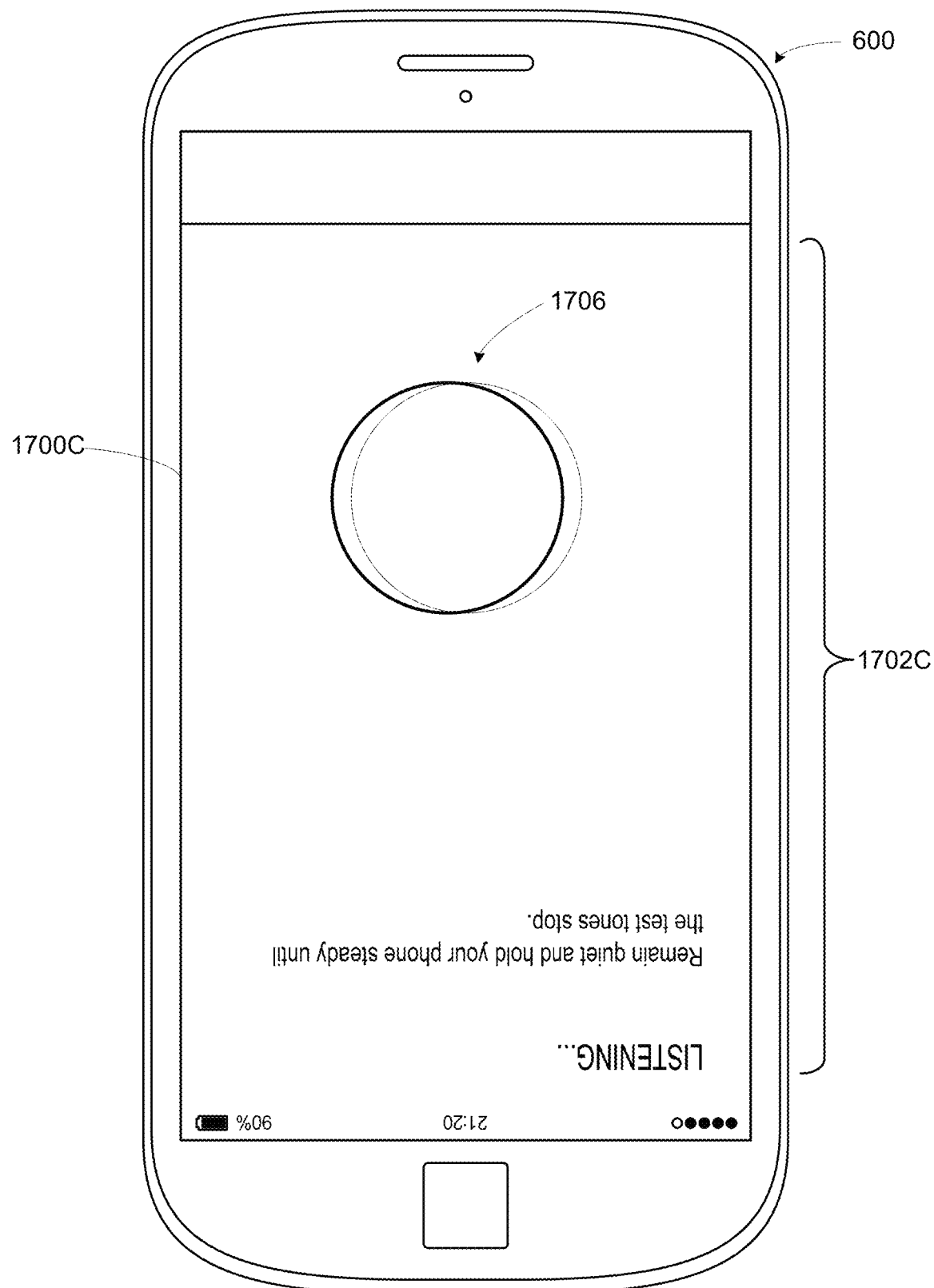
FIG. 17C shows a control device that is displaying a further example control interface, according to an example implementation.

To further illustrate the movement of the plurality of circular graphical elements 1706, FIG. 17C illustrates another example control interface 1700C which includes a graphical region 1702C. Graphical region 1702C displays similar indications as shown in graphical regions 1702A and 1702B. In particular, the plurality of circular elements 1706 in graphical region 1702C have moved even closer to each other relative to the plurality of circular elements 1706 displayed in 1702A and 1702B.

Figure 17D:
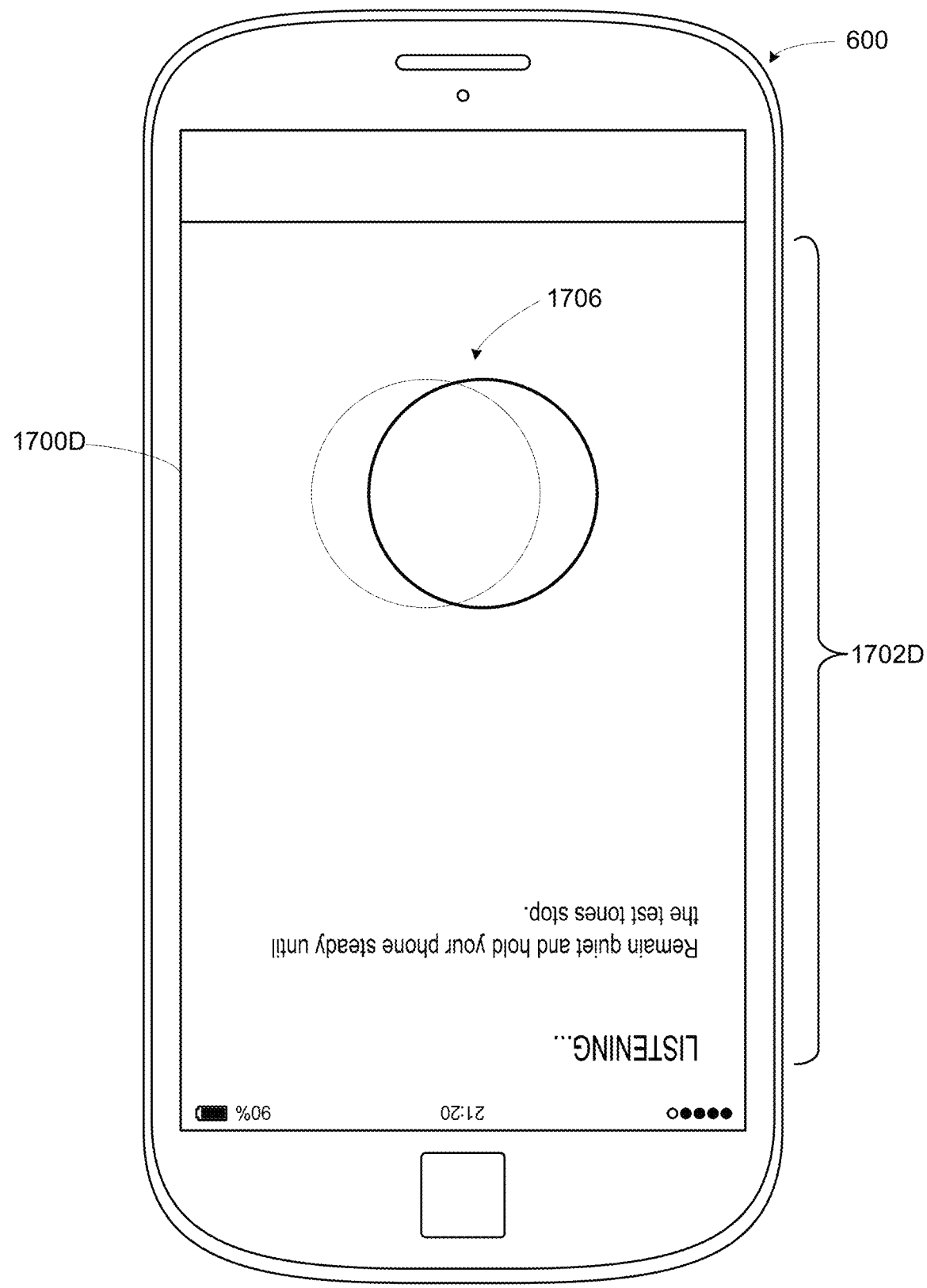
FIG. 17D shows a control device that is displaying an example control interface, according to an example implementation.

In some instances, as the calibration tone emitted from the playback device continues to travel, the plurality of circular elements 1706 may continue to move closer to each other and eventually switch positions. To illustrate, FIG. 17D shows an example control interface 1700D which includes a graphical region 1702D. Graphical region 1702D displays similar indications as shown in graphical regions 1702A, 1702B, and 1702C. As shown, the plurality of circular elements 1706 have switched positions. In some examples, such change in position may be indicative of the control device 600 detecting the calibration tone emitted from the playback device and/or waiting for the playback device to emit the next calibration tone. The plurality of circular elements 1706 may move away from each other until the playback device emits the next calibration tone. In other examples, such change in position may be indicative of the playback device emitting the next calibration tone. The plurality of circular elements 1706 may move closer or away from each other to indicate the location of the next calibration tone relative to the control device 600 or the particular location within the given environment.

Figure 17E:
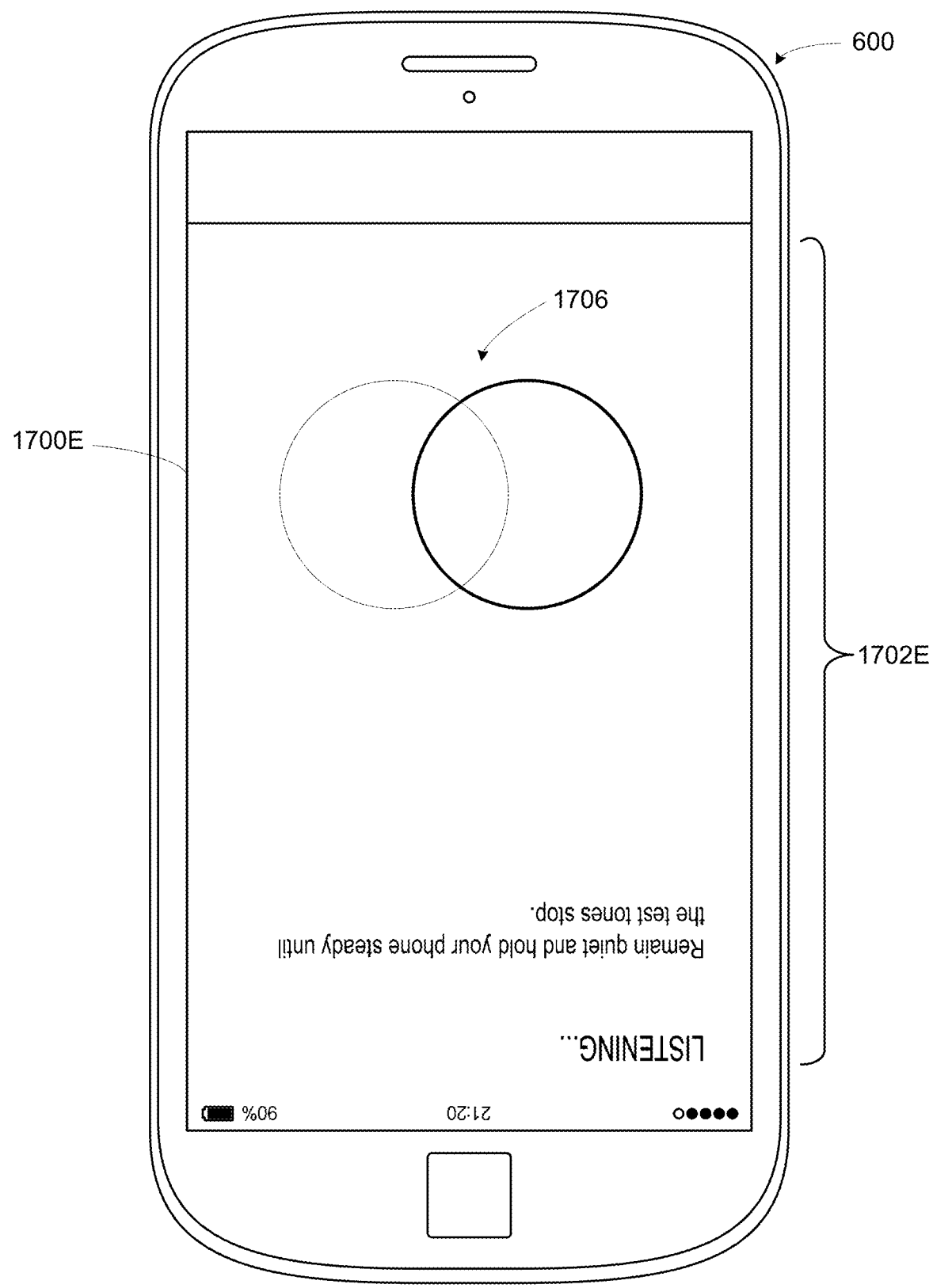
FIG. 17E shows a control device that is displaying another example control interface, according to an example implementation.

To further illustrate the movement of the plurality of circular graphical elements 1706, FIG. 17E illustrates another example control interface 1700E which includes a graphical region 1702E. Graphical region 1702E displays similar indications as shown in graphical regions 1702A, 1702B, 1702C, and 1702D. In particular, graphical region 1702E includes the plurality of circular elements 1706 which have moved further away from each other relative to the plurality of circular elements 1706 displayed in graphical region 1702D.

Figure 17F:
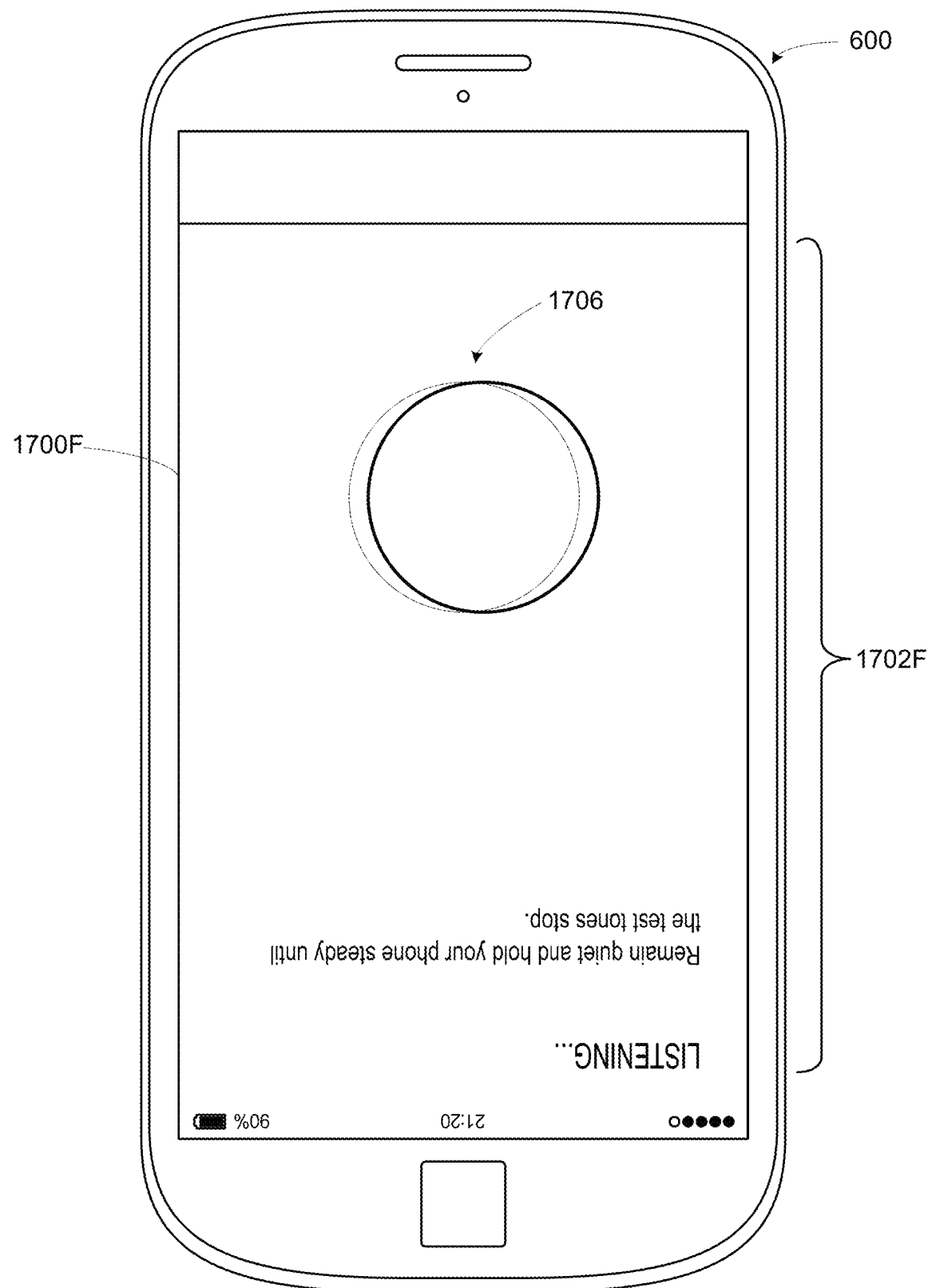
FIG. 17F shows a control device that is displaying yet another example control interface, according to an example implementation.

To further illustrate the movement of the plurality of circular graphical elements 1706, FIG. 17F illustrates yet another example control interface 1700F which includes a graphical region 1702F. Graphical region 1702F includes the plurality of circular elements 1706 which have moved closer to each other relative to the plurality of circular elements 1706 displayed in graphical region 1702D and 1702E. The plurality of circular elements 1706 may continue to move and/or switch positions as shown in control interfaces 1700A, 1700B, 1700C, 1700D, 1700E, 1700F until the playback device stops emitting a calibration tone. As noted above, in some cases, ambient noise may be constantly monitored throughout the calibration sequence, and the calibration sequence may be aborted or interrupted if the background noise level exceeds the calibration threshold. In such cases, control device 600 may display a control interface that prompts to reduce ambient noise within the environment until the ambient noise level is less than that calibration threshold.

Figure 18:
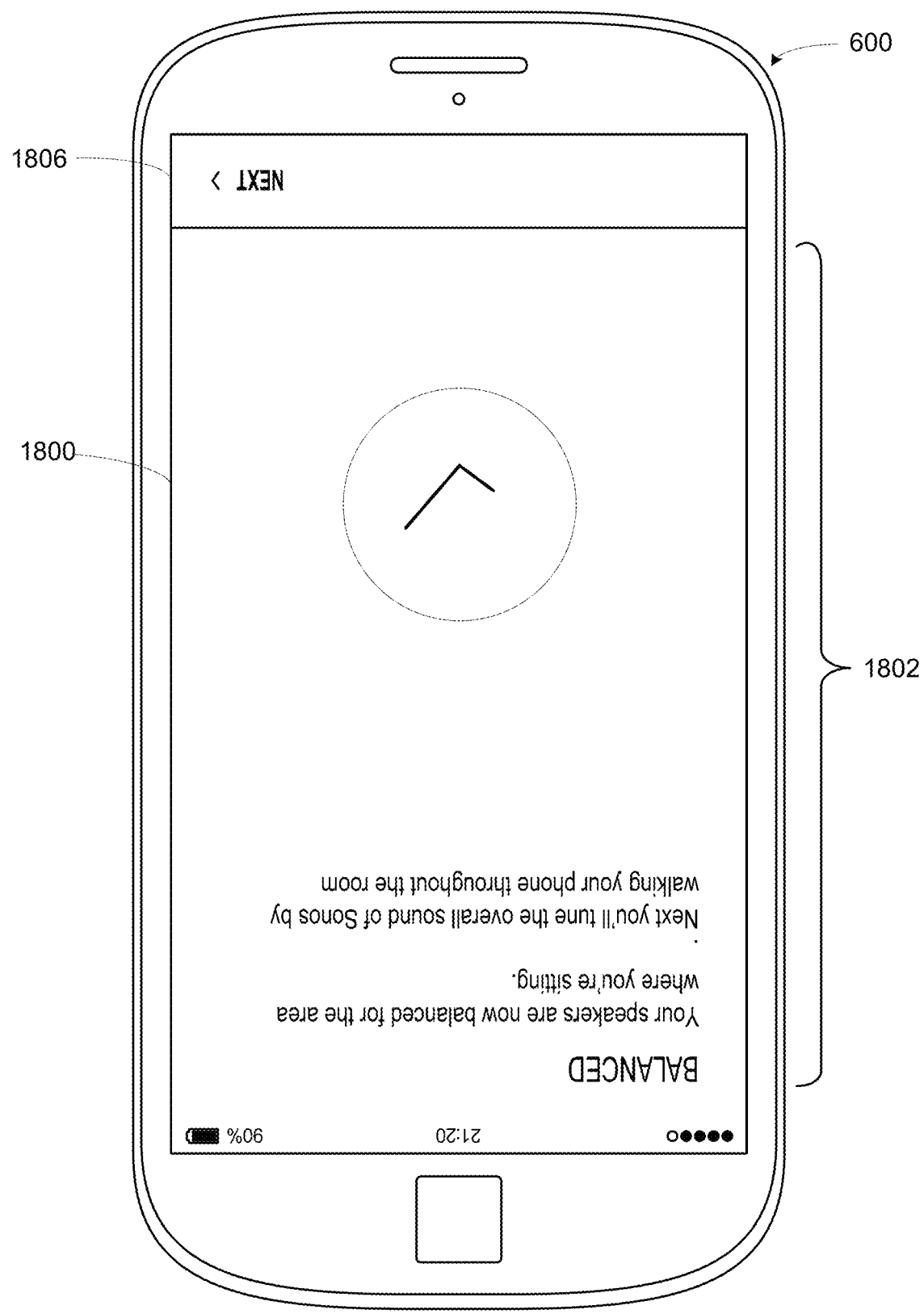
FIG. 18 shows a control device that is displaying an example control interface, according to an example implementation.

Once the spatial calibration component of the calibration sequence is complete, control device 600 may display a control interface to notify the user. In some examples, the plurality of circular elements 1706 may stop moving and/or switching positions. FIG. 18 illustrates another example. As shown, control interface 1800 includes a graphical region 1802 which includes graphical elements indicating that the spatial calibration component of the calibration sequence is complete. Graphical region 1802 also includes graphical elements indicating that the spectral calibration component is next in the calibration sequence. Control interface 1800 includes a selectable control 1806, that when selected, prepares to initiate the spectral calibration component or initiates the spectral calibration component d. Spectral Calibration of Playback Device After completing the spatial calibration component of the calibration sequence, control device 600 may display one or more prompts to prepare the given environment for spectral calibration of the playback device. As noted above, some calibration procedures involve the control device using a microphone to listen for calibration tones emitted by the playback device that is being calibrated. Preparing the control device for spectral calibration may further involve setting up the conditions, so that the microphone of the control device can detect the calibration sounds emitted by the playback devices.

In some examples, after the spatial calibration component of the calibration sequence is complete, control device 600 may display one or more prompts to adjust an orientation of the control device 600 similar to the prompt in FIG. 13.

Figure 19:
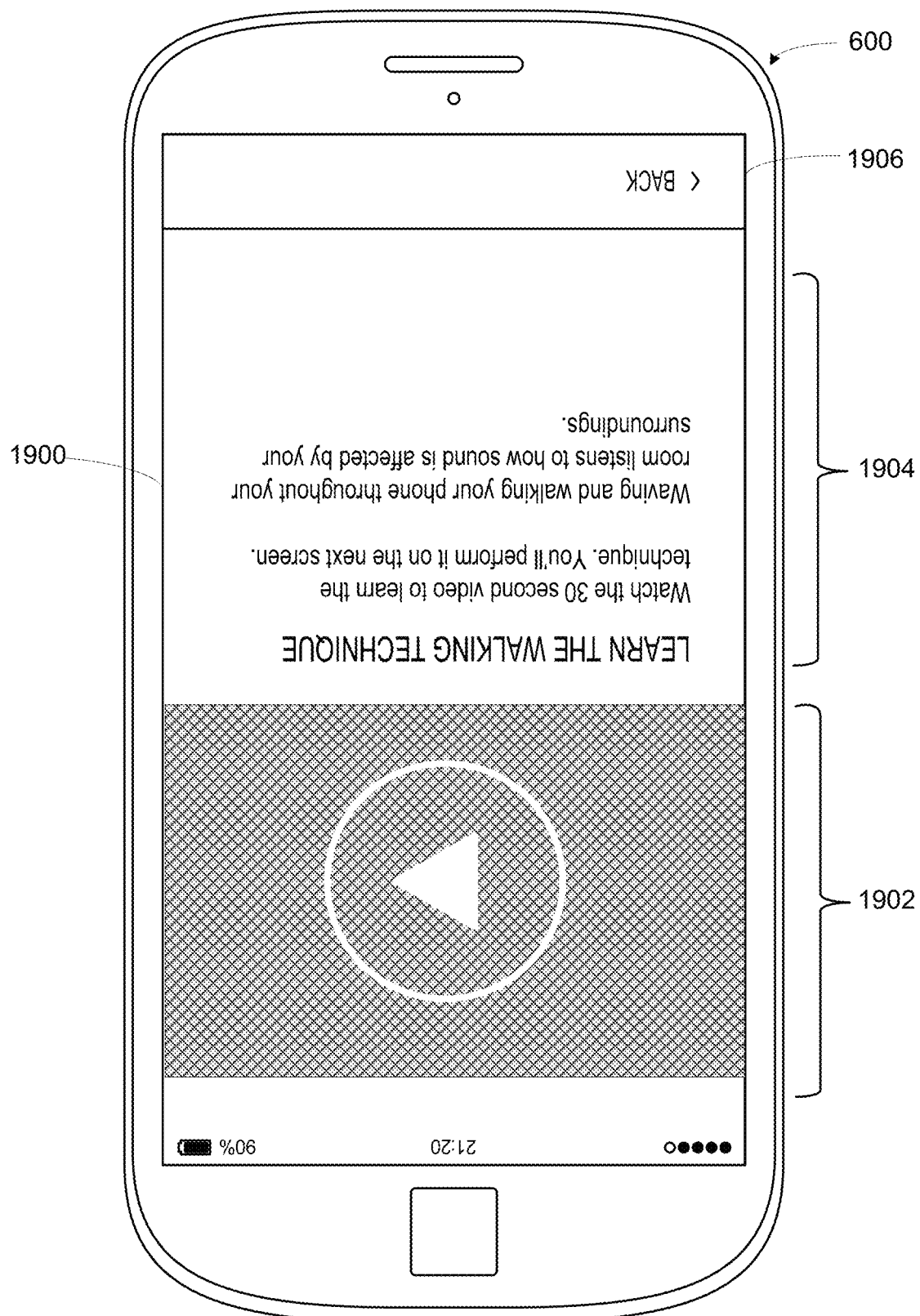
FIG. 19 shows a control device that is displaying an example control interface, according to an example implementation.

In FIG. 19, control device 600 displays another example control interface, control interface 1900 which includes graphical regions 1902 and 1904. Graphical region 1902 includes a video depicting an example of how to move control device 600 within the environment during the spectral calibration component of the calibration sequence. Graphical region 1904 prompts to watch the video in graphical region 1902. Control interface 1900 also includes selectable control 1906, which steps backward in the calibration sequence.

In some embodiments, the control device might require that at least a portion of the video or animation be played back before the calibration procedure is advanced. Such a requirement may promote knowledge of how to move the control device during calibration so as to obtain samples from multiple locations within the environment. For example, referring to FIG. 19, control device 600 might require at least 50% (or some other portion) of the video in graphical region 1902 to be played back before the calibration procedure can advance. Once the requisite portion has been played back, control device 600 may activate or display a selectable control (not shown) such that selection of the selectable control causes control device 1906 to advance the spectral calibration component of the calibration sequence.

In some cases, the control device might not require that the portion of the video or animation be played back, as the video or animation has been previously played back (such that a familiarity with movement of the control device during calibration has already been established). For instance, control device 600 may determine whether the video in graphical region 1902 has been previously played back. If the video has not been previously played back, control device 600 may display a selectable control (not shown) after a threshold portion of the video has been played back. If the video has been previously played back, control device 600 may display a selectable control (not shown) before the threshold portion of the video has been played back.

Among examples, different entities may play back the video, which may affect familiarity with the calibration procedure. For example, while in a first iteration of the calibration procedure, a first user may have viewed the video depicting movement of the control device during calibration, a second user who has not viewed the video may be involved in a second iteration of the calibration procedure and not be familiar with how to move the control device. In an attempt to avoid such familiarity, determining whether the video in graphical region 1902 has been previously played back may be tied to certain entities. For instance, in some cases, control device 600 may determine whether the video in graphical region 1902 has been previously played back by control device 600 (as opposed to some other control device, since some example media playback systems may include multiple control devices (e.g., media playback system 100). Alternatively, a given user account may be logged in or active on control device 600 during the calibration procedure, and control device 600 may determine whether the video in graphical region 1902 has been previously played back by that user account (as opposed to another user account). In further cases, control device 600 may determine whether the video has been previously played back by a control device of the media playback system that includes control device 600 and the playback device under calibration. Other examples are possible as well.

Figure 20:
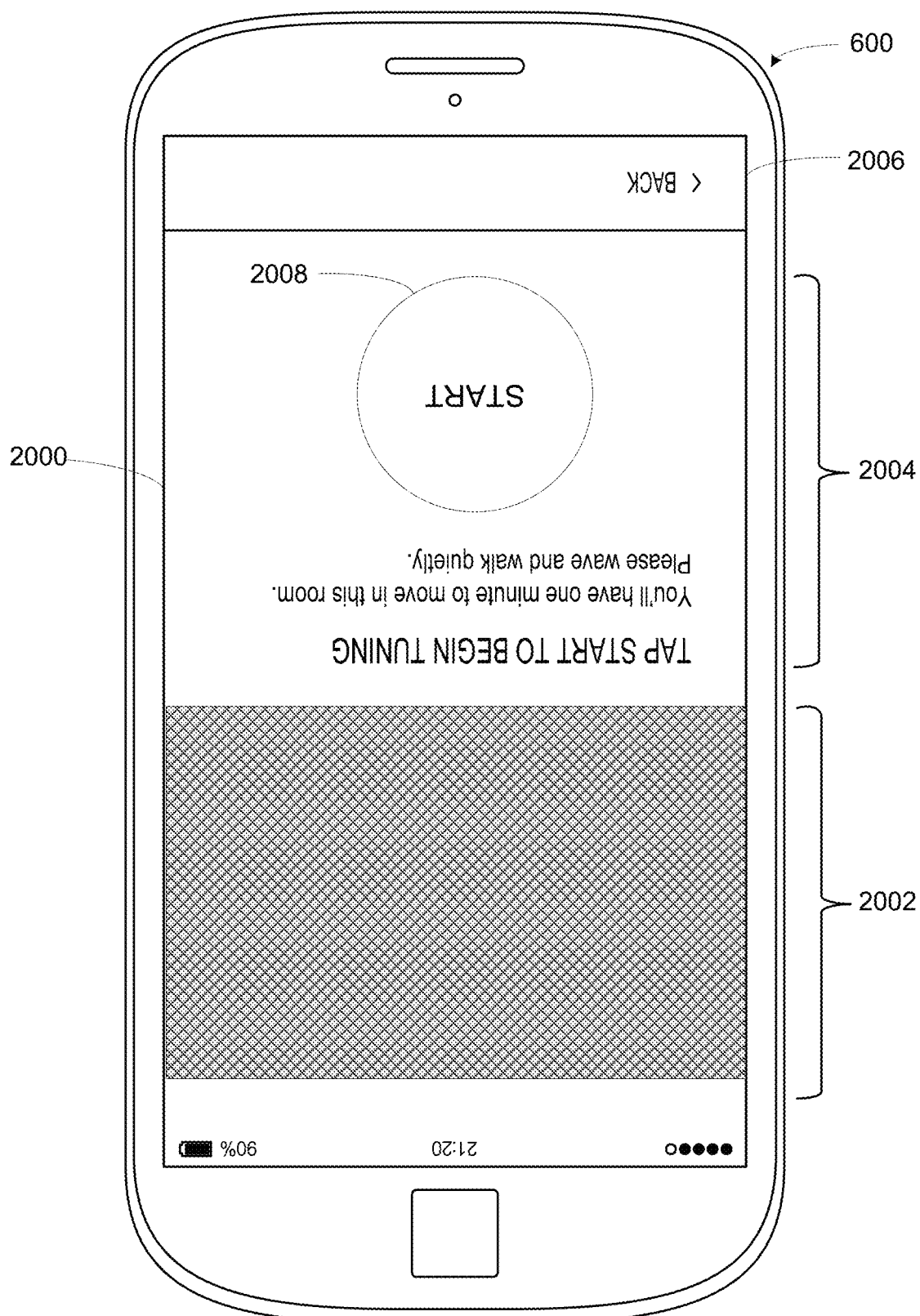
FIG. 20 shows a control device that is displaying another example control interface, according to an example implementation.

FIG. 20 displays another example control interface, control interface 2000, which prompts to prepare the given environment for spectral calibration of the playback device. Control interface 2000 includes a graphical region 2004 that prompts to tap selectable control 2008 (Start) when ready. When selected, selectable control 2008 may initiate the spectral calibration procedure. Control interface 2000 also includes a graphical region 2004 that includes a prompt to move the control device 600 within the environment (as may be shown on the video in graphical region 2002). Additionally, control interface 2000 includes selectable control 2006, which steps backward in the calibration sequence. As with other control interfaces, the particular combination of graphical elements and regions may vary by implementation. For instance, in some implementations, graphical interface 2000 might not include a graphical region 2002 that includes a video.

While the playback device emits a calibration tone, the control device 600 may display a control interface. Such a control interface may include an indication that the control device is listening for the presence of the calibration sound. Such an indication may be displayed while the control device attempts to detect or latch onto the emitted calibration tone. In some examples, a graphical region, such as selectable control 2008, may animate, such as by displaying a swirling pattern, while the control device 600 attempts to detect the emitted calibration tone. Such an animation may indicate that the control device is in the process of detecting the emitted calibration tone. After the control device detects the presence of the calibration sound, the control device may continue to record the calibration sound using a microphone.

Figure 21A:
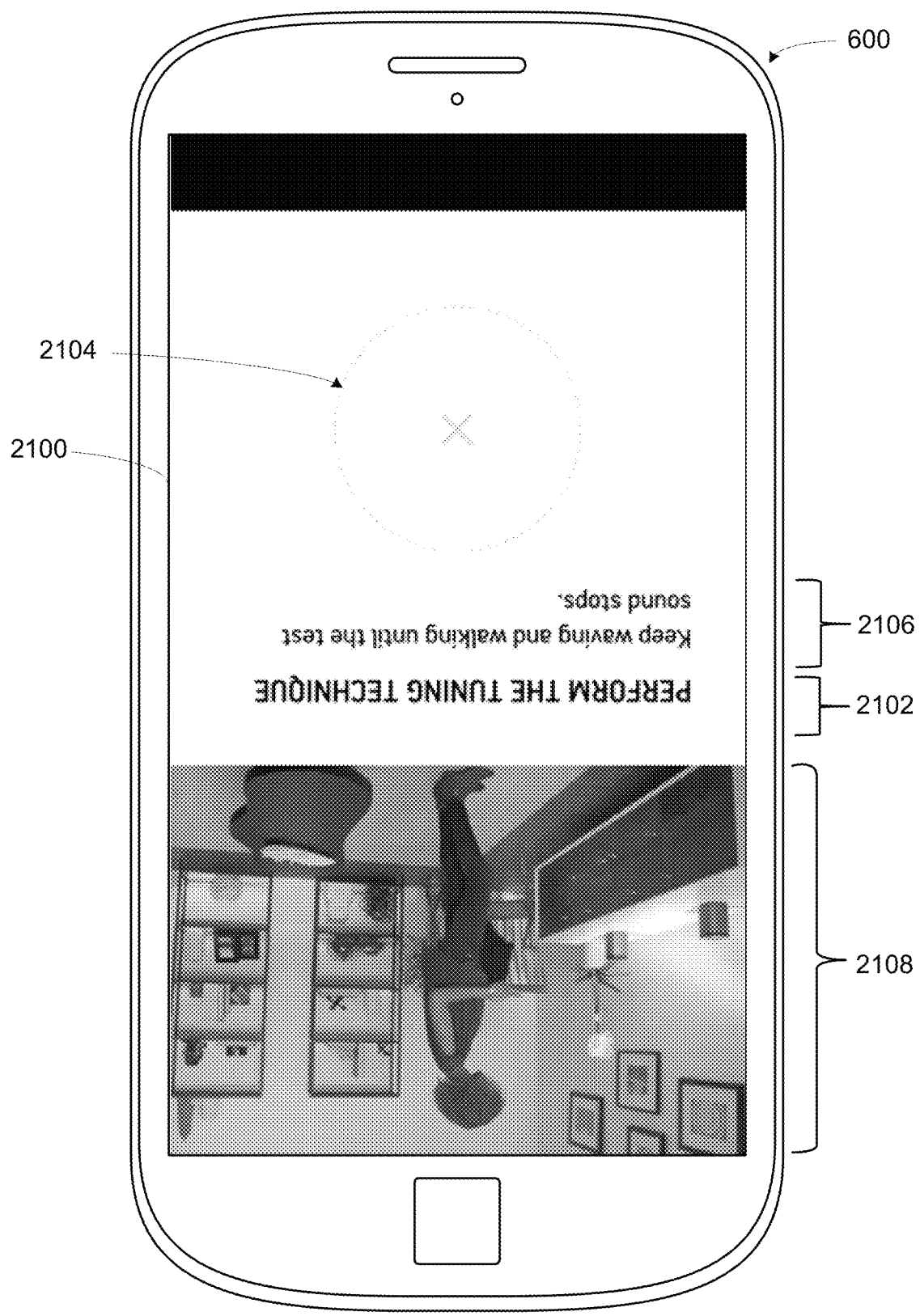
FIG. 21A shows a control device that is displaying yet another example control interface, according to an example implementation.

While detecting the calibration sound, the control device may display a control interface indicating that the control device and the playback device are performing the calibration. To illustrate, in FIG. 21A, control device 600 is displaying control interface 2100. Control interface 2100 includes a graphical region 2102 indicating that the calibration ("The Tuning Technique") is being performed. Control interface 2100 also includes a progress indicator 2104 indicating the duration of time remaining in the calibration interval (i.e., how much longer the playback device will emit the calibration sound). Such a progress indicator may also indicate how long to continue to move the control device within the environment. Control interface 2100 further includes a graphical region 2106 that includes a reminder to continue moving the control device until the calibration sound stops playing. In addition, a video in graphical region 2108 may playback so as to continue to demonstrate example movement of the control device.

Figure 21B:
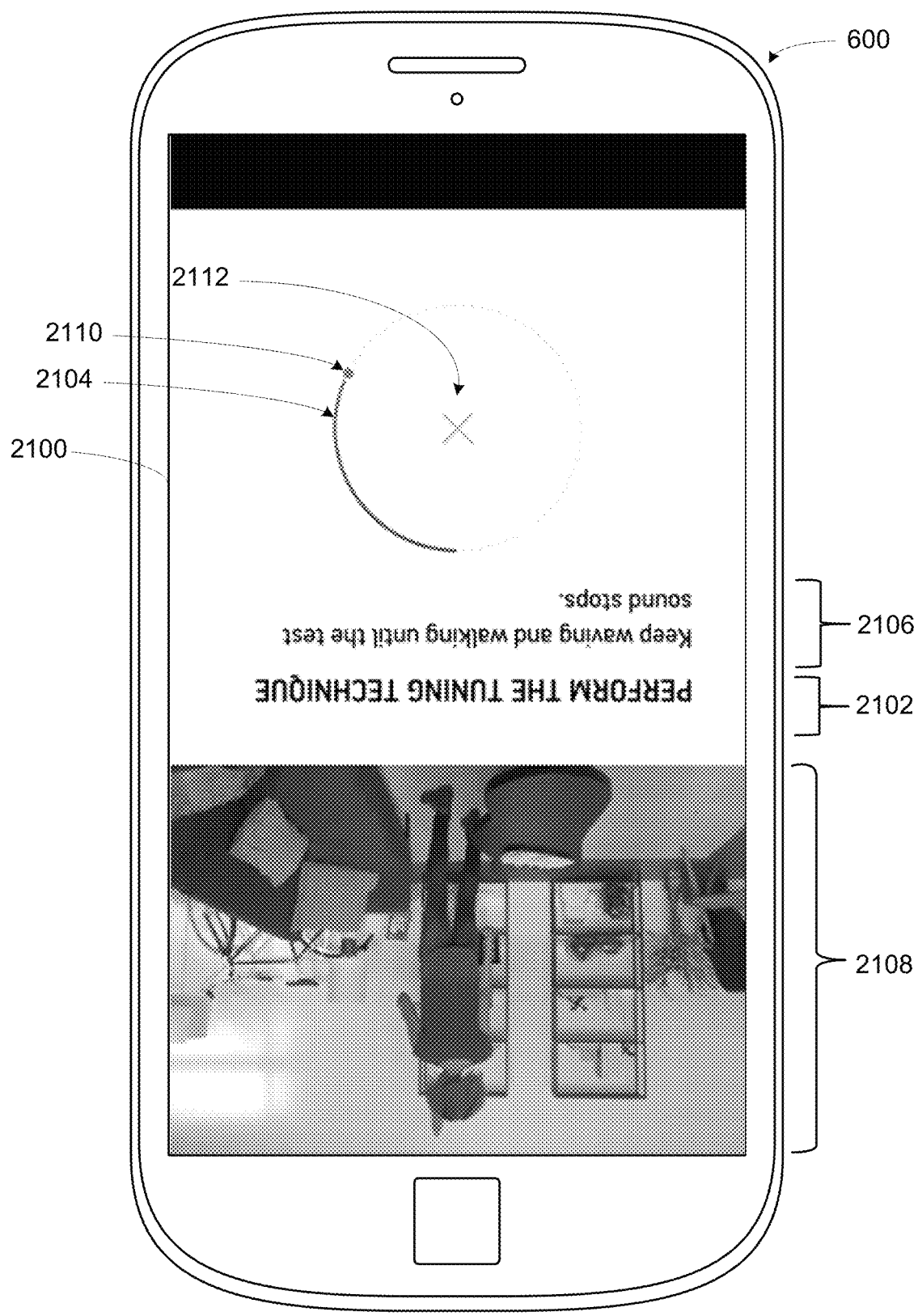
FIG. 21B shows a control device that is displaying a further example control interface, according to an example implementation.

As the calibration sound continues to be emitted by the playback device and detected by the control device, the control device may update the progress indicator to indicate progress through the calibration. For example, in FIG. 21B, progress indicator 2104 indicates that the calibration is partially complete. In some embodiments, a portion of the progress indicator may pulse in substantial synchrony with periods of the calibration sound, so as to provide visual feedback between the progress indicator and the calibration sound. For instance, in some cases, progress indicator 2110 may pulse or blink in in substantial synchrony with periods of the calibration sound. In other embodiments, a circular progress indicator, such as progress indicator 2104, may pulse in synchrony with periods of the calibration sound by displaying a circular graphical element that expands in radius from the circular progress indicator during periods of the calibration sound. Such an animated circular graphical element may provide the appearance that the entire progress indicator is pulsing in synchrony with periods of the calibration sound. In the center of progress indicator 2104, selectable control 2112 may cause the control device to interrupt the calibration, such as by pausing or cancelling the process.

Figure 22:
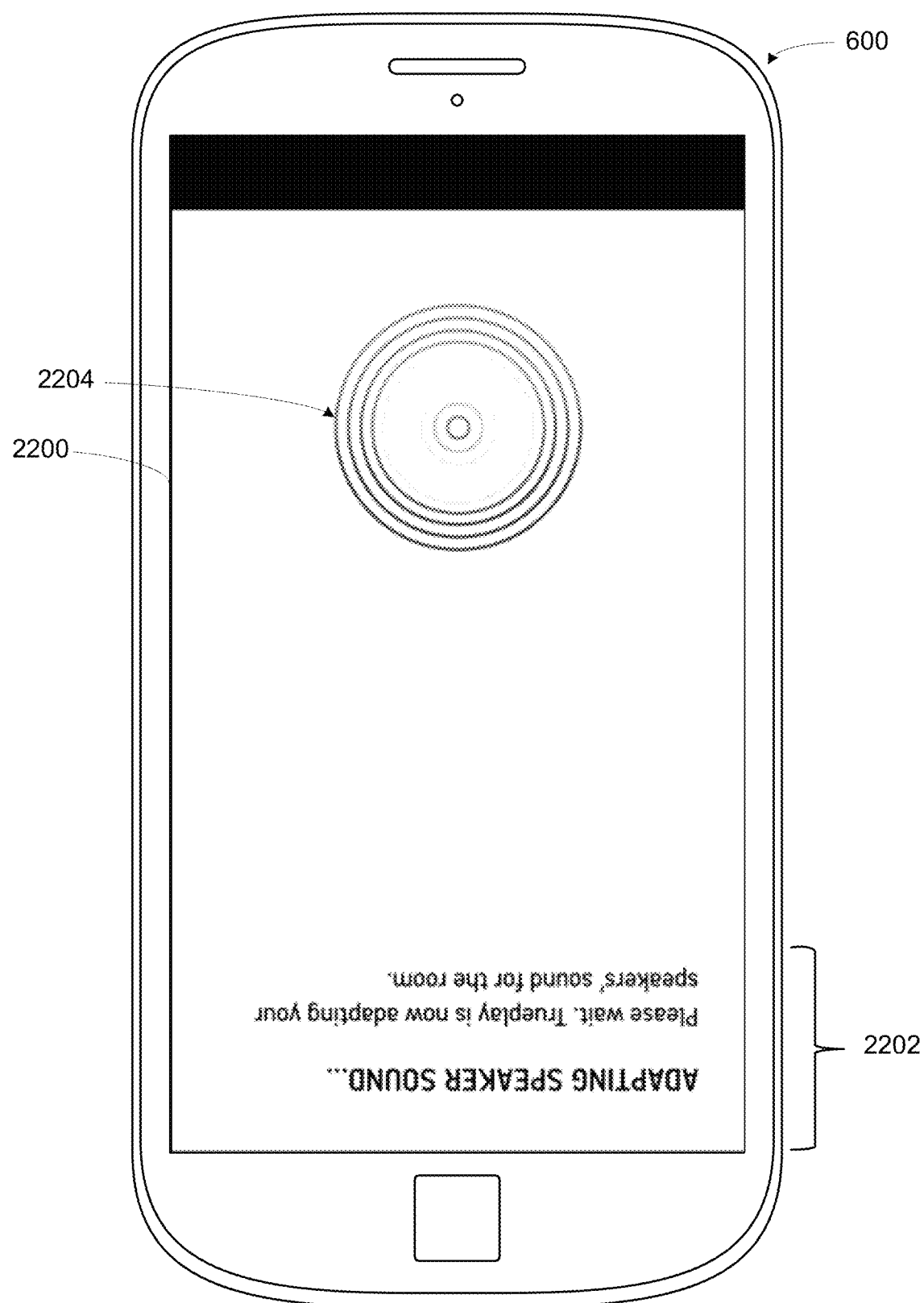
FIG. 22 shows a control device that is displaying an example control interface, according to an example implementation.

While the recordings of the calibration sounds are analyzed to determine the calibration settings for the playback device, the control device may display an indication of the calibration procedure's status. By way of example, in FIG. 22, control device 600 is displaying control interface 2200. Control interface 2200 includes a graphical region 2202 which indicates that the control device is adapting the sound of the playback device. Control interface 2200 also includes a graphical element 2204 that animates while the calibration sounds are analyzed.

Figure 23:
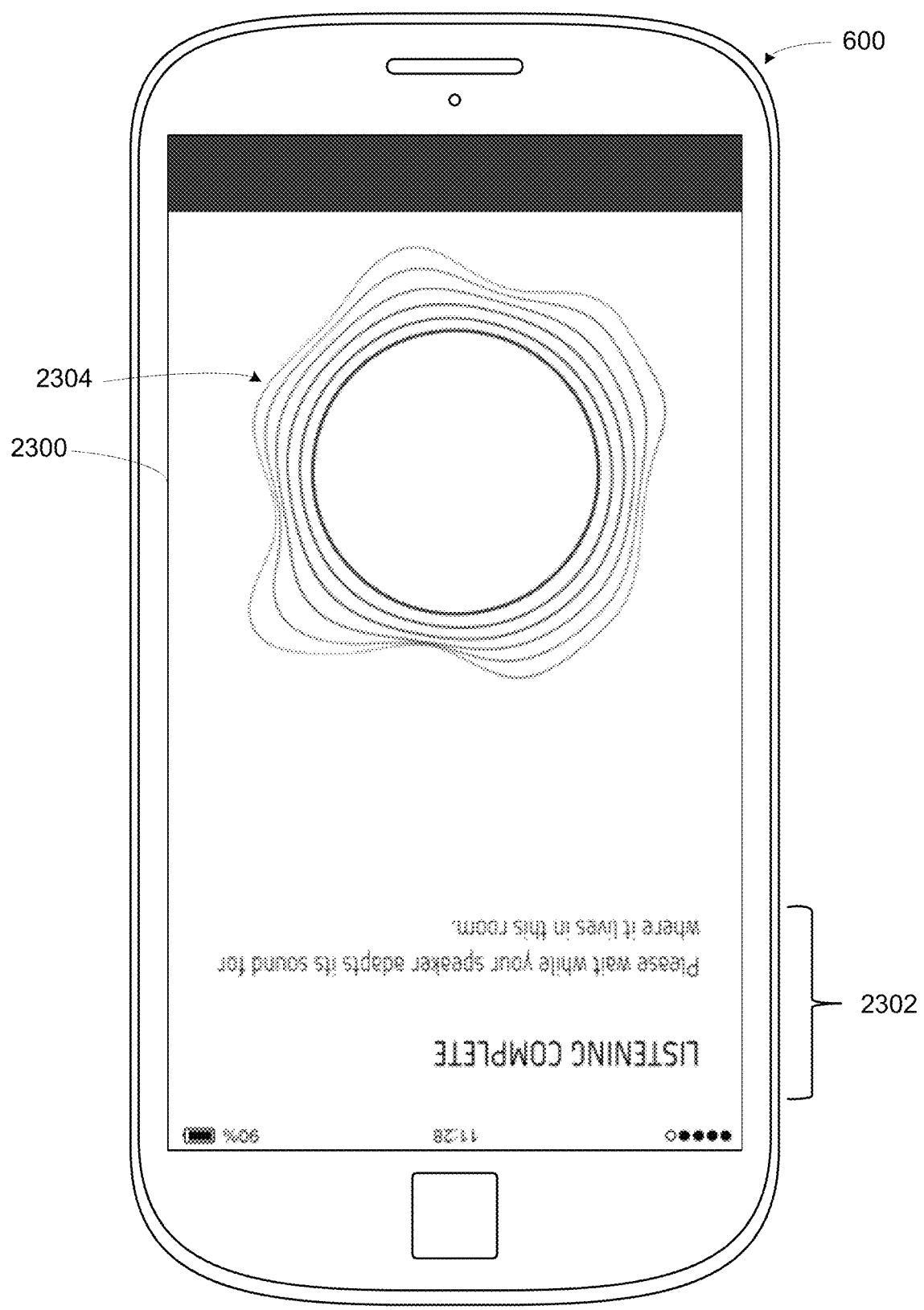
FIG. 23 shows a control device that is displaying another example control interface, according to an example implementation.

Additionally or alternatively, as shown in FIG. 23, control device 600 may display control interface 2300 to indicate the status of the spectral calibration procedure. Control interface 2300 includes a graphical region 2302 which indicates that the control device is adapting the sound of the playback device. Control interface 2300 also includes a graphical element 2304 that animates while the calibration sounds are analyzed. As shown, graphical element 2304 includes a plurality of concentric ellipsoids that are contorted from a circular shape. Upon the completing the analysis, control device 600 may display the plurality of concentric ellipsoids in the circular shape (i.e., not contorted, as circles).

Figure 24:
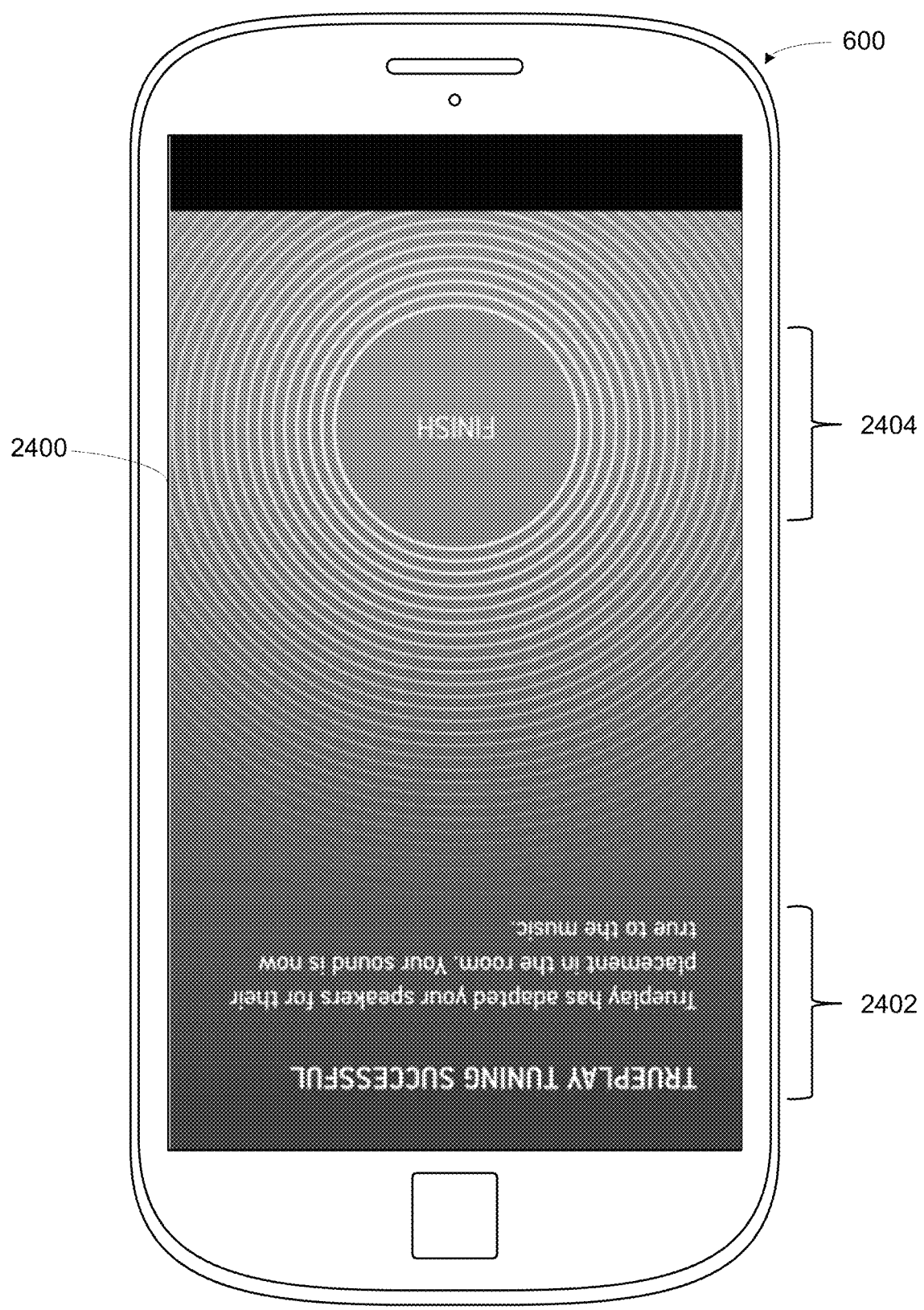
FIG. 24 shows a control device that is displaying a further example control interface, according to an example implementation.

After the calibration procedure finishes, the control device may display an indication of that status. To illustrate, in FIG. 24, control device 600 is displaying control interface 2400. Graphical region 2402 of control interface 2400 indicates that tuning (calibrating) of the playback device has completed. Graphical region 2402 includes a reminder to perform the calibration procedure again if the calibrated playback device is from the position in which it was calibrated. Graphical interface 2400 also includes a selectable control 2404 that, when selected, finishes the calibration.

In some examples, after the calibration procedure completes, the control device display a prompt to rotate the phone by 180 degrees about a horizontal axis such that the microphone is oriented downwards after the rotation. After such a rotation, the control device may be right-side up relative to its intended orientation within a hand (e.g., with the speaker towards the top of the device, and with the microphone towards the bottom of the device). Subsequent control interfaces may be displayed right-side up, rather than inverted, to account for this change in orientation.

In some embodiments, a control device may determine a degree of adjustment made by the calibration and display an indication of this degree on a control interface. For instance, in some cases, the control device may determine whether the determined calibration profile adjusts an equalization of the playback device by more or less than a threshold degree. Within examples, the threshold may be representative of an audible difference. Adjustments that exceed the threshold may be discernible by the average listener, while adjustments that are less than the threshold might not be as easily discernible.

In some examples, the control device may display graphical elements indicating the degree of adjustment. For instance, based on determining that the determined calibration profile adjusts the equalization of the playback device by more than the threshold degree, the control device may display one or more graphical elements indicating that the calibration of the playback device significantly adjusted equalization of the playback device. In contrast, when the determined calibration profile adjusts the equalization of the playback device by less than the threshold degree, the control device may display one or more graphical elements indicating that the calibration of the playback device subtlety adjusted equalization of the playback device. For instance, in an example implementation, a control device may display text stating: "Subtle changes were made to your device, as your playback device was well-placed." Other examples are possible as well.

As noted above, implementation 500 may include one or more operations, functions, or actions as illustrated by one or more of blocks shown in FIG. 5. Although the blocks are illustrated in sequential order, these blocks may also be performed in parallel, and/or in a different order than those described herein. Also, the various blocks may be combined into fewer blocks, divided into additional blocks, and/or removed based upon the implementation.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture. The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. Tangible, non-transitory, computer-readable media having instructions encoded therein, wherein the instructions, when executed by one or more processors, cause a mobile device to perform functions comprising:
    during a calibration sequence comprising (i) a spatial calibration component and (ii) a spectral calibration component, displaying, on a graphical display, a sequence of control interfaces to guide calibration of a playback device, wherein displaying the sequence of control interfaces comprises:
        displaying one or more spatial calibration interfaces comprising a guide to perform the spatial calibration component of the calibration sequence, wherein the spatial calibration component involves calibration of the playback device for a particular location within an environment; and
        displaying one or more spectral calibration interfaces comprising a guide to perform the spectral calibration component of the calibration sequence, wherein the spectral calibration component involves calibration of the playback device for the environment;
    during the spatial calibration component of the calibration sequence, recording, via one or more microphones, first audio output of the playback device while the mobile device is stationary at the particular location; and
    during the spectral calibration component of the calibration sequence, recording, via the one or more microphones, second audio output of the playback device while the mobile device is in motion through the environment.

2. The tangible, non-transitory computer-readable media of claim 1, wherein displaying the one or more spatial calibration interfaces comprises:
    displaying a first spatial calibration interface comprising a prompt to maintain positioning of the mobile device while the mobile device records the second audio output of the playback device, wherein the prompt indicates that the mobile device is recording the second audio output.

3. The tangible, non-transitory computer-readable media of claim 2, wherein the functions further comprise:
    displaying one or more graphical elements indicating that spatial calibration is performed in a sitting position at the particular location within the environment; and
    displaying a prompt to adjust a height of the mobile device while the mobile device is positioned at the particular location within the environment during the spatial calibration component.

4. The tangible, non-transitory computer-readable media of claim 2, wherein the functions further comprise:
    displaying a control interface comprising a prompt to initiate the spatial calibration component, the prompt comprising a selectable control, that when selected, initiates the spatial calibration component; and upon detecting selection of the selectable control, that when selected, initiates the spatial calibration component: (i) displaying a second spatial calibration interface and (ii) sending instructions to the playback device to play back the first audio output.

5. The tangible, non-transitory computer-readable media of claim 4, wherein displaying the second spatial calibration interface comprises displaying, in the second spatial calibration interface, an animation indicating that the mobile device is recording the second audio output.

6. The tangible, non-transitory computer-readable media of claim 1, wherein displaying the one or more spatial calibration interfaces comprises:

displaying a prompt indicating that the playback device is calibrated to the particular location within the environment.

7. The tangible, non-transitory computer-readable media of claim 1, wherein displaying the one or more spectral calibration interfaces comprises:

displaying a first spectral calibration interface comprising a video depicting a user performing the spectral calibration component; and when the video has been at least partially played back, permitting display of a second spectral calibration interface to advance the spectral calibration component.

8. The tangible, non-transitory computer-readable media of claim 1, wherein displaying the one or more spectral calibration interfaces comprises:

displaying a first spectral calibration interface comprising a prompt to initiate the spectral calibration component, the prompt comprising a selectable control, that when selected, initiates the spectral calibration component; and upon detecting selection of the selectable control, that when selected, initiates the spectral calibration component: (i) displaying a second spectral calibration interface and (ii) sending instructions to the playback device to play back the second audio output.

9. The tangible, non-transitory computer-readable media of claim 1, wherein displaying the one or more spectral calibration interfaces comprises:

displaying a second spectral calibration interface comprising (i) a prompt to continue moving the mobile device while the mobile device is recording the second audio output of the playback device and (ii) a progress meter indicating a proportion of the second audio output that has been outputted by the playback device.

10. The tangible, non-transitory computer-readable media of claim 1, wherein the functions further comprise:

determining a spectral calibration for the playback device based on the recorded second audio output of the playback device while the mobile device is in motion through the environment, and wherein displaying the one or more spectral calibration interfaces comprises:

while determining the spectral calibration, displaying a third spectral calibration interface indicating that the mobile device is determining the spectral calibration for the playback device.

11. A method to be performed by a mobile device, the method comprising:

during a calibration sequence comprising (i) a spatial calibration component and (ii) a spectral calibration component, displaying, on a graphical display, a sequence of control interfaces to guide calibration of a playback device, wherein displaying the sequence of control interfaces comprises:

displaying one or more spatial calibration interfaces comprising a guide to perform the spatial calibration component of the calibration sequence, wherein the spatial calibration component involves calibration of the playback device for a particular location within an environment; and displaying one or more spectral calibration interfaces comprising a guide to perform the spectral calibration component of the calibration sequence, wherein the spectral calibration component involves calibration of the playback device for the environment;

during the spatial calibration component of the calibration sequence, recording, via one or more microphones, first audio output of the playback device while the mobile device is stationary at the particular location; and during the spectral calibration component of the calibration sequence, recording, via the one or more microphones, second audio output of the playback device while the mobile device is in motion through the environment.

12. The method of claim 11, wherein displaying the one or more spatial calibration interfaces comprises:

displaying a first spatial calibration interface comprising a prompt to maintain positioning of the mobile device while the mobile device records the second audio output of the playback device, wherein the prompt indicates that the mobile device is recording the second audio output.

13. The method of claim 12, further comprising:

displaying one or more graphical elements indicating that spatial calibration is performed in a sitting position at the particular location within the environment; and displaying a prompt to adjust a height of the mobile device while the mobile device is positioned at the particular location within the environment during the spatial calibration component.

14. The method of claim 12, further comprising:

displaying a control interface comprising a prompt to initiate the spatial calibration component, the prompt comprising a selectable control, that when selected, initiates the spatial calibration component; and upon detecting selection of the selectable control, that when selected, initiates the spatial calibration component: (i) displaying a second spatial calibration interface and (ii) sending instructions to the playback device to play back the first audio output.

15. The method of claim 14, wherein displaying the second spatial calibration interface comprises displaying, in the second spatial calibration interface, an animation indicating that the mobile device is recording the second audio output.

16. The method of claim 11, wherein displaying the one or more spatial calibration interfaces comprises:

displaying a prompt indicating that the playback device is calibrated to the particular location within the environment.

17. The method of claim 11, wherein displaying the one or more spectral calibration interfaces comprises:

displaying a first spectral calibration interface comprising a video depicting a user performing the spectral calibration component; and when the video has been at least partially played back, permitting display of a second spectral calibration interface to advance the spectral calibration component.

18. The method of claim 11, wherein displaying the one or more spectral calibration interfaces comprises:
  displaying a first spectral calibration interface comprising a prompt to initiate the spectral calibration component, the prompt comprising a selectable control, that when selected, initiates the spectral calibration component; and
  upon detecting selection of the selectable control, that when selected, initiates the spectral calibration component: (i) displaying a second spectral calibration interface and (ii) sending instructions to the playback device to play back the second audio output.

19. The method of claim 11, wherein displaying the one or more spectral calibration interfaces comprises:
  displaying a second spectral calibration interface comprising (i) a prompt to continue moving the mobile device while the mobile device is recording the second audio output of the playback device and (ii) a progress meter indicating a proportion of the second audio output that has been outputted by the playback device.

20. The method of claim 11, further comprising:
  determining a spectral calibration for the playback device based on the recorded second audio output of the playback device while the mobile device is in motion through the environment, and wherein displaying the one or more spectral calibration interfaces comprises:
  while determining the spectral calibration, displaying a third spectral calibration interface indicating that the mobile device is determining the spectral calibration for the playback device.

* * * * *